US012450678B2

(12) United States Patent
Southin

(10) Patent No.: US 12,450,678 B2
(45) Date of Patent: Oct. 21, 2025

(54) AUTOMATED ARTIFICAL INTELLIGENCE VEHICLE APPRAISALS

(71) Applicant: DISCOVERY LOFT INC., Toronto (CA)

(72) Inventor: Stephen R. Southin, Toronto (CA)

(73) Assignee: DISCOVERY LOFT INC., Toronto (CA)

( * ) Notice: Subject to any disclaimer, the term of this patent is extended or adjusted under 35 U.S.C. 154(b) by 692 days.

(21) Appl. No.: 17/286,401

(22) PCT Filed: Oct. 16, 2019

(86) PCT No.: PCT/CA2019/051463
§ 371 (c)(1),
(2) Date: Apr. 16, 2021

(87) PCT Pub. No.: WO2020/077449
PCT Pub. Date: Apr. 23, 2020

(65) Prior Publication Data
US 2023/0162243 A1 May 25, 2023

Related U.S. Application Data

(60) Provisional application No. 62/747,930, filed on Oct. 19, 2018.

(51) Int. Cl.
*G06K 9/00* (2022.01)
*G06Q 30/02* (2023.01)
(Continued)

(52) U.S. Cl.
CPC ......... *G06Q 50/40* (2024.01); *G06Q 30/0206* (2013.01); *G06Q 30/0278* (2013.01);
(Continued)

(58) Field of Classification Search
CPC ........ G06T 7/0004; G06T 2207/30248; G06Q 30/0206; G06Q 30/0278; G06Q 30/0283;
(Continued)

(56) References Cited

U.S. PATENT DOCUMENTS 8,712,893 B1 * 4/2014 Brandmaier ............ G06F 16/51
705/35
11,288,789 B1 * 3/2022 Chen ...................... G06T 7/001
(Continued)

OTHER PUBLICATIONS

Jianguo Zhang, J. N. Stahl, H. K. Huang, Xiaoqiang Zhou, S. L. Lou and K. S. Song, "Real-time teleconsultation with high-resolution and large-volume medical images for collaborative healthcare," in IEEE Transactions on Information Technology in Biomedicine, vol. 4, No. 2, pp. 178-185, Jun. 2000 (Year: 2000).*
(Continued)

*Primary Examiner* — Gregory A Morse
*Assistant Examiner* — Kevin M Coomber
(74) *Attorney, Agent, or Firm* — Norton Rose Fulbright Canada LLP

(57) ABSTRACT

A system for vehicle appraisal that uses a dynamic interface with vehicle capture modules to capture image and audio data of a vehicle and processes the image and audio data to automatically compute vehicle metrics. The system uses the vehicle metrics to generate costs data and market value estimates for the vehicle. The system can integrate with other systems using an application programming interface to exchange data and reports.

20 Claims, 54 Drawing Sheets

(51) Int. Cl.
*G06Q 30/0201* (2023.01)
*G06Q 30/0283* (2023.01)
*G06Q 30/0601* (2023.01)
*G06Q 50/40* (2024.01)
*G06T 7/00* (2017.01)
*G06V 10/10* (2022.01)
*G06V 20/64* (2022.01)

(52) U.S. Cl.
CPC ..... *G06Q 30/0283* (2013.01); *G06Q 30/0643* (2013.01); *G06T 7/0004* (2013.01); *G06V 10/10* (2022.01); *G06V 20/64* (2022.01); *G06T 2207/30252* (2013.01); *G06V 2201/08* (2022.01); *G06V 2201/10* (2022.01)

(58) Field of Classification Search
CPC .... G06Q 30/02; G06Q 50/30; G06Q 30/0643; G06Q 30/06; G06V 10/10; G06V 20/64; G06V 2201/08; G06V 2201/10
See application file for complete search history.

(56) References Cited

U.S. PATENT DOCUMENTS

| | | | |
|---|---|---|---|
| 2002/0128985 | A1 | 9/2002 | Greenwald |
| 2005/0267633 | A1 | 12/2005 | Waita |
| 2015/0103170 | A1* | 4/2015 | Nelson ............... G06Q 10/20 348/148 |
| 2015/0106133 | A1 | 4/2015 | Smith, Jr. |
| 2016/0034590 | A1* | 2/2016 | Endras ............... G06Q 30/08 707/770 |
| 2017/0293894 | A1* | 10/2017 | Taliwal ............... G06V 10/82 |
| 2018/0082378 | A1* | 3/2018 | Kelsh ............... G06Q 30/0283 |
| 2018/0350167 | A1* | 12/2018 | Ekkizogloy ......... B60R 11/0247 |

OTHER PUBLICATIONS

PCT, International Search Report and Written Opinion of International Application No. PCT/CA2019/051463, mailing date Dec. 31, 2019.

European Patent Office, Extended European Search Report dated Jun. 13, 2022 for Application No. 19873138.2.

* cited by examiner

WISP PNG | 04

Enhanced
Final Annot.
Inspect Annot.

| QC | tudao | 5s |
| Damage-Part | dac.tran | 29s |
| Damage-Body | hien.do | 57s |
| Damage-Glass | tu.le | 19s |
| Damage-Wheel | ash.tran | 14s |
| Trim_ID | dash.tran | 6s |
| Finished | | 62s |

(PART)Wiper,Arm,Front,Right    Chipped,Medium
(PART)Rocker, Panel, Left, Unique    Rusted,Medium

| Agent [12] | using.pharman | hein.lo | thuy.nguyen | son.phamyen | anh.thetran | rhan.dau | duc.tran | duy.nguyen | sinh.nguyen | ann.tran | ann.le | thuy.young |
|---|---|---|---|---|---|---|---|---|---|---|---|---|
| QC | 1 | 1 | 3 | 0 | 2 | 0 | 0 | 0 | 0 | 1 | 1 | 0 |
| Inspect | 1 | 4 | 2 | 2 | 2 | 2 | 3 | 3 | 3 | 1 | 1 | 1 |

Report Data

Grading Standard A | Grading Standard B | Grading Standard C
2 | D | Poor Condition

| Detected Damages | Group | Description | Tolerance | Repair | Unit Measure |
|---|---|---|---|---|---|
| 1 Wheel_Front_Left has medium scuff | Wheel | The wheel has medium scuffing... | The edge of rim has scuff - 30 mm... | Specialist repair SMART repair | Per Component |
| 2 Wheel_Front_Left the wheel has brake... | Wheel | The wheel has brake dust staining... | The edge of rim has scuff -+30 mm... | Refinish SMART | Per Item |
| 0 Rocker_Panel_Left_Unique is medium dirty | Body | The component is medium dirty... | The body panel has areas on the surface... | Report INFO | Per Component |
| 0 Windshield_Front_Unique glass has minor... | Glass | The glass has minor chip and may... | The glass surface has a chip +25mm... | Report only INFO | Per Item |
| 1 Light_Head_Front_Left is dull and foggy | Part | The part dull and foggy and needs... | The surface is very dull | Replace SMART repair | Per Component |
| 1 Light_Head_Front_Right is dull and foggy | Part | The part dull and foggy and needs... | The surface is very dull | Replace SMART repair | Per Component |
| 1 Light_Fog_Front_Right is dull and foggy | Part | The part dull and foggy and needs... | The surface is very dull | Replace SMART repair | Per Component |

FIG. 47

| Type | Make | Model | Year | Body | Trim | Code | Status | | |
|---|---|---|---|---|---|---|---|---|---|
| A | Jaguar | XF | 2019 | Station Wagon | | (X260) | Process-Label | 1 | 16 |
| A | Nissan | 350Z | 2008 | Convertible | 2dr Roadster Auto... | Z33 | Active | 4 | 54 |
| B | Nissan | Titan-XD | 2019 | Crew Cab | Titan XD... | Not in the list | Request-Label | 0 | 29 |
| A | Toyota | Prius | 2015 | Station Wagon | Prius 3dr... | XW30 | Request-review | 2 | 55 |
| A | GMC | Sierra 3500 | 2018 | Crew Cab | | (4th gen) | Process-Photo | 0 | 19 |
| A | GMC | Canyon | 2012 | Reg Cab | | (1st gen) | Process-Photo | 0 | 19 |
| A | Fiat | 124 Spider | 2019 | Convertible | | - | Confirm | 0 | 18 |
| A | Nissan | 370Z | 2019 | Convertible | 370Z Roadster... | Z34 | Active | 4 | 500 |
| A | GMC | Sierra 2500 | 2018 | Crew Cab | | (4th gen) | Process-Label | 0 | 42 |
| A | Jaguar | S-Type Sedan | 2008 | 4dr Car | | - | Process-Label | 1 | 19 |
| A | Fiat | 500 | 2019 | Station Wagon | | - | Process-Photo | 0 | 2 |
| A | Toyota | Prius | 2019 | Station Wagon | Prius L Eco... | XW50 | Active | 3 | 65 |
| A | BMW | 1 series | 2013 | 2dr car | 1 series 2dr... | E81, E82, E87 | Request-Review | 2 | 51 |
| A | Chevrolet | Uplander | 2008 | Mini Van | Uplander cargo... | - | Process-Photo | 0 | 14 |
| A | GMC | Sierra 1500 | 2018 | Cre Cab | (4th gen) | | Request-Review | 2 | 42 |
| A | Nissan | Altima | 2012 | 4 dr car | Altima 4dr... | L32/U32 | Active | 3 | 65 |
| A | Fiat | 500L | 2019 | Station Wagon | | - | Process-Label | 0 | 54 |
| A | BMW | 1 series | 2013 | Convertible | 1 series 2dr... | E81, E82, E87 | Request-Review | 2 | 52 |
| A | GMC | Sierra 3500 | 2018 | Reg Cab | | (4tyh gen) | Process-Label | 0 | 29 |

AUTOMATED ARTIFICAL INTELLIGENCE VEHICLE APPRAISALS

FIELD

The present disclosure generally relates to the field of computing platforms, artificial intelligence, computer vision, and image and audio processing.

INTRODUCTION

Embodiments described herein relate to systems and processes for evaluating a vehicle for the purpose of estimating any cosmetic or mechanical defects or other visually and audibly noticeable repairs that require attention during the reconditioning of the vehicle for the purpose of validating the condition and/or to calculate an accurate market value of a vehicle by using computer vision and audio detection.

SUMMARY

In accordance with an aspect, there is provided a system for vehicle appraisals using image processing. The system has a server having non-transitory computer readable storage medium with executable instructions for causing one or more processors to configure: an interface application with a vehicle capture module to capture images of a vehicle and metadata for the captured images, the interface application displaying an interactive guide to assist in capturing the images, the interactive guide generated using a cage for a vehicle type, the cage defining locations or components of the vehicle, a vehicle identification number being metadata for the captured images, the vehicle identification number indicating the vehicle type; a recognition engine to process the captured images and metadata to detect defects of the vehicle and compute vehicle metrics, the processing based on different tasks dispatched to agent interfaces to receive input data for detecting the defects of the vehicle and computing the vehicle metrics; a cost estimate tool to process the vehicle metrics to compute cost data for repair of the defects of the vehicle; a valuation tool to compute a market value estimate for the vehicle using the vehicle metrics and the cost data; and wherein the interface application has visual elements corresponding to the interactive guide, the market value estimate, the cost data, and at least a portion of the vehicle metrics.

In some embodiments, the interface application receives a device identifier and wherein the image capture module uses the device identifier as metadata for the captured images.

In some embodiments, the interface application dynamically configures the vehicle capture module based on a vehicle type to generate the interactive guide corresponding to the cage.

In some embodiments, the interface application computes the vehicle type by capturing an image of or scanning a barcode of the vehicle to determine a vehicle identification number.

In some embodiments, the recognition engine computes the vehicle metrics by dispatching a plurality of tasks simultaneously to a plurality of agents, each task to a corresponding agent, each task associated with a portion of the captured images to display for the corresponding agent to receive input data for computing the vehicle metrics.

In some embodiments, the recognition engine computes, from the captured images, the vehicle identification number, and wherein the interface application is configured to receive an error message from the vehicle capture module upon determining that the vehicle identification number could not be successfully computed from the captured images, and in response updates the interface application with the visual elements corresponding to the interactive guide to re-capture an image to compute the vehicle identification number.

In some embodiments, the recognition engine computes the vehicle identification number by decoding the vehicle identification number from the captured images and, if not able to automatically decode the vehicle identification number, dispatching a task to an agent along with at least a portion of the captured images to receive input data for the vehicle identification number in response, the portion of the captured images corresponding to a vehicle identification number plate.

In some embodiments, the recognition engine computes, from the captured images, interior data, and wherein the interface application is configured to receive an error message from the vehicle capture module upon determining that the interior data could not be successfully computed from the captured images, and in response updates the interface application with the visual elements corresponding to the interactive guide to re-capture an image to compute the interior data.

In some embodiments, the recognition engine computes the interior data by dispatching three tasks simultaneously to three agents, each task to a different agent, a first task for a colour of the interior, a second task for an overall condition of the interior, and a third task a transmission type of the interior.

In some embodiments, the recognition engine computes, from the captured images, odometer data, and wherein the interface application is configured to receive an error message from the vehicle capture module upon determining that the odometer data could not be successfully computed from the captured images, and in response updates the interface application with the visual elements corresponding to the interactive guide to re-capture an image to compute the odometer data.

In some embodiments, the recognition engine computes, from the captured images, view data, and wherein the interface application is configured to receive an error message from the vehicle capture module upon determining that the view data could not be successfully computed from the captured images, and in response updates the interface application with the visual elements corresponding to the interactive guide to re-capture images to compute the view data, the view data being for a front view, side view and rear view of the vehicle.

In some embodiments, the recognition engine computes, from the captured images, windshield data, and wherein the interface application is configured to receive an error message from the vehicle capture module upon determining that the windshield data could not be successfully computed from the captured images, and in response updates the interface application with the visual elements corresponding to the interactive guide to re-capture an image to compute the windshield data.

In some embodiments, the recognition engine computes, from the captured images, tire data, and wherein the interface application is configured to receive an error message from the vehicle capture module upon determining that the tire data could not be successfully computed from the captured images, and in response updates the interface application with the visual elements corresponding to the interactive guide to re-capture an image to compute the tire data.

In some embodiments, the vehicle capture module generates visual elements corresponding to a vehicle shape to facilitate the image capture process.

In some embodiments, the vehicle capture module generates visual elements corresponding to different parts of the vehicle to generate the metadata, the metadata indicating a location on the image and a corresponding descriptor label.

In some embodiments, the vehicle capture module captures audio data for the vehicle and wherein the recognition engine processes the audio data to compute the vehicle metrics.

In some embodiments, the recognition engine uses repository of a plurality of cages linked to different types of vehicles to link the vehicle metrics to different locations or components of the vehicle.

In some embodiments, the recognition engine detects the defects of the vehicle and computes the vehicle metrics using grading bands as a condition of the vehicle.

In some embodiments, the recognition engine routes a first image to a first agent to receive a first data entry and simultaneously routes the first image to a second agent to receive a second data entry, the first agent having an interface optimized to capture the first data entry and the second agent having an interface optimized to capture the second data entry.

In accordance with an aspect, there is provided non-transitory computer recordable storage medium having stored therein computer executable program code, which when executed by a processor, causes the processor to: display an interactive guide at an interface application for capturing images of a vehicle, the interactive guide generated using a cage for a vehicle type, the cage defining locations or components of the vehicle, a vehicle identification number indicating the vehicle type; capture, at the interface application, images of the vehicle and metadata for the captured images, the captured images including data indicating defects; process the captured images and metadata to detect defects of the vehicle and compute vehicle metrics including the vehicle identification number, the processing based on different tasks dispatched to agent interfaces to receive input data for detecting the defects of the vehicle and computing the vehicle metrics; compute cost data for repair of the defects of the vehicle; compute a market value estimate for the vehicle using the vehicle metrics and the cost data; and update the interface application with visual elements corresponding to the interactive guide, the market value estimate, cost data, and at least a portion of the vehicle metrics.

In some embodiments, the code causes the processor to receive, at the interface application, a device identifier and wherein the image capture module uses the device identifier as metadata for the captured images.

In some embodiments, the code causes the processor to generate the interactive guide corresponding to the cage.

In some embodiments, the code causes the processor to compute the vehicle type by capturing an image of or scanning a barcode of the vehicle to determine a vehicle identification number.

In some embodiments, the code causes the processor to compute the vehicle metrics by dispatching a plurality of tasks simultaneously to a plurality of agents, each task to a corresponding agent, each task associated with a portion of the captured images to display for the corresponding agent to receive input data for computing the vehicle metrics.

In some embodiments, the code causes the processor to compute, from the captured images, the vehicle identification number, and wherein the interface application is configured to receive an error message from the vehicle capture module upon determining that the vehicle identification number could not be successfully computed from the captured images, and in response updates the interface application with the visual elements corresponding to the interactive guide to re-capture an image to compute the vehicle identification number.

In some embodiments, the code causes the processor to compute the vehicle identification number by decoding the vehicle identification number from the captured images and, if not able to automatically decode the vehicle identification number, dispatching a task to an agent along with at least a portion of the captured images to receive input data for the vehicle identification number in response, the portion of the captured images corresponding to a vehicle identification number plate.

In some embodiments, the code causes the processor to compute, from the captured images, interior data, and wherein the interface application is configured to receive an error message from the vehicle capture module upon determining that the interior data could not be successfully computed from the captured images, and in response updates the interface application with the visual elements corresponding to the interactive guide to re-capture an image to compute the interior data.

In some embodiments, the code causes the processor to compute the interior data by dispatching three tasks simultaneously to three agents, each task to a different agent, a first task for a colour of the interior, a second task for an overall condition of the interior, and a third task a transmission type of the interior.

In some embodiments, the code causes the processor to compute, from the captured images, odometer data, and wherein the interface application is configured to receive an error message from the vehicle capture module upon determining that the odometer data could not be successfully computed from the captured images, and in response updates the interface application with the visual elements corresponding to the interactive guide to re-capture an image to compute the odometer data.

In some embodiments, the code causes the processor to compute, from the captured images, view data, and wherein the interface application is configured to receive an error message from the vehicle capture module upon determining that the view data could not be successfully computed from the captured images, and in response updates the interface application with the visual elements corresponding to the interactive guide to re-capture images to compute the view data, the view data being for a front view, side view and rear view of the vehicle.

In some embodiments, the code causes the processor to compute, from the captured images, windshield data, and wherein the interface application is configured to receive an error message from the vehicle capture module upon determining that the windshield data could not be successfully computed from the captured images, and in response updates the interface application with the visual elements corresponding to the interactive guide to re-capture an image to compute the windshield data.

In some embodiments, the code causes the processor to compute, from the captured images, tire data, and wherein the interface application is configured to receive an error message from the vehicle capture module upon determining that the tire data could not be successfully computed from the captured images, and in response updates the interface application with the visual elements corresponding to the interactive guide to re-capture an image to compute the tire data.

In some embodiments, the code causes the processor to generate visual elements corresponding to a vehicle shape to facilitate the image capture process.

In some embodiments, the code causes the processor to generate visual elements corresponding to different parts of the vehicle to generate the metadata, the metadata indicating a location on the image and a corresponding descriptor label.

In some embodiments, the code causes the processor to capture audio data for the vehicle and wherein the recognition engine processes the audio data to compute the vehicle metrics.

In some embodiments, the code causes the processor to use a repository of a plurality of cages linked to different types of vehicles to link the vehicle metrics to different locations or components of the vehicle.

In some embodiments, the code causes the processor to detect the defects of the vehicle and computes the vehicle metrics using grading bands as a condition of the vehicle.

In some embodiments, the code causes the processor to route a first image to a first agent to receive a first data entry and simultaneously routes the first image to a second agent to receive a second data entry, the first agent having an interface optimized to capture the first data entry and the second agent having an interface optimized to capture the second data entry.

In another aspect, there is provided a method for automatically processing images of vehicles. The method involves receiving a vehicle identification number from an interface application; displaying an interactive guide at the interface application for capturing images of a vehicle, the interactive guide generated using a cage for a vehicle type, the cage defining locations or components of the vehicle, the vehicle identification number indicating the vehicle type; capturing, at the interface application, images of the vehicle and metadata for the captured images, the captured images identifying defects to the vehicle; processing the captured images and metadata to automatically detect the defects of the vehicle and compute vehicle metrics, the processing by dispatching different tasks to agent interfaces and, in response, receiving input data for detecting the defects of the vehicle and computing the vehicle metrics; computing cost data for repair of the defects of the vehicle; computing a market value estimate for the vehicle using the vehicle metrics and the cost data; and updating the interface application with visual elements corresponding to the interactive guide, the market value estimate, cost data, and at least a portion of the vehicle metrics.

In accordance with an aspect, there is provided a system for vehicle appraisals using image processing. The system has a server having non-transitory computer readable storage medium with executable instructions for causing one or more processors to configure: an interface application with a vehicle capture module to capture images of a vehicle and metadata for the captured images; a recognition engine to process the captured images and metadata to compute vehicle metrics; a cost estimate tool to process the vehicle metrics to detect defects of the vehicle and compute cost data for repair of the defects of the vehicle; a valuation tool to compute a market value estimate for the vehicle using the vehicle metrics and the cost data; and wherein the interface application has visual elements correspond to the market value estimate, cost data, and vehicle metrics.

In some embodiments, the interface application dynamically configures the vehicle capture module based on a vehicle type.

In some embodiments, the interface application computes the vehicle type by capturing or scanning a barcode of the vehicle to determine a vehicle identification number.

In some embodiments, the vehicle capture module generates visual elements corresponding to a vehicle shape to facilitate the image capture process.

In some embodiments, the vehicle capture module generates visual elements corresponding to different parts of the vehicle to generate the metadata, the metadata indicating a location on the image and a corresponding descriptor label.

In some embodiments, the vehicle capture module captures audio data for the vehicle and wherein the recognition engine processes the audio data to compute the vehicle metrics.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 40 an example interface with input fields for different view data metrics.

FIG. 42 an example interface with input fields for front view data metrics.

FIGS. 45 and 46 are examples interface for the task (or agent) dashboard.

FIG. 47 is an example interface for the task (or agent) dashboard that can include a list of detected damage.

FIG. 49 is an example interface 4900 for the cage repository manager.

FIG. 50 is an example interface 5000 for the cage.

DETAILED DESCRIPTION

Figure 1:
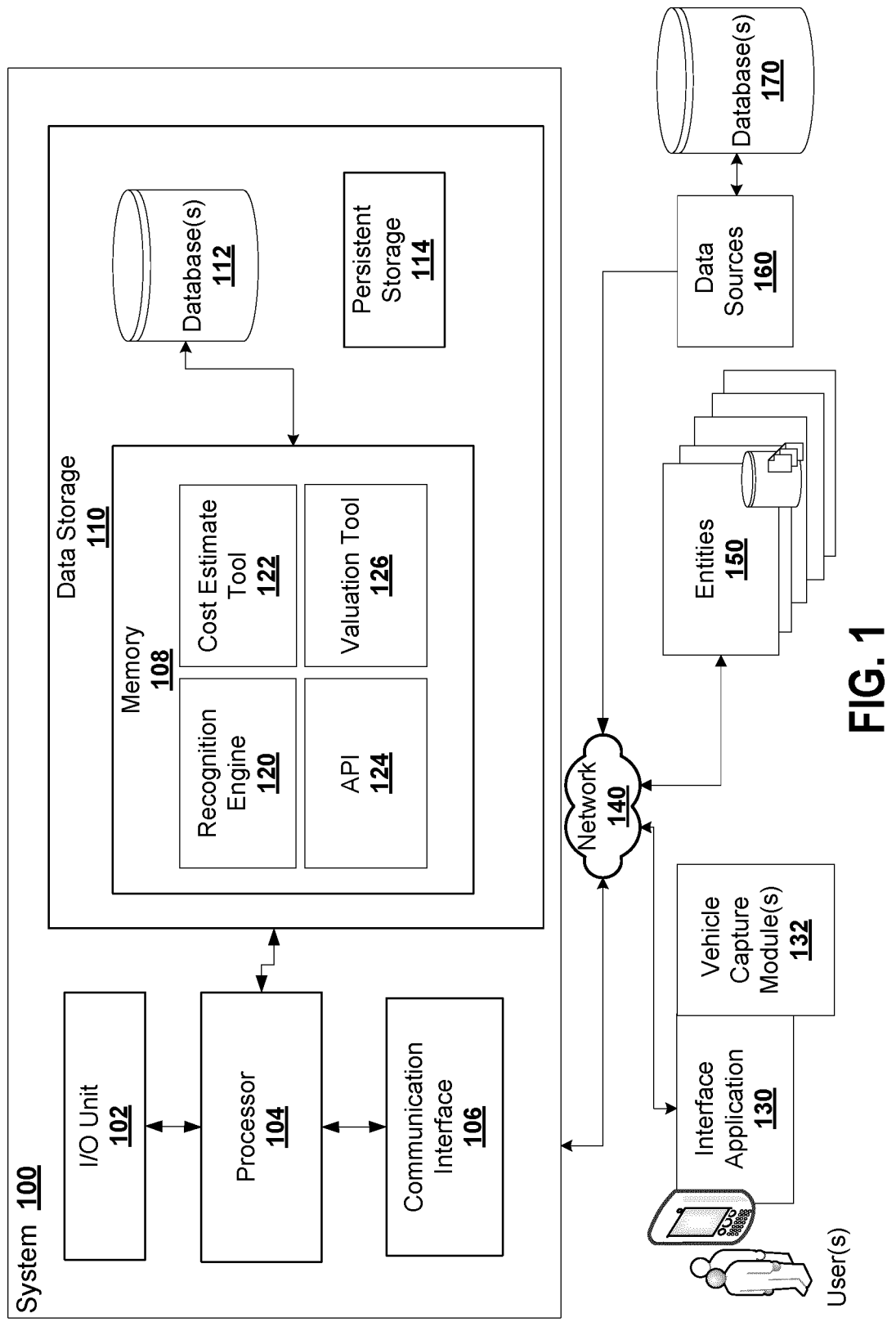
FIG. 1 is a diagram of a system for vehicle appraisals.

Embodiments of methods, systems, and apparatus are described through reference to the drawings.

Embodiments described herein can help the automotive retail and wholesale industry for digital consumer and dealer-to-dealer transactions and reduce the need for the buyer to be physically present to make vehicle purchases or return a leased, shared and rented vehicle.

For some consumers, they can be replacing the vehicle they currently own when they are considering their next vehicle purchase. An example method of dealing with their current vehicle is to negotiate a trade towards their purchase with the dealer as part of the final transaction. This can be referred to as a "trade-in". Managing the appraisal of these trade-ins is a barrier to remotely transacting online. Before the retail dealership can determine an accurate value for the consumer's vehicle being traded they require a detailed inspection to be completed. The dealer can determine the vehicle's condition to estimate any required repairs by completing a physical inspection to be done by their professional appraiser. This appraisal process can require the customer to physically be present with their trade-in to allow this to be completed. In an example, the consumer can complete a digital form. These forms can be lengthy in the details required to be completed. The consumer appraisal form method also leaves the dealership exposed as the information disclosed by the consumer regarding their own vehicle can be inaccurate as they may fail to include all relevant data which can create unexpected expenses for the dealer by impacting their total reconditioning costs that is required before reselling the vehicle. These forms also fail to give the consumer any immediate answers online as they still require an individual at the dealership to review each submission before determining the vehicle's value.

These same issues can impact the ability for dealers to digitally wholesale these vehicles to other dealers or through online auctions. Other methods to facilitate used vehicle transactions between dealers typically require a third-party to travel to the selling dealership to complete a vehicle condition report to assure buyers of its condition to maximize the vehicle's value. This method is a costly and time consuming process.

The same type of inspection is required at the end of a term when an individual rents or leases a vehicle. These inspections are also conducted by professionals in the field and require the vehicle to be physically present to be accomplished. In some cases customers are directed to schedule a third-party inspection to be completed at an alternative location like a collision centre. This process can be time consuming and cause the customer to be annoyed as they may not agree with the inspectors findings.

Beyond the limitations described for facilitating online transactions for automotive sales and leasing there is also room to improve the current in-person process at a bricks-and-mortar automotive retailer. The majority of retailers only allow an individual who has the skills of a professional appraiser to be the designated individual who completes these physical inspections and appraisals for every customer. These inspections take up a noticeable amount of time to complete and often there is times when the on duty appraiser(s) is busy doing other tasks or appraising other consumer's vehicles which can cause further delays for waiting customers.

FIG. 1 is a diagram of a system 100 for vehicle appraisals and an example physical environment.

The system 100 can include an I/O Unit 102, a processor 104, communication interface 106, and data storage 110. The processor 104 can execute instructions in memory 108 to implement aspects of processes described herein. The processor 104 can execute instructions in memory 108 to configure a recognition engine 120, cost estimate tool 122, application programming interface (API) 124, valuation tool 126, and other functions described herein. The system 100 may be software (e.g., code segments compiled into machine code), hardware, embedded firmware, or a combination of software and hardware, according to various embodiments. The system 100 implements a task manager process to divide the data computation process into different tasks to be dispatched to different agents or processors. For each of the captured images, the system 100 has defined specific tasks to be performed for each view of the images, which varies depending on the content of the specific photos collected. The tasks can be dispatched to different agents simultaneously for an efficient data process.

The system 100 can implement different machine learning methods for determining the condition, estimated reconditioning costs and estimated market value for a vehicle by participating as an autonomous third-party validation source between the seller and the buyer of a motor vehicle. This system 100 can also be integrated with legacy systems that the retailer is utilizing in their appraisal process or the online wholesale marketplace. The system 100 captures and computes metrics for the condition of any vehicle and processes the specified damages (indicated in damage data for the vehicle) through its grading process or bands. The system 100 can generate three specific grading bands as a resulting condition of the vehicle, for example. These grading bands along with the other vehicle data points such as, year, make, model, trim, mileage that the system 100 has collected and structured are then able to be shared via the API 124 to automate the collection of valuation and other new data resulting from other possible data processing capabilities that is made available through data integration with these providers during any live inspection. The system 100 configures an interface application 130 to implement a task dashboard. The system 100 configures an interface application 130 to implement other dashboard or views. For example, the system 100 configures an interface application 130 with visual elements to guide a user through the image capture process, based on specified angles and views.

The system 100 configures an interface application 130 with a vehicle capture module 132 to capture images of a vehicle and metadata for the captured images. The system 100 has a recognition engine 120 to process the captured images and metadata to compute vehicle metrics. The recognition engine 120 can automatically compute vehicle metrics by processing images and capturing data indicated in the images. The recognition engine 120 can implement or integrate with different tasks that can be dispatched to different agents, for example. The tasks can be linked to different images. The system 100 has a cost estimation tool 122 to process the vehicle metrics to detect defects of the vehicle and compute cost data for repair of the defects of the vehicle. The system 100 has a valuation tool 126 to compute a market value estimate for the vehicle using the vehicle metrics and the cost data. The interface application 130 has visual elements corresponding to the market value estimate, cost data, and vehicle metrics. The system 100 has an application programming interface (API) 124 to integrate with other systems for data exchange.

The recognition engine 120 can access a repository of cages for vehicles to identify different components of the vehicle. There can be a different cage for each type of vehicle (e.g. make and model). The type of vehicle can be linked to a Vehicle Identification Number (VIN), for example. The recognition engine 120 can compute metrics to assess damage on the vehicle shown in an image relative to a location or component of the vehicle. The cage can be used to define the location or component. The cage can provide a reference for the location or component so that it can be aggregated with other reference or location data in a common way (via the cage definition). For example, an image may indicate damage on the back left corner of the vehicle body. The cage for the vehicle can be used by recognition engine 120 to determine that an image shows a portion of the back left corner of the vehicle. The cage data can provide an anatomy for the vehicle. The image (showing the damage) can be routed to an improved interface application 130 for review and assessment by an agent.

Figure 48:
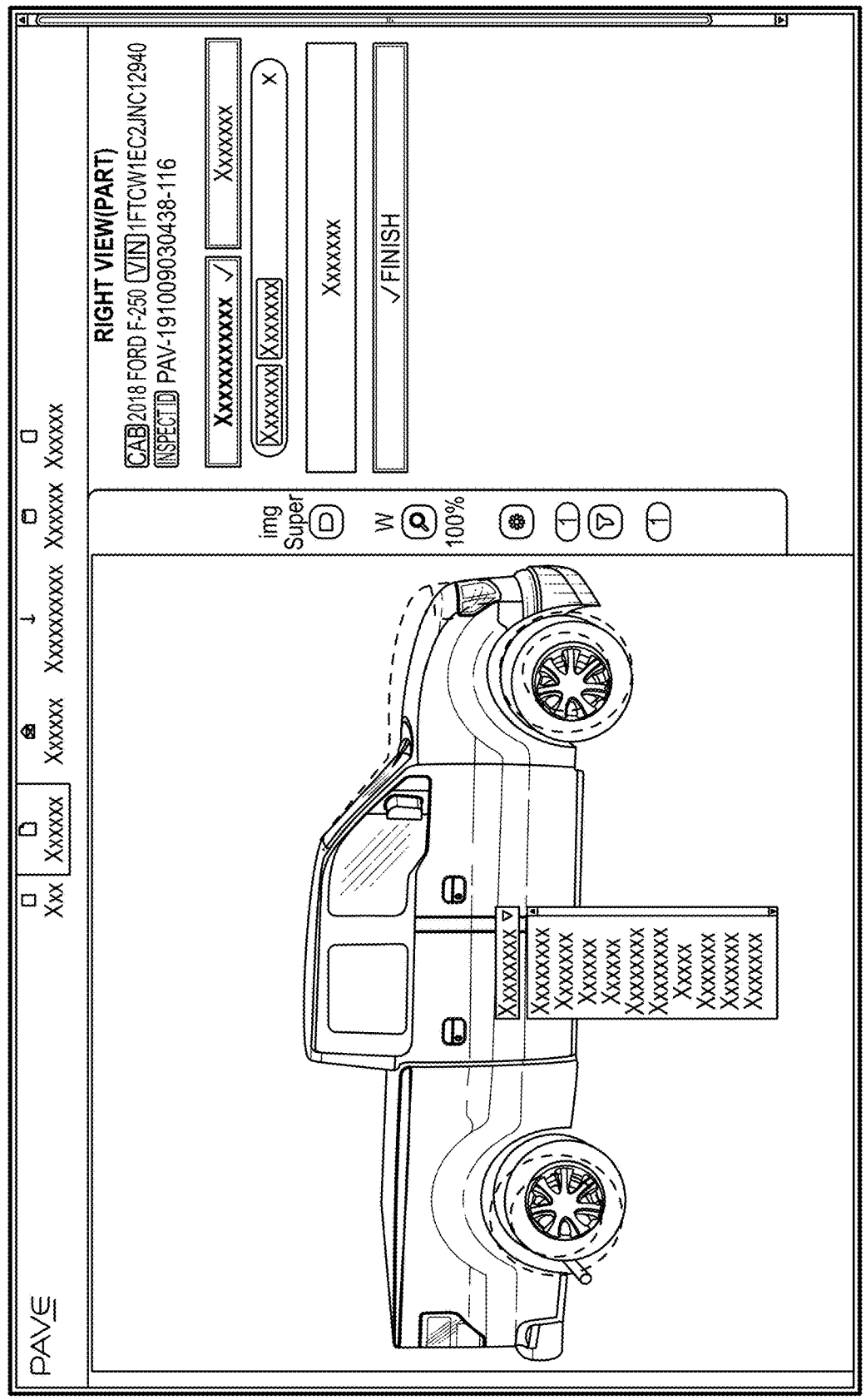
FIG. 48 is an example interface with an interactive guide that includes a cage overlay for capturing data.

FIG. 48 shows an example interface with an image of a vehicle and an overlay depicting a cage for the vehicle. The interface can include a list of labels for different components to ease input process. The interface can include a list of descriptors to indicate damage data for different components of the vehicle to ease input process. The interface can update with visual elements to guide the image process and to assist with labelling the images with metadata.

In some embodiments, system 100 has a Cage SVG Repository in data storage 110. Completing a comprehensive vehicle inspection begins with system 100 gaining a detailed understanding of the complete anatomy of the specific vehicle being inspected. The system 100 uses cages to identify each component of the vehicle and link each type of damage to respective components. The system 100 has an interactive guide to assist in capturing images and data for the vehicle. The interactive guide can have visual elements to assist in capturing images at the correct alignment or angle. The cage data can be used to generate the interactive guide. FIG. 48 is an example interface with an interactive guide that includes a cage overlay for capturing data.

This data can be used to determine how the severity of this damage can affect the overall evaluation of the vehicle. An example of a situation that requires this would be to explore how the impact of a minor dent is considered by the system 100 depending on the exact location of this type of dent. First the system 100 sets a standardized tolerance of what is considered a minor dent or what would be considered instead as a medium, major or impact damage type of dent. Next if a minor dent is detected in an image being processed by the system 100 it is also important to recognize the specific location and impacted component because this will determine the repair type for this specified minor dent that was detected. If this dent is on the left view of the vehicle and was found on the front door it might be considered a cold metal repair which indicates a minor paintless dent removal process that can be easily implemented with marginal impact on the desirability of vehicle and minimal cost to repair. However, if this same degree of dent was detected on the B pillar of the vehicle the reconditioning method would be different as the same paintless dent removal process cannot be performed in this location of the vehicle and this damage would be considered a minor body shop repair which requires the impacted component to be repaired by a professional body shop and the vehicle will be repainted to remedy which does cost more and impacts the vehicle's desirability differently. The cage data can provide this location and component data to the system 100. The system 100 can understand the difference of which component is the front door or the B pillar in performing vehicle condition evaluations.

In some embodiments, the system 100 has a cage repository manager. The system 100 can generate an interface for the cage repository manager. The interface can list all cages in data storage 110 along with attributes or properties of the cages. Example attributes include type, make, model, year, body, trim, code, status.

FIG. 49 is an example interface for the cage repository manager. The interface has a list all cages along with attributes or properties of the cages such as type, make, model, year, body, trim, code, status. The different attributes have different values which are shown populated in the example interface. The interface can be used to add or delete cages for system 100 and edit or modify data for cages. Updates can include modifications to attributes, for example.

Figure 50:
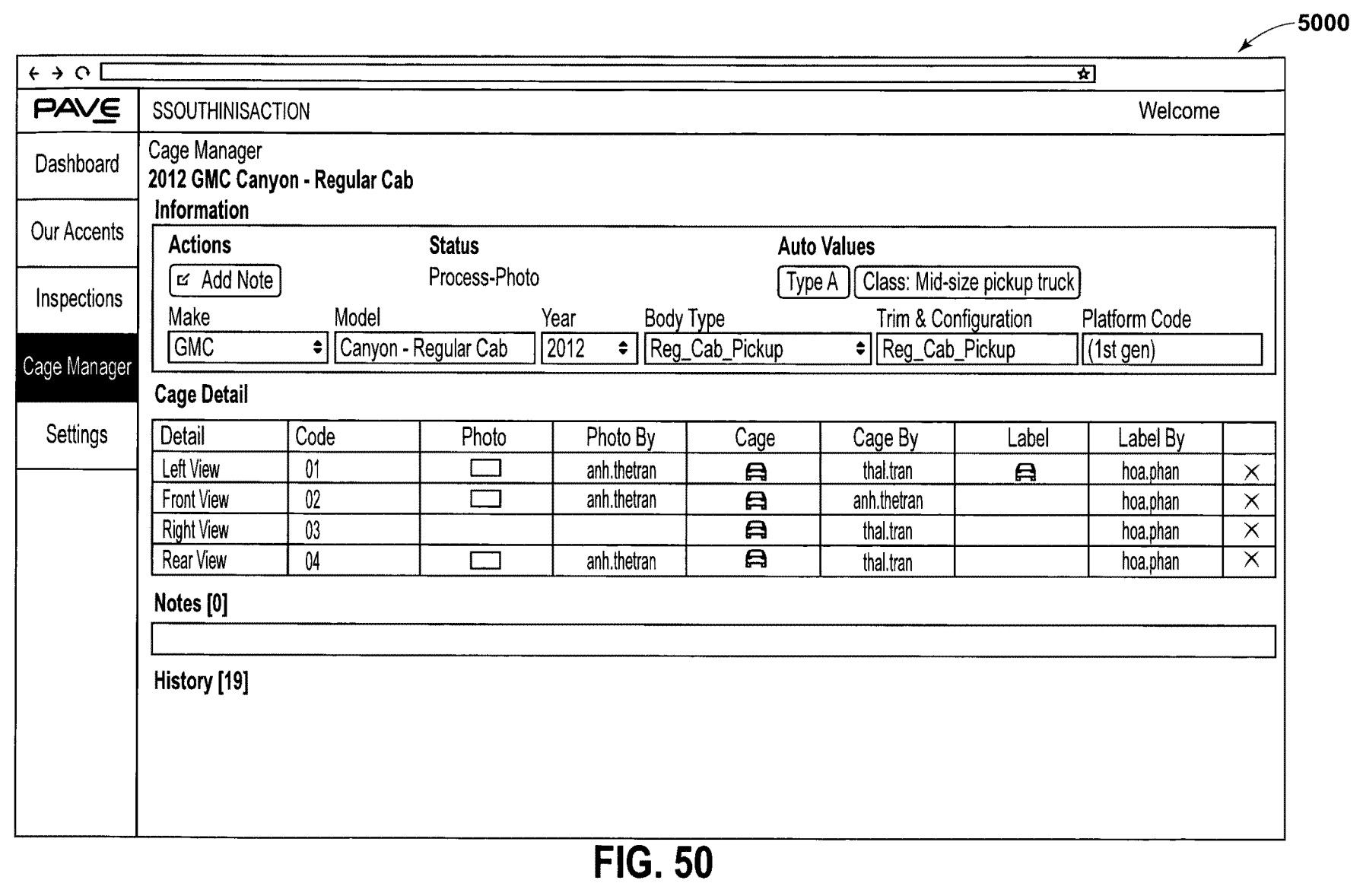

FIG. 50 is an example interface for the cage. The example cage is for a 2012 GMC Canyon regular cab. The interface indicates a form field for the cage with attributes or properties of the cages such as type, make, model, year, body, trim, code, status. The different attributes have different values which are shown populated in the example interface. The example cage has images for different overlay views such as the left view, front view, right view, rear view. The cage views can be overlay for images of vehicles with corresponding views.

Figure 51:
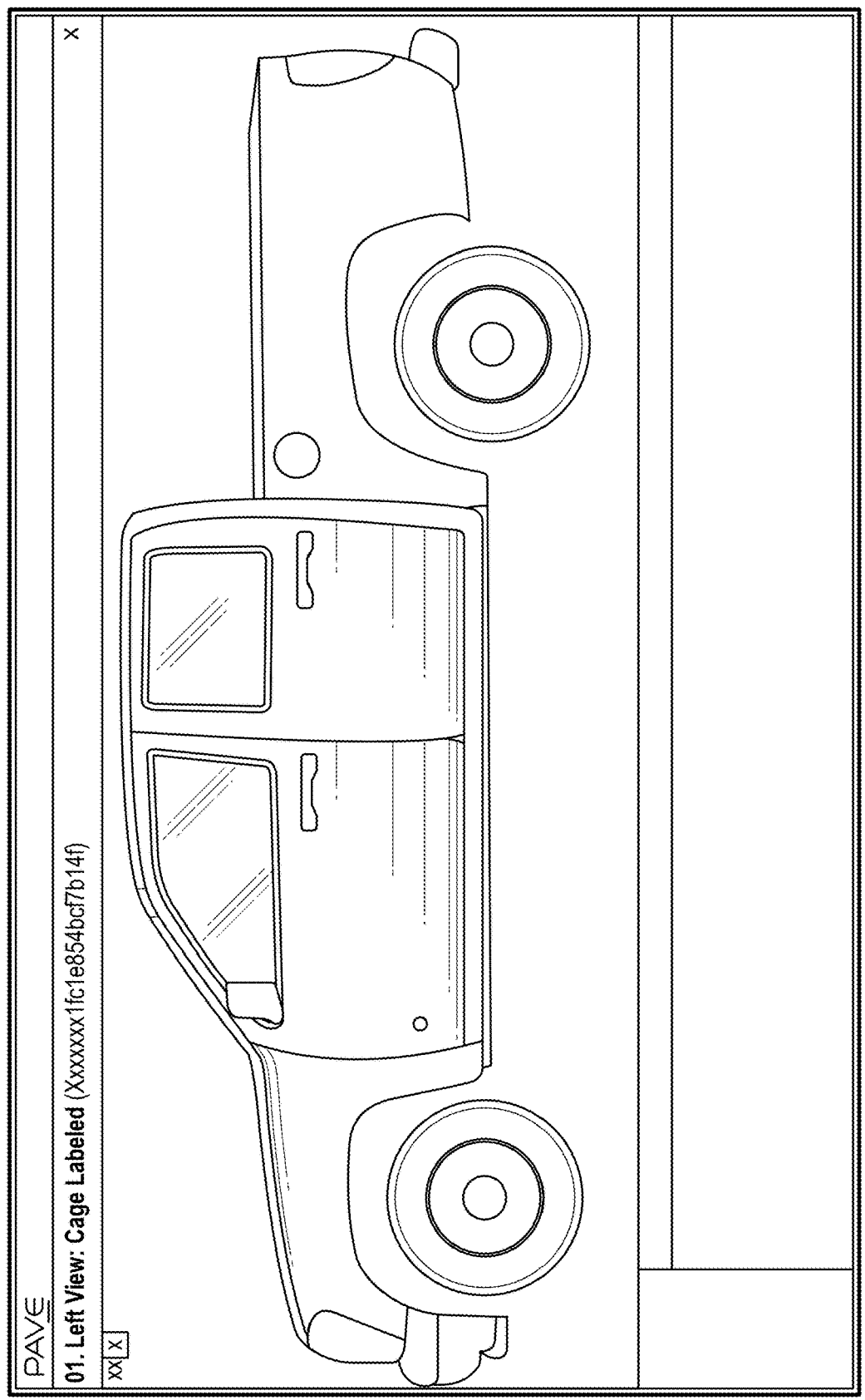
FIG. 51 is an example interface 5100 for the left view of the cage.

FIG. 51 is an example interface for the left view of the cage. The cage data can be used to generate a transparent overlay to be used as visual elements for the interface. The transparent overlay of the cage can be used to enhance an image of a vehicle. The overlay of the cage can align with the image. This can be used by an interactive guide to facilitate the image capture process.

Figure 52:
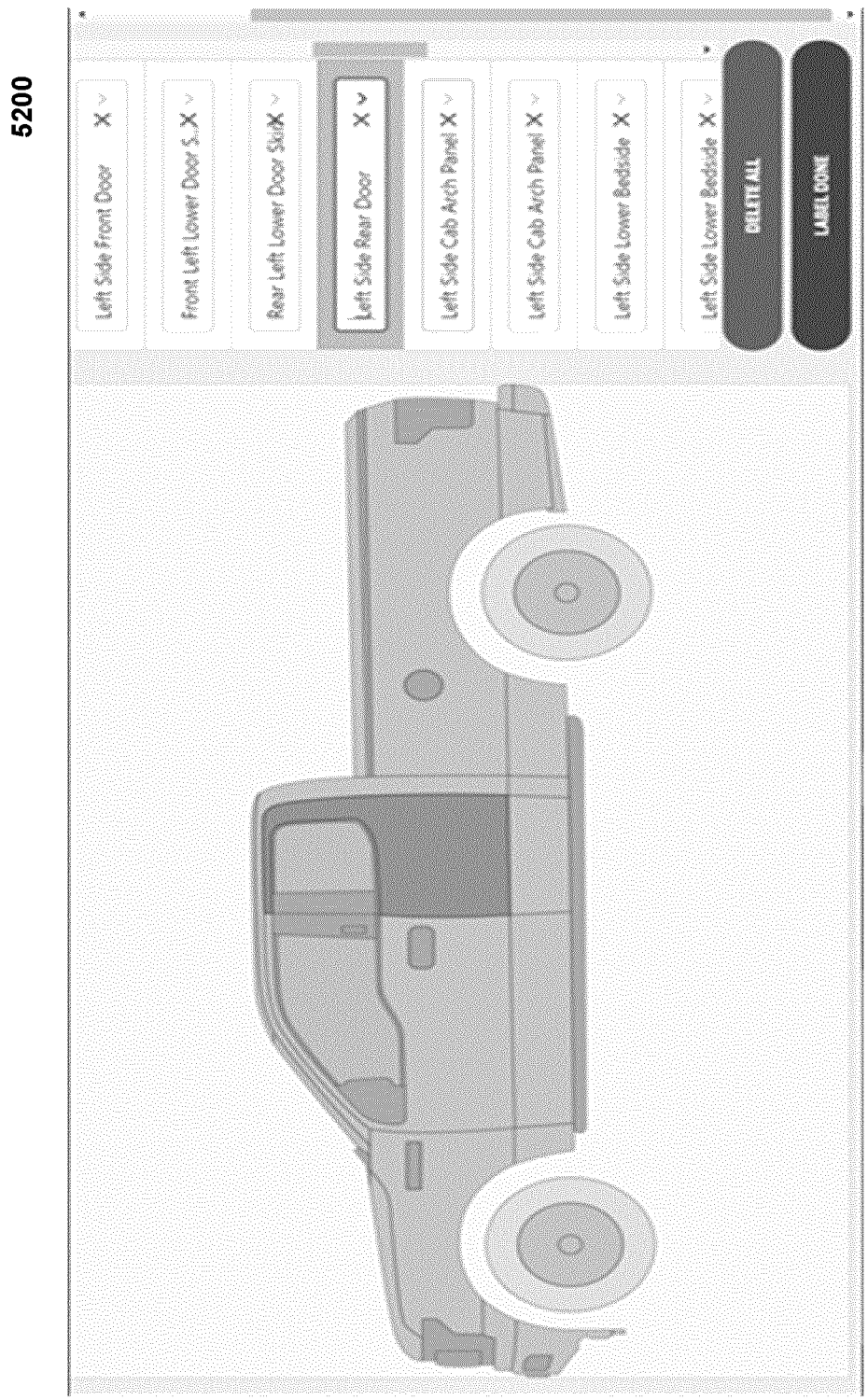
FIG. 52 is an example interface 5200 for the left view of the cage for cage development and labeling.

FIG. 52 is an example interface for the left view of the cage for cage development and labeling. The cage data can include labels for different components shown in the cage image. The interface can be used to generate labels for the different components. A text data field can be used to capture input data for the labels.

Figure 53:
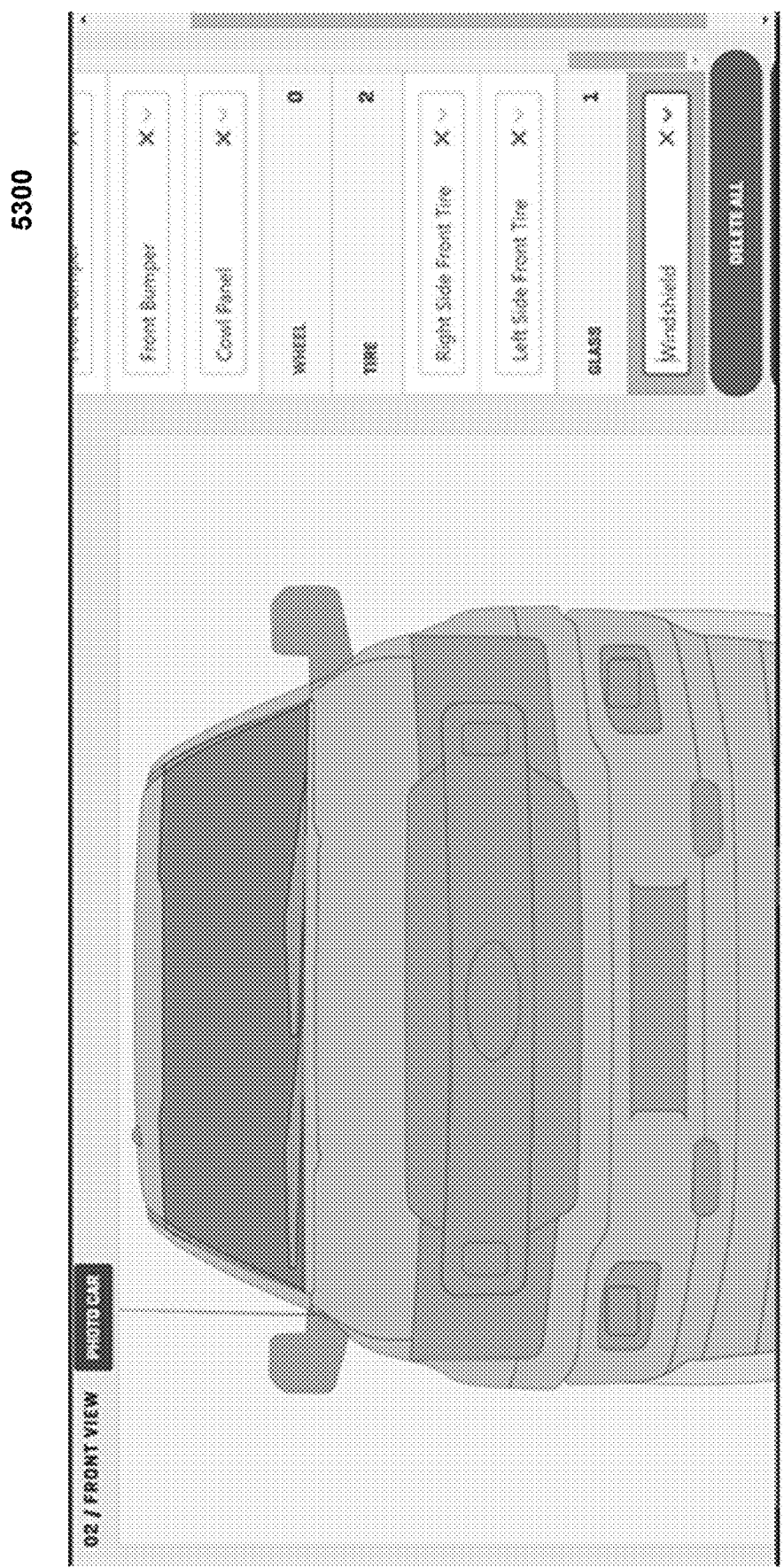
FIG. 53 is an example interface 5300 for the front view of the cage for cage development and labeling.

FIG. 53 is an example interface for the front view of the cage for cage development and labeling.

Figure 54:
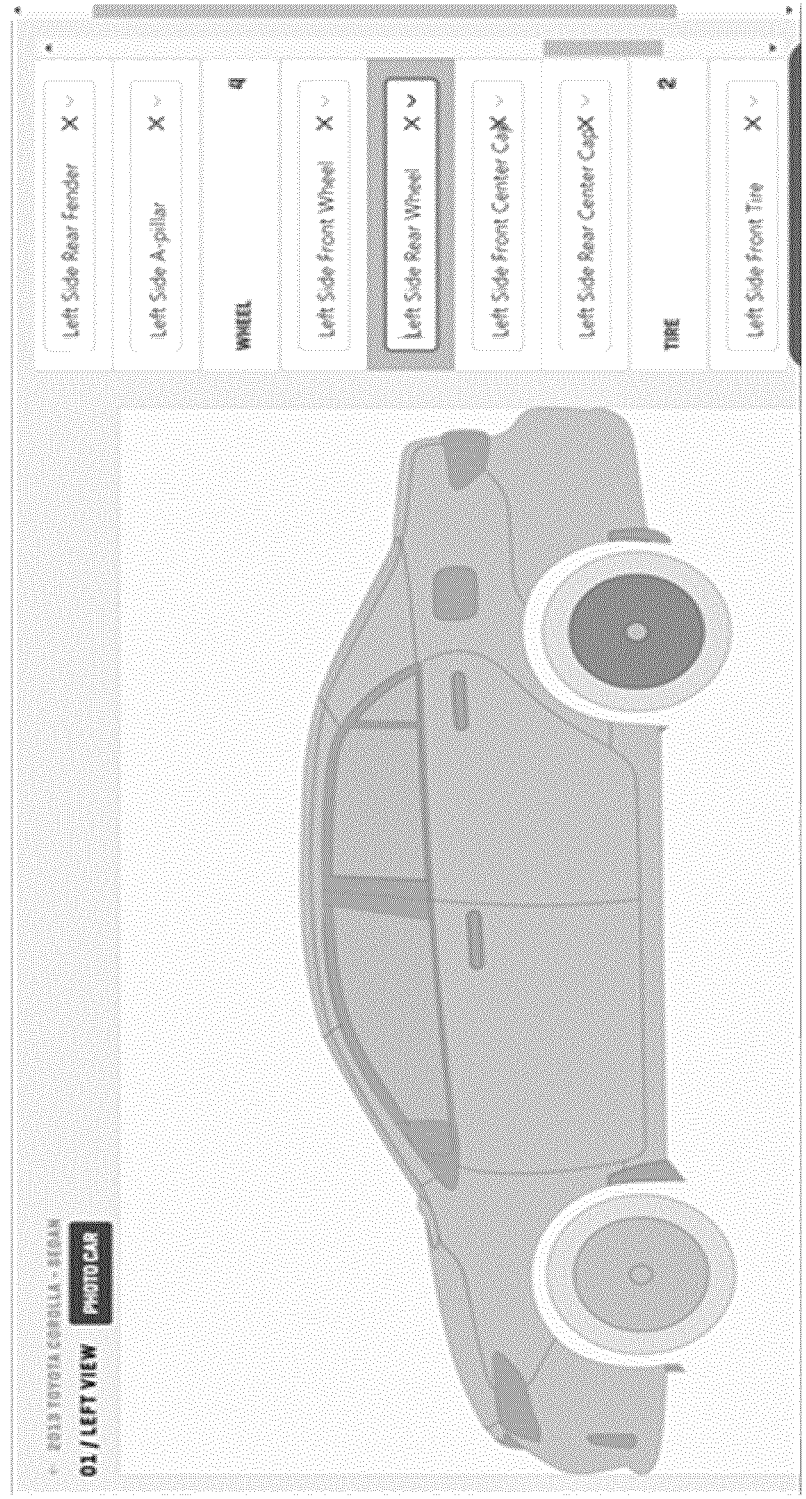
FIG. 54 is an example interface 5400 for the left view of another example cage for cage development and labeling.

FIG. 54 is an example interface for the left view of another example cage for cage development and labeling. The cage data can include labels for different components shown in the cage image. The interface can be used to generate labels for the different components. A text data field can be used to capture input data for the labels.

The cost estimation tool 122 can interact with the recognition tool 120 to compute metrics that correspond to an assessment of damage to a vehicle as shown in a set of images of the vehicle processed by recognition tool 120. The system 100 can use an improved image dispatch process. The system 100 can break down the dispatch process into different tasks and each task can be linked to an agent using interface application 130. An image can contain different elements of a vehicle. An agent can review an element and input data corresponding to the element (e.g. quality, odometer, engine light on). Different agents can look for specific elements to optimize capture process. The tasks can be assigned to identifiers for different interface applications 130.

The valuation tool 126 can implement a grading process to generate a grade for a vehicle using different industry standards and other factors. The valuation tool 126 can generate weights for different components of the vehicle to generate a grade for the overall vehicle.

The system 100 can implement grading using different processes. An example grading process is shown in the Appendix attached hereto.

The system 100 uses the results of each inspection to designate a vehicle with three specific industry standard condition report grading bands. To better unify with the industry integrations for multiple use cases. The system 100 utilizes three example industry standards used to determine the grade bands it will designate for each inspection. System 100 uses the example industry standards to align with the standards used by most of SYSTEM 100's API clients. The three standards we replicated within the system 100 API can be the NAMA Grading Standard, the NAAA Grading Standard and Kelly Blue Book Grading System.

The system 100 can compute component or damage severity scores.

The system 100 determines the damage/severity of each component during the inspection process as it labels each item with a Damage_Type. The system 100 then determines a "most likely" repair method based on the type of component and the Damage_Type and this is used to designate a Repair_Type. Once the system 100 has processed this it then determines the Repair_Order along with a score for each item (to designate the NAMA and Kelly Blue Book grading system) that is used to calculate the grading band for each condition report.

The vehicle's grading bands are returned in the API separately by each standard, item score and the overall grade for the Vehicle Condition Report.

The system 100 repair scores and methods used to determine the Repair_Type as shown in the example of the attached Appendix. The system 100 can determine damage type by component. Example components are part, body, glass, wheel, tire, and so on.

Once the system 100 has completed an inspection and has determined the type of damage, its severity and how this impacts what grade score to apply to each item or component measured it uses the following matrix to apply three grade standards for each inspection in this example; NAAA as a number, NAMA as a letter and Book Value as text, based on the following parameters shown in the example matrix.

| Vehicle Condition Grading Scale | Vehicle Condition Grading Scale | Book Value Grading Scale | Max Grade Per Item Score | Maximum Total Grade Score Per Vehicle Inspection |
|---|---|---|---|---|
| 5 | A | Excellent | 0 | 0 |
| 4 | B | Good Condition | 1 | 5 |
| 3 | C | Fair Condition | 3 | 30 |
| 2 | D | Poor Condition | 4 | 40 |
| 1 | E | Poor Condition | 5 | 50 |
| 0 | U | Poor Condition | 1000 | 1000 |

In some embodiments, the interface application 130 dynamically configures for a user as part of an image capture process or for an agent as part of an image review process. In some embodiments, the interface application 130 dynamically configures the vehicle capture module 132 based on a vehicle type. The vehicle type can be linked to one or more cages maintained by the system. The interface application 130 can compute the vehicle type by capturing or scanning a barcode of the vehicle to determine a vehicle identification number. In some embodiments, the vehicle capture module 132 generates visual elements corresponding to a vehicle shape to facilitate the image capture process. Once the VIN is decoded and the system 100 knows the model of the vehicle and can retrieve the relevant cage based on which view is captured. The system 100 uses the cage to generate a silhouette as an SVG file (as an illustrative example) that is used by the Capture user interface process to guide the user on the required alignment needed to frame the vehicle this allows the Agent user interface to then adjust the specific cage overlayed to the captured image being inspected. The overlay is based on cage data. The cage data is used to render the shapes on the interface to help the image capture process.

The visual elements can be overlays that can be aligned with the vehicle to capture an image of the vehicle. In some embodiments, the vehicle capture module 132 generates visual elements corresponding to different parts of the vehicle to generate the metadata. The metadata can indicate a location on the image and a corresponding descriptor label. The system 100 links this metadata to different locations of the vehicle using the cage. The cage position in relation to the inspection photo can be set by an agent as they use interface tools to adjust the cage to align with the photo. This provides the metadata required to know the shape and location ordinance of the entire anatomy of the vehicle that is visible within the photo. For example, the metadata can be used to label parts of the image of the vehicle or to indicate defects or marks, for example. In some embodiments, the vehicle capture module 132 captures audio data for the vehicle and the recognition engine processes the audio data to compute the vehicle metrics. The recognition tool 120 can use the cage data to link the images to different locations on the vehicle. The metadata can be linked to different locations on the vehicle as well. The metadata can be used by the cost estimation tool 122 and the valuation tool 126 to compute cost metrics and grading metrics. The metadata can include data that indicates damage and a corresponding severity level for the damage. The captured images can be dispatched to different interface applications 130 for agents.

The system 100 generates and provides a link (for display at an interface application 130) that can be opened on any mobile device that would be used by the seller (the consumer who is trading in a vehicle or a dealer who is wholesaling the vehicle). This link when clicked will trigger the display of an interface configured with a sequence of mobile optimized vehicle capture modules 132 (at interface application 130) that utilizes the device camera, global position and microphone, along with other input devices. The system 100 uses the cage data for configuring the interface for the capture process. The interface application 130 can set the guidelines to help the user capture the vehicle within the correct alignment within the photo frame. The interface application 130 includes different vehicle capture modules 132. These capture modules 132 are designed to guide the user through a process of capturing the sufficient number of images that define the appropriate views and a sound bite that the system can use to accurately analyze for replicating a physical inspection for estimating the condition and the required cost for reconditioning. The system 100 uses a recognition engine 120 to visually detect the vehicle's VIN (vehicle identification number) that it decodes to determine the year, make and model of the vehicle. The system 100 uses the recognition engine 120 for analyzing the captured images to determine vehicle metrics such as the exterior and interior color, odometer reading, any detected paint chips, scratches, defects and dents listing the affected body parts and the severity of damage. The recognition engine 120 can process captured images received from vehicle capture modules 132 (and interface application 130) to automatically compute vehicle metrics. The captured images can include metadata defined using vehicle capture modules 132 that can indicate a location relative to the image and a corresponding descriptor label that can indicate a part or component of the vehicle, for example.

The system 100 can also use recognition engine 120 to process image data to detect what the remaining tread life is on the tires, any chips and cracks on any glass parts, condition and type of wheels/rims and any illuminated OBD-2 instrument lights any noises that may indicated engine, exhaust, loose belts or any other audibly detectable mechanical issues. The vehicle capture modules 132 can be used to define metadata that can be processed along with the captured image data to compute vehicle metrics.

These vehicle metrics and reported results can be utilized to populate vehicle valuation tool 126 to calculate and deliver to the seller an accurate market value that can be considered as a trade-in value for the vehicle. This report can also be utilized to populate a third-party vehicle condition report as a third-party validation on an online retail or wholesale marketplace or as a sharable report between parties.

The system 100 empowers the customer, wholesale seller or any member of a retail dealer's staff to conduct an appraisal from any place that has sufficient connectivity to the internet using their mobile device (with interface application 130) at any time. The system 100 can add consistency to a dealership's online and instore appraisal process to ensure that the appropriate details and reports are captured accurately and automatically inputted into legacy systems involved in the appraisal or vehicle reporting process.

The system 100 has an API 124 for integrations with different channels which can enhance the retail experience for the consumer. The API 124 can provide a standardized endpoint that any integration partner can easily ingest data fields that include inspection results, vehicle details, the user information, captured images, annotated images, grading and required repairs that they can implement into their own workflows and user experiences. The consumer can be linked to the system 100 from a retailer's website to perform the vehicle appraisal or the dealer can deliver this link electronically through an email, chat message or SMS, for example. The resulting report that is generated by the system 100 once the consumer captures their trade-in using the link can be sent to the valuation tool for establishing their trade-in values (or system 100 can transmit data for populating a third party tool). The data can automatically populate the customer's vehicle information with the required field information and the system 100 can collect from this tool the resulting market value it generated from this information. Once the system 100 has this trade-in value it can deliver the full appraisal and valuation using the valuation tool 126 along to the retailer's customer relationship management tool (CRM). This same information can also be passed back to the original website that directed the consumer to the system through a link. These integrations will provide the customer consistent online and offline experiences with the retailer as the initial appraisal will never be a repeatable step as it would be without the system.

The following provides an example sample client API response.

```
{

"response": {

"status": "COMPLETE",

"stage": "COMPLETE",

"response_code": null,

"inspection_start": "October 10th, 2019 @ 15:52",

"inspection_end": "October 10th, 2019 @ 15:59",
```

```
"inspection_address": "8277 Lawson Rd, Milton, ON L9T 5C7, Canada",

"inspection_street_num": "8277",

"inspection_street": "Lawson Road",

"inspection_city": "Regional Municipality of Halton",

"inspection_state": "Canada",

"inspection_state_code": "CA",

"inspection_post_code": "-",

"inspection_country": "L9T 5C7",

"inspection_country_code": "L9T 5C7",

"inspection_latitude": "43.543422594",

"inspection_longitude": "-79.883819587"

},

"session_key": "DST-S4PQ0QQDO4",

"inspection_id": "PAV-191010035247-106",

"license": "SteveLicense",

"vehicle": {

"vehicle_id": 2740,

"vin": "5XYKTDA24BG029800",

"year": 2011,

"make": "Kia",

"model": "Sorento",

"body_type": "Wagon 4 Dr.",

"odom_reading": "186,113",

"odom_unit": "KILOMETRES",

"trim": "AWD 4dr V6 Auto LX",
```

```
"trim_title": "AWD 4dr V6 Auto LX",

"mfr_model_code": "SR75KB",

"chrome_style_id": "323707",

"transmission": "Automatic",

"drivetrain": "All Wheel Drive",

"engine_type": "V6 Cylinder Engine",

"fuel_type": "Gasoline Fuel",

"ext_col_name": "Spicy Red Metallic",

"int_col_name": "Gray",

"a_code": "CAC10KIS021F0",

"doors": "4",

"hp_value": "276",

"hp_rpm": "6300",

"torque_value": "248",

"torque_rpm": "5000",

"cylinders": "6",

"displacement": "3.5 liters",

"wheelbase": "106.3",

"fuel_eco_city": "11.1",

"fuel_eco_hwy": "7.9",

"fuel_eco_unit": "L/100 km",

"fuel_cap_high": "68",

"fuel_cap_low": "68",

"fuel_cap_unit": "L",

"ext_color": {
```

```
"ext_color_id": 2312,

"color_code": "IY",

"color_name": "Spicy Red Metallic",

"generic_name": "Red",

"hex_value": "A13F45"

},

"int_color": {

"int_color_id": 1229,

"color_code": "H9",

"color_name": "Gray",

"hex_value": null

},

"paved_trim": {

"trim": "AWD 4dr V6 Auto LX",

"mfr_model_code": "SR75KB",

"chrome_style_id": "323707",

"transmission": "Automatic",

"drivetrain": "All Wheel Drive",

"engine_type": "V6 Cylinder Engine",

"fuel_type": "Gasoline Fuel",

"doors": "4",

"a_code": "CAC10KIS021F0",

"hp_value": "276",

"hp_rpm": "6300",

"torque_value": "248",
```

```
    "torque_rpm": "5000",

"cylinders": "6",

"displacement": "3.5 liters",

"wheelbase": "106.3",

"fuel_eco_city": "11.1",

"fuel_eco_hwy": "7.9",

"fuel_eco_unit": "L/100 km",

"fuel_cap_high": "68",

"fuel_cap_low": "68",

"fuel_cap_unit": "L"

},

"paved_ext_color": {

"ext_color_id": 2312,

"color_code": "IY",

"color_name": "Spicy Red Metallic",

"generic_name": "Red",

"hex_value": "A13F45"

},

"paved_int_color": {

"int_color_id": 1229,

"color_code": "H9",

"color_name": "Gray",

"hex_value": null

},

"paved_package": [
```

```
            ]

},

"inspection": {

"detected_status": [

{

"interior_status": "CLEAN"

},

{

"tire_status": "WORN_MINOR"

}

],

"detected_damages": [

{

"damage_group": "WHEEL",

"component": "WHEEL_FRONT_LEFT",

"user_response": null,

"label": "Has Medium Scuff",

"description": "The wheel has medium scuffing that requires wheel resurfacing.", "tolerance": "The edge of rim has scuff > 10 mm\/1 cm (0.4 inch) but not > 50 mm\/5 cm (2 inches).", "repair_method": "Specialist Repair", "repair_type": "SMART Repair", "unit_measure": "Per Component", "grade_score": 1

},
```

```
{

"damage_group": "WHEEL",

"component": "WHEEL_FRONT_LEFT",

"user_response": "accept",

"label": "The wheel has brake dust stains",

"description": "The wheel has brake dust staining and requires refinishing",

"tolerance": "Missing wheel trims are not acceptable",

"repair_method": "Refinish",

"repair_type": "SMART",

"unit_measure": "Per Item",

"grade_score": 2

},

{

"damage_group": "BODY",

"component": "ROCKER_PANEL_LEFT_UNIQUE",

"user_response": "accept",

"label": "Is Medium Dirty",

"description": "The component is medium dirty and inspection is unable to detect defects.", "tolerance": "The body panel has area(s) on the surface that is dirty.", "repair_method": "Report", "repair_type": "INFO", "unit_measure": "Per Component", "grade_score": 0

},

{
```

"damage_group": "GLASS",

"component": "WINDSHIELD_FRONT_UNIQUE",

"user_response": null,

"label": "Glass Has Minor Chip",

"description": "The glass has minor chip and may need to be replaced.",

"tolerance": "The glass surface has a chip < 25 mm\/2.5 cm (1 inch).",

"repair_method": "Report only",

"repair_type": "INFO",

"unit_measure": "Per Item",

"grade_score": 0

},

{

"damage_group": "PART",

"component": "LIGHT_HEAD_FRONT_LEFT",

"user_response": null,

"label": "Is Dull And Foggy",

"description": "The part dull and foggy and needs to be replaced.",

"tolerance": "The surface is very dull.",

"repair_method": "Replace",

"repair_type": "SMART Repair",

"unit_measure": "Per Component",

"grade_score": 1

},

{

"damage_group": "PART",

"component": "LIGHT_FOG_FRONT_LEFT",

"user_response": null,

"label": "Is Dull And Foggy",

"description": "The part dull and foggy and needs to be replaced.",

"tolerance": "The surface is very dull.",

"repair_method": "Replace",

"repair_type": "SMART Repair",

"unit_measure": "Per Component",

"grade_score": 1

},

{

"damage_group": "PART",

"component": "LIGHT_HEAD_FRONT_RIGHT",

"user_response": null,

"label": "Is Dull And Foggy",

"description": "The part dull and foggy and needs to be replaced.",

"tolerance": "The surface is very dull.",

"repair_method": "Replace",

"repair_type": "SMART Repair",

"unit_measure": "Per Component",

"grade_score": 1

},

{

"damage_group": "PART",

"component": "LIGHT_FOG_FRONT_RIGHT",

```
"user_response": null,

"label": "Is Dull And Foggy",

"description": "The part dull and foggy and needs to be replaced.",

"tolerance": "The surface is very dull.",

"repair_method": "Replace",

"repair_type": "SMART Repair",

"unit_measure": "Per Component",

"grade_score": 1

},

{

"damage_group": "BODY",

"component": "BUMPER_FRONT_UNIQUE",

"user_response": null,

"label": "Has Medium Scratch",

"description": "The scratch is over 1 inch in size to a maximum of 4 inches total and may or may not have some paint damage that requires minor body shop repair.", "tolerance": "Scratch on body panel >25mm (1 inch) in length, may have some damaged paint but is not > 100 mmV10 cm (4 inches).", "repair_method": "Refinish", "repair_type": "Minor Body Shop Repair", "unit_measure": "Per Item", "grade_score": 3

},

{

"damage_group": "BODY",

"component": "BUMPER_FRONT_UNIQUE",
```

```
"user_response": null,

"label": "Has Medium Scratch",

"description": "The scratch is over 1 inch in size to a maximum of 4 inches total and may or may not have some paint damage that requires minor body shop repair.", "tolerance": "Scratch on body panel >25mm (1 inch) in length, may have some damaged paint but is not > 100 mmV10 cm (4 inches).", "repair_method": "Refinish", "repair_type": "Minor Body Shop Repair", "unit_measure": "Per Item", "grade_score": 3

},

{

"damage_group": "TIRE",

"component": "TIRE_FRONT_LEFT",

"user_response": null,

"label": "Is Slightly Worn",

"description": "Shows signs of slight wear is should not need replacing.",

"tolerance": "The tire looks almost new and has very little signs of wear.",

"repair_method": "Report",

"repair_type": "INFO",

"unit_measure": "Per Component",

"grade_score": 0

},

{

"damage_group": "TIRE",

"component": "TIRE_REAR_LEFT",
```

"user_response": null,

"label": "Is Slightly Worn",

"description": "Shows signs of slight wear is should not need replacing.",

"tolerance": "The tire looks almost new and has very little signs of wear.",

"repair_method": "Report",

"repair_type": "INFO",

"unit_measure": "Per Component",

"grade_score": 0

},

{

"damage_group": "TIRE",

"component": "TIRE_FRONT_RIGHT",

"user_response": null,

"label": "Is Slightly Worn",

"description": "Shows signs of slight wear is should not need replacing.",

"tolerance": "The tire looks almost new and has very little signs of wear.",

"repair_method": "Report",

"repair_type": "INFO",

"unit_measure": "Per Component",

"grade_score": 0

},

{

"damage_group": "TIRE",

"component": "TIRE_REAR_RIGHT",

"user_response": null,

"label": "Is Slightly Worn",

"description": "Shows signs of slight wear is should not need replacing.",

"tolerance": "The tire looks almost new and has very little signs of wear.",

"repair_method": "Report",

"repair_type": "INFO",

"unit_measure": "Per Component",

"grade_score": 0

},

{

"damage_group": "PART",

"component": "TRIM_FENDER_REAR_RIGHT",

"user_response": null,

"label": "Has Medium Scratch",

"description": "The part has a small scratch that can be touched up or buffed out.", "tolerance": "The part has a scratch(s) that isVare > 5 mm (0.2 inch) but still < 20 mm V2 cm (0.8 inch)", "repair_method": "Report only", "repair_type": "INFO", "unit_measure": "Per Part", "grade_score": 0

},

{

"damage_group": "WHEEL",

"component": "WHEEL_FRONT_RIGHT",

"user_response": null,

"label": "The wheel has brake dust stains",

"description": "The wheel has brake dust staining and requires refinishing",

"tolerance": "Missing wheel trims are not acceptable",

"repair_method": "Refinish",

"repair_type": "SMART",

"unit_measure": "Per Item",

"grade_score": 2

},

{

"damage_group": "WHEEL",

"component": "WHEEL_REAR_RIGHT",

"user_response": null,

"label": "The wheel has brake dust stains",

"description": "The wheel has brake dust staining and requires refinishing",

"tolerance": "Missing wheel trims are not acceptable",

"repair_method": "Refinish",

"repair_type": "SMART",

"unit_measure": "Per Item",

"grade_score": 2

},

{

"damage_group": "BODY",

"component": "ROCKER_PANEL_RIGHT_UNIQUE",

"user_response": null,

"label": "Has Medium Scratch",

"description": "The scratch is over 1 inch in size to a maximum of 4 inches total and may or may not have some paint damage that requires minor body shop repair.", "tolerance": "Scratch on body panel >25mm (1 inch) in length, may have some damaged paint but is not > 100 mm√10 cm (4 inches).", "repair_method": "Refinish", "repair_type": "Minor Body Shop Repair", "unit_measure": "Per Item", "grade_score": 3

},

{

"damage_group": "BODY",

"component": "DOOR_REAR_RIGHT",

"user_response": null,

"label": "Paint Has Small Chip",

"description": "The paint has a small chip that can be touched-up.",

"tolerance": "Not covered in BVRLA",

"repair_method": "Report",

"repair_type": "INFO",

"unit_measure": "Per Component",

"grade_score": 0

},

{

"damage_group": "GLASS",

"component": "WINDOW_REAR_UNIQUE",

"user_response": null,

"label": "Glass Is Medium Dirty",

"description": "The glass is covered with a medium amount of dirt, mud or snow and cannot be inspected.", "tolerance": "The glass surface is dirty and is hard to inspect.",

```
"repair_method": "Report",

"repair_type": "INFO",

"unit_measure": "Per Component",

"grade_score": 0

},

{

"damage_group": "GLASS",

"component": "WINDOW_REAR_UNIQUE",

"user_response": null,

"label": "Glass Has Medium Scratch",

"description": "The glass has a medium scratch and needs to be professionally repaired.", "tolerance": "The glass surface has scratch > 25 mm\/2.5 cm (1 inch) but not > 50 mm\/5 cm (2 inches).", "repair_method": "Glass Repair", "repair_type": "SMART Repair", "unit_measure": "Per Item", "grade_score": 3

},

{

"damage_group": "PART",

"component": "EXHAUST_TIPS_RIGHT",

"user_response": null,

"label": "Has Medium Rust",

"description": "The part has a medium amount of rust and may require replacement.", "tolerance": "The part has a small area of rust on the surface that is > 1 cm but not > 2.5 cm (1 inch).", "repair_method": "Replace",
```

```
"repair_type": "SMART Repair",

"unit_measure": "Per Component",

"grade_score": 1

},

{

"damage_group": "BODY",

"component": "HATCH_REAR_UNIQUE",

"user_response": null,

"label": "Has Medium Dent",

"description": "The dent is over 1 inch in size to a maximum of 4 inches total and may or may not have some paint damage that requires minor body shop repair.", "tolerance": "Small dent on body that is < 25 mm\/2.5 cm may have some damage to paint but not > 100 mm\/10 cm (4 inches)", "repair_method": "PDR (Cold Metal Repair)", "repair_type": "SMART Repair", "unit_measure": "Per Item", "grade_score": 1

},

{

"damage_group": "GLASS",

"component": "WINDSHIELD_FRONT_UNIQUE",

"user_response": null,

"label": "Glass Has Medium Scratch",

"description": "The glass has a medium scratch and needs to be professionally repaired.", "tolerance": "The glass surface has scratch > 25 mm\/2.5 cm (1 inch) but not > 50 mm\/5 cm (2 inches).", "repair_method": "Glass Repair",
```

"repair_type": "SMART Repair",

"unit_measure": "Per Item",

"grade_score": 3

},

{

"damage_group": "GLASS",

"component": "WINDSHIELD_FRONT_UNIQUE",

"user_response": null,

"label": "Glass Is Medium Dirty",

"description": "The glass is covered with a medium amount of dirt, mud or snow and cannot be inspected.", "tolerance": "The glass surface is dirty and is hard to inspect.", "repair_method": "Report", "repair_type": "INFO", "unit_measure": "Per Component", "grade_score": 0

},

{

"damage_group": "GLASS",

"component": "WINDSHIELD_FRONT_UNIQUE",

"user_response": null,

"label": "Glass Is Medium Dirty",

"description": "The glass is covered with a medium amount of dirt, mud or snow and cannot be inspected.", "tolerance": "The glass surface is dirty and is hard to inspect.", "repair_method": "Report", "repair_type": "INFO",

```
      "unit_measure": "Per Component",

"grade_score": 0

}

],

"grading": {

"standard_A": 2,

"standard_B": "D",

"standard_C": "Poor Condition"

},

"total_estimates": 28

},

"images": {

"photo_codes": {

"01": {

"type": "vinBarcode",

"label": "The VIN Barcode"

},

"02": {

"type": "interiorView",

"label": "Interior View"

},

"03": {

"type": "instrumentCluster",

"label": "Instrument Cluster"

},
```

```
"04": {

"type": "exteriorView",

"label": "Left View",

"cageCode": "01"

},

"05": {

"type": "exteriorView",

"label": "Front View",

"cageCode": "02"

},

"06": {

"type": "treadView",

"label": "Tread View"

},

"07": {

"type": "exteriorView",

"label": "Right View",

"cageCode": "03"

},

"08": {

"type": "exteriorView",

"label": "Rear View",

"cageCode": "04"

},

"09": {
```

```
            "type": "exteriorView",

"label": "Windshield View",

"cageCode": "02"

}

},

"original_images": {

"01": [

"https:V/images.paveapi.comV/DSTV/DST-S4PQ0QQDO4V/DST-S4PQ0QQDO4_01.png"

],

"02": [

"https:V/images.paveapi.comV/DSTV/DST-S4PQ0QQDO4V/DST-S4PQ0QQDO4_02.png"

],

"03": [

"https:V/images.paveapi.comV/DSTV/DST-S4PQ0QQDO4V/DST-S4PQ0QQDO4_03.png"

],

"04": [

"https:V/images.paveapi.comV/DSTV/DST-S4PQ0QQDO4V/DST-S4PQ0QQDO4_04.png"

],

"05": [

"https:V/images.paveapi.comV/DSTV/DST-S4PQ0QQDO4V/DST-S4PQ0QQDO4_05.png"

],

"06": [

"https:V/images.paveapi.comV/DSTV/DST-S4PQ0QQDO4V/DST-S4PQ0QQDO4_06.png"

],

"07": [
```

```
        "https:\/\/images.paveapi.com\/DST\/DST-S4PQ0QQDO4\/DST-S4PQ0QQDO4_07.png"

],

"08": [

"https:\/\/images.paveapi.com\/DST\/DST-S4PQ0QQDO4\/DST-S4PQ0QQDO4_08.png"

],

"09": [

"https:\/\/images.paveapi.com\/DST\/DST-S4PQ0QQDO4\/DST-S4PQ0QQDO4_09.png"

]

},

"annotated_images": {

"01": [ null

],

"02": [ null

],

"03": [ null

],

"04": [

"https:\/\/agent.paveapi.com\/public\/inspections\/PAV-191010035247-106\/04\/04-annotated.jpg"

],

"05": [

"https:\/\/agent.paveapi.com\/public\/inspections\/PAV-191010035247-106\/05\/05-annotated.jpg"

],
```

```
"06": [ null

],

"07": [

"https:\/\/agent.paveapi.com\/public\/inspections\/PAV-191010035247-106\/07\/07-annotated.jpg"

],

"08": [

"https:\/\/agent.paveapi.com\/public\/inspections\/PAV-191010035247-106\/08\/08-annotated.jpg"

],

"09": [

"https:\/\/agent.paveapi.com\/public\/inspections\/PAV-191010035247-106\/09\/09-annotated.jpg"

]

}

},

"seller_announcements": {

"TITLE_PRESENT": null,

"ALL_KEYS_PRESENT": null,

"BOOKS_PRESENT": null,

"DISCS_PRESENT": null,

"RIMS_TIRES": null,

"OTHER_ANNOUNCEMENTS": ""

},

"seller_disclosures": {

"TITLE_ORIGIN": {

"GREY_MARKET": null,
```

```
"INCORRECT_VEHICLE_MARKING": null,

"MANUFACTURER_REPURCHASE": [

],

"OUT_OF_STATE": [

],

"TITLE_BRANDED": false,

"TOTAL_LOSS": null,

"CROSS_BOARDER": null,

"VIN_PLATE_ISSUES": null,

"WARRANTY_CANCELLED": null,

"STOLEN_AND_RECOVERED": null

},

"ODOMETER": {

"ODOM_5_DIGIT": null,

"ODOM_FAULTY": null,

"ODOM_IN_OTHER": null,

"ODOM_REPLACED": null,

"ODOM_ROLL_BACK": null,

"ODOM_UNREADABLE": null,

"TMU": null,

"RMU": [

]
```

},

"DAMAGE": {

"ACCIDENT_REPAIR": 0,

"ADJACENT_PANELS_REPLACED": null,

"EXCESSIVE_RUST": null,

"FIRE_DAMAGE": null,

"FLOOD_DAMAGE": false,

"IRREPARABLE": null,

"STRUCTURAL_DAMAGE": null

},

"MECHANICAL": {

"ABS_DEFECTIVE": null,

"AIR_BAG_DEFECTIVE": null,

"ALTERNATE_FUEL": null,

"NONE_SPECS": null,

"MAJOR_REPAIR": [

]

},

"PREVIOUS USER": {

"PREVIOUS_DAILY_RENTAL": null,

"PREVIOUS_DRIVING_SCHOOL_VEHICLE": null,

"PREVIOUS_POLICE_VEHICLE": null,

"PREVIOUS_TAXI_LIMO": null

}

```
    },
    "condition_report": "https:\/\/reports.paveapi.com\/api\/report\/DST-S4PQ0QQDO4",
    "case_details": {
        "case_id": "DST-S4PQ0QQDO4",
        "case_start_time": "2019-10-10T15:52:47.618Z",
        "case_end_time": "2019-10-10T15:57:07.579Z"
    },
    "pave_disclosure": "DISCLOSURE AGREEMENT",
```

The system 100 has vehicle capture tools 132 that can be used to generate different interfaces as part of interface application. The vehicle capture tools 132 facilitate the capture of image data of the vehicle. The vehicle capture tools 132 provide an intuitive user interface application 130 that can be optimized for use on a mobile device. This interface application 130 is delivered to the user as a sharable or clickable online link that when opened can guide the user through the process with interactive interfaces that access the camera and microphone of the device without requiring the user to download an application. The system 100 generates dynamic interfaces (for interface application 130) that adapt to the type of vehicle that has been recognized by first decoding the VIN. The VIN can be determined by scanning the vehicle barcode for example. This allows the system 100 to configure interface guides (as part of the vehicle capture modules 132) that are specific for each vehicle type to ensure the right perspectives and angles are captured for each of the necessary views. The guides can also be used to define labels that in turn define metadata for the image. The metadata can link a location of the image of the vehicle with a descriptor or label. The interface application 130 can also include a conversational element that can personalize the dialog with the user for exceptions and any confirmation of results or disclosures that may be required. The vehicle capture tools 132 can include additional user interfaces to include steps like gathering a customer disclosure statement that may be required by regulations specific to the region of the user. The interface application 130 also provides the user with an easy to understand criteria for what has impacted their vehicle's valuation (as computed by valuation tool 126) by highlighting any discovered defects and the system 100 presents how this value was calculated.

The system 100 can have a reconditioning cost estimate tool 122. The system 100 can be trained with industry specific knowledge for the ability to appropriately inspect the vehicle using a method for automotive appraisal that can assess the vehicle's value. As the system 100 uses the recognition engine 120 to analyze the captured images and sounds it detects defects that the system's reconditioning cost estimator tool 122 can use to calculate the estimated cost of repairs required to recondition the vehicle. This estimation can be determined by configured costs that are broken down by vehicle type, what part or section of the vehicle is affected and the type of repairs. The cost estimate tool 122 averages historical cost for equivalent repairs in the market area of the user. The reconditioning cost estimator tool 122 also evaluates an overall grading of the vehicle that can assist in establishing an accurate value. The reconditioning cost estimator tool 122 can also provide a method for calculating the impact for less desirable vehicle attributes that are beyond just the condition; such as if the vehicle was a specific color that is known to be undesirable or a color that is known to be very desirable the system 100 can add or subtract these impacts using the reconditioning cost estimator tool 122.

The system 100 has a recognition engine 120 that can process image and audio data to compute vehicle metrics. The recognition engine 120 processes the images and sounds (or audio data) that are captured by the vehicle capture modules 132. Images initially are processed to determine if the images can be processed by determining if the appropriate brightness, clarity of the images as well as the cleanliness of the vehicle. If the images cannot be processed this is communicated to the user through interfaces of the vehicle capture module 132 along with further instructions. If the user is unable to rectify the issue due to surroundings, time-of-day or weather the system 100 is able to schedule a notification for another date and time to complete the appraisal. Images by the recognition engine 120 are then processed to identify specific sections and body parts of the vehicle. The recognition engine 120 uses cages to identify different locations or components of the vehicle shown in the images. The damage shown in the image is then linked to the respective location or component of the vehicle. These sections are then inspected by the system 100 to detect any defects or issues. Images containing the vehicle's VIN are processed and the detected barcode and data is sent to an integrated VIN decoder to gather the vehicle metrics like year, make, model and trim. Images of the tire tread can be analyzed to detect the depth of the tread, any signs of weathering and tire type. The images of the instrument cluster are processed to recognize characters to capture the odometer reading and if the mileage is measured in kilometers or miles. Sound bites are analyzed and compared to detect if any abnormal sounds are detected that may indicate possible technical issues of the vehicle.

The system 100 can generate a live data training agent interface (which can be integrated as part of interface application 130). As the user captures their vehicle using the vehicle capture modules 132 the images can be first processed through the live data training agent interface that dispatches each image and sound to a live agent that is on a workstation connected to a graphical interface. The system 100 can use an improved image dispatch process to assign tasks for a set of images to a set of agents for processing. The system 100 can dispatch images to different agents (via interface application 130). The interface assigns tasks to each agent by displaying prompts or input data fields for different tasks on the interface application 130. Example tasks include: to e confirm the clarity of the image and indicate reasons they cannot be processed, or the agent can be tasked to drag and drop the appropriate outlines of each section of the vehicle to add the system for categorizing the images or manually input recognized characters found on the instrument cluster, or drag and drop shapes that illustrate specific defects to the affected part of the vehicle, or drag and drop indicators of tire type and dread depth when inspecting the tire tread images. As the live data agent completes each task the system 100 defines the relevant information that is then passed to the reconditioning cost estimator 122 and adds each categorized sound and image to the appropriate data training models to increase the system's ability to perform these tasks autonomously when the required amount of data has been captured, processed and trained.

The system 100 includes an API 124 for integration with other systems and components. To provide the user with a better omnichannel experience the system 100 can use an API to integrate into industry specific tools and systems to pass data for automating other processes and experiences. These can include and are not limited to automotive customer management tools, to add additional capabilities to an existing vehicle valuation or appraising tools, and the website that directed the user.

The system 100 includes a market valuation tool 125 to compute an estimation of the market value for the vehicle. The market valuation tool 125 can use the vehicle metrics and cost data for computing the market value estimation. The value for a specific vehicle can be accurately generated by compiling historical transaction and advertised market listings. Local retail listing information is captured by crawling published advertisements and the used vehicle inventory listed on local dealership's websites to match the appraised vehicle with market information of similar vehicles. This information is compared from additional data captured from wholesale auctions that provide actual wholesale auction sales results. When a dealership integrates their CRM the system also captures the dealer's previous sales transactions for comparison. To reinforce the training of these data models, each appraisal can be validated by tracking the final sale price of the vehicle when it eventually does get sold.

The I/O unit 102 can enable the system 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the system 100 to communicate with other components, to exchange data with other components, to access and connect to network resources, to serve applications, and perform other computing applications by connecting to a network 140 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The system 100 can be operable to register and authenticate users (using a login, unique identifier, and password for example) prior to providing access to applications, a local network, network resources, other networks and network security devices. The system 100 can connect to different machines, entities 140, and/or data sources 150 (linked to databases 160).

The data storage 110 may be configured to store information associated with or created by the system 100, such as for example image data, metadata, vehicle metrics, cost data, valuation reports and so on. The data storage 160 may be a distributed storage system, for example. The data storage 110 can implement databases, for example. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

The system 100 can work in a drive through environment (e.g. an enclosed area with cameras and microphones situated at desired locations to collect the required data as a user drives into the area). The VIN and vehicle display aspects can be captured separately.

FIGS. 2 to 30 are example interfaces for the system 100 for vehicle appraisals according to some embodiments. The interfaces can be part of interface application 130 and vehicle capture modules 132.

Figure 2:
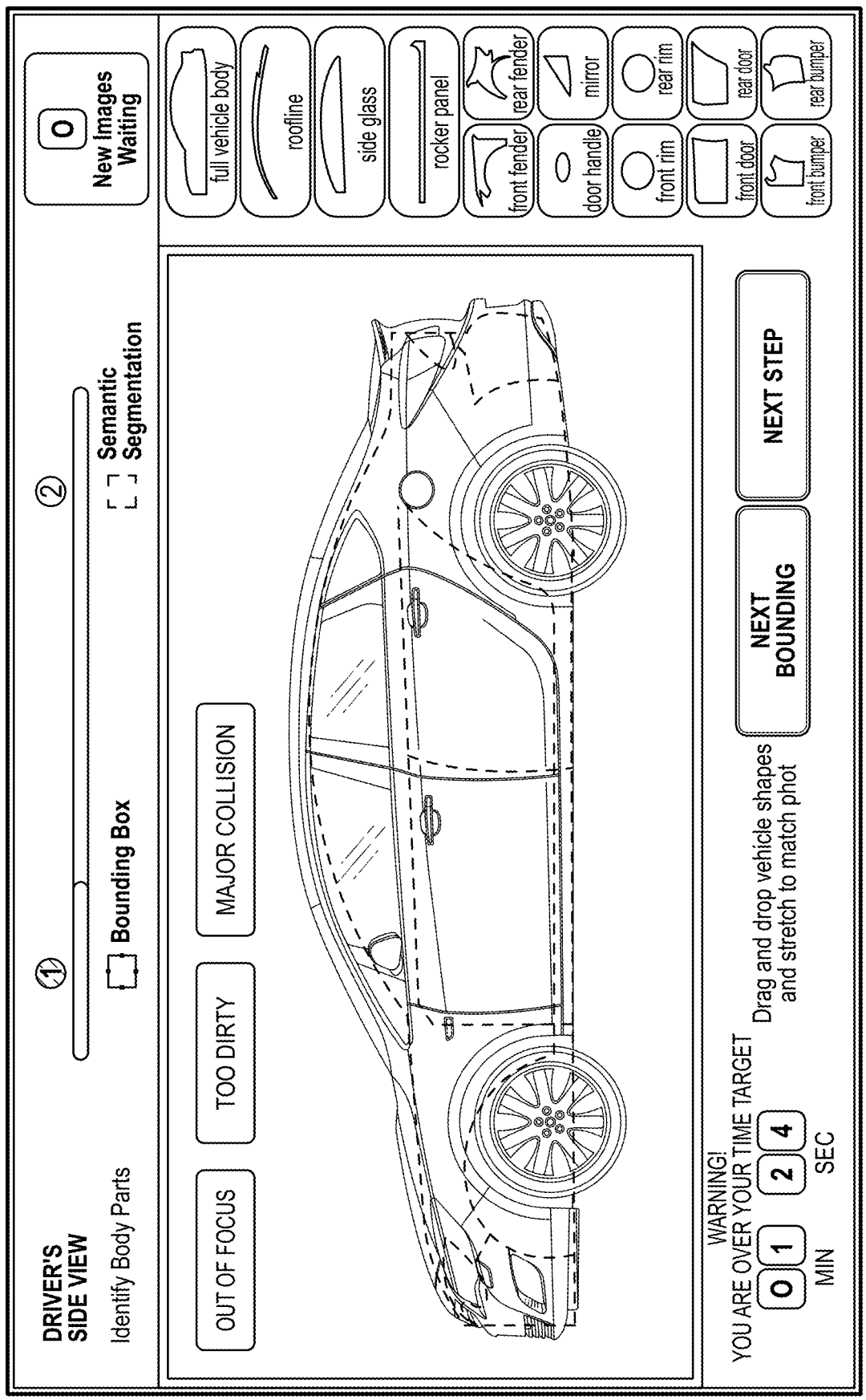
FIG. 2 is an example interface of a system for vehicle appraisals according to some embodiments.

FIG. 2 shows an example interface that can facilitate capturing an image of a car (or other vehicle) to be appraised by system 100. The interface can provide feedback on the image capture process to improve the quality of the images. The example image is of the driver side view. The interface can include a vehicle image overlay that can be aligned with the vehicle during the image capture process. The interface can include different indicia or buttons that can be used to identify different parts of the vehicle to be provided as metadata to the recognition engine 120, for example. The indicia can trigger generation of an overlay for different components of the vehicle. The indicia can be selected and dropped into the image using a touch interface, for example. The indicia can be used to indicate the full vehicle body, the roofline, side glass, rocker panel, front fender, rear fender, door handle, mere, front rim, rear room, front door, rear door, front bumper, rear bumper, and so on. The interface can include indicia to create a bounding box around the vehicle to assist the recognition engine 120, for example. The interface can include indicia to create semantic segmentation to assist the recognition engine 120. The metadata can link a location of the image (e.g. ROI) with a descriptor label.

Figure 3:
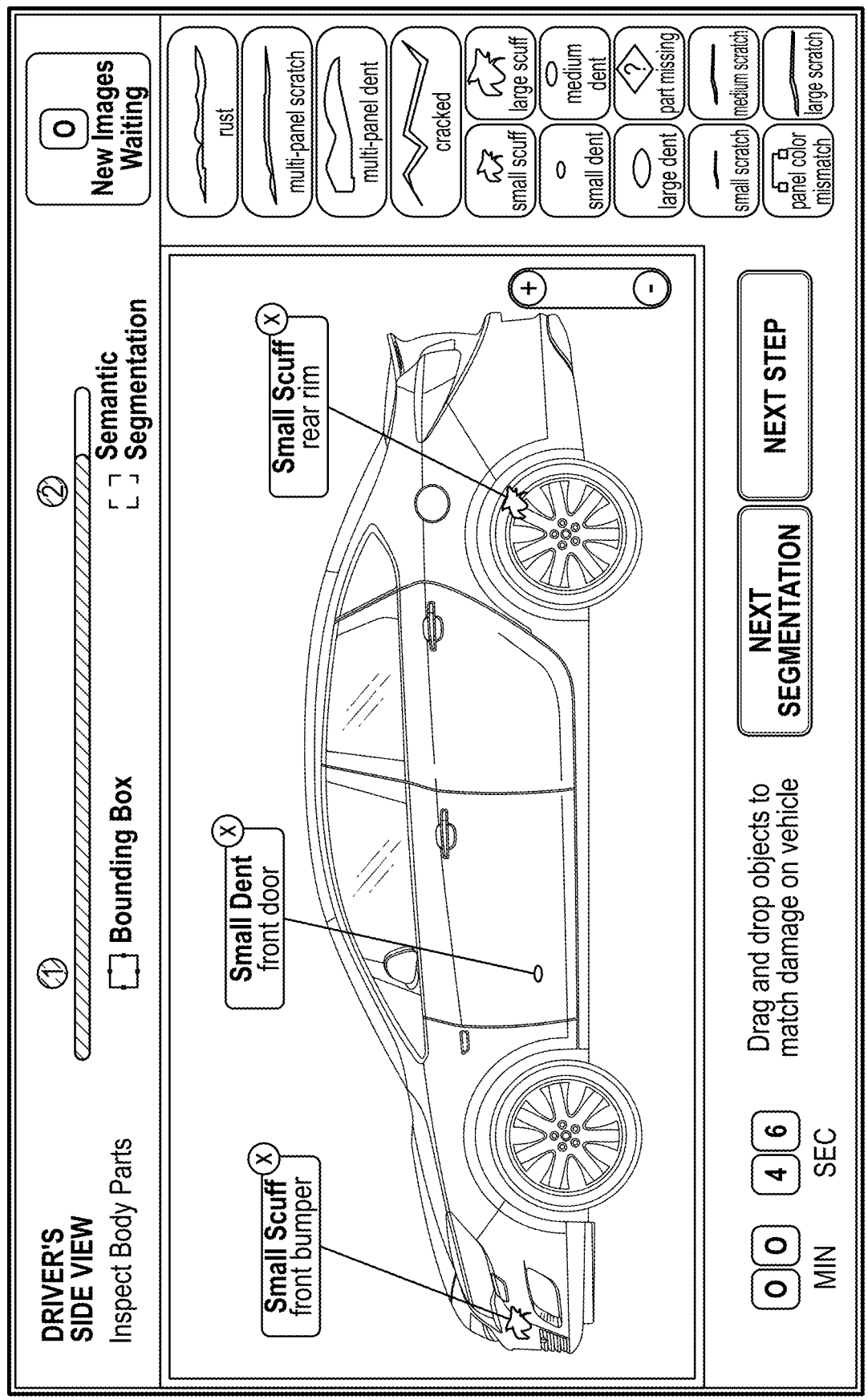
FIG. 3 is an example interface of a system for vehicle appraisals according to some embodiments.

FIG. 3 is an example interface that can indicate damage or defect labels on the image of the vehicle from the driver side view. The interface can include indicia or buttons that can be used generate damage or defect labels to identify different defects on the vehicle. The damage and defect labels can be used as metadata by the recognition engine 120. The indicia can be selected and dropped into the image using a touch interface for example. The indicia can be used to indicate a small scuff, a small dent, rust, scratch, crack, and so on. The metadata can link a location of the image (e.g. ROI) with a descriptor label.

Figure 4:
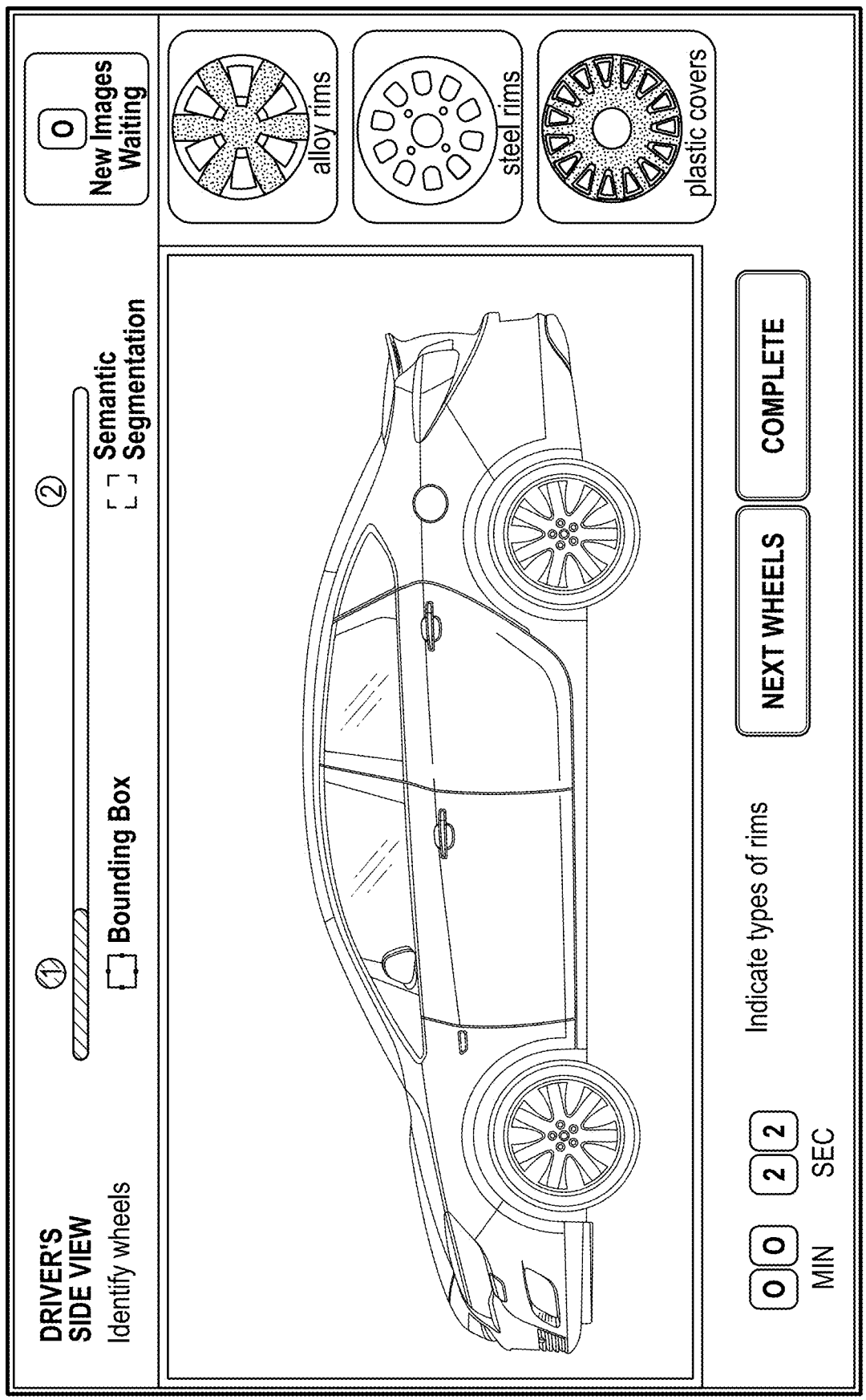
FIG. 4 is an example interface of a system for vehicle appraisals according to some embodiments.

FIG. 4 is an example interface that can indicate aspects of the vehicle wheels, such as the tires or rims for example. The interface can include indicia or buttons that can be used to generate labels to identify different tires or rims on the vehicle image. The labels can be used as metadata by the recognition engine 120. The metadata can link a location of the image (e.g. ROI) with a descriptor label.

Figure 5:
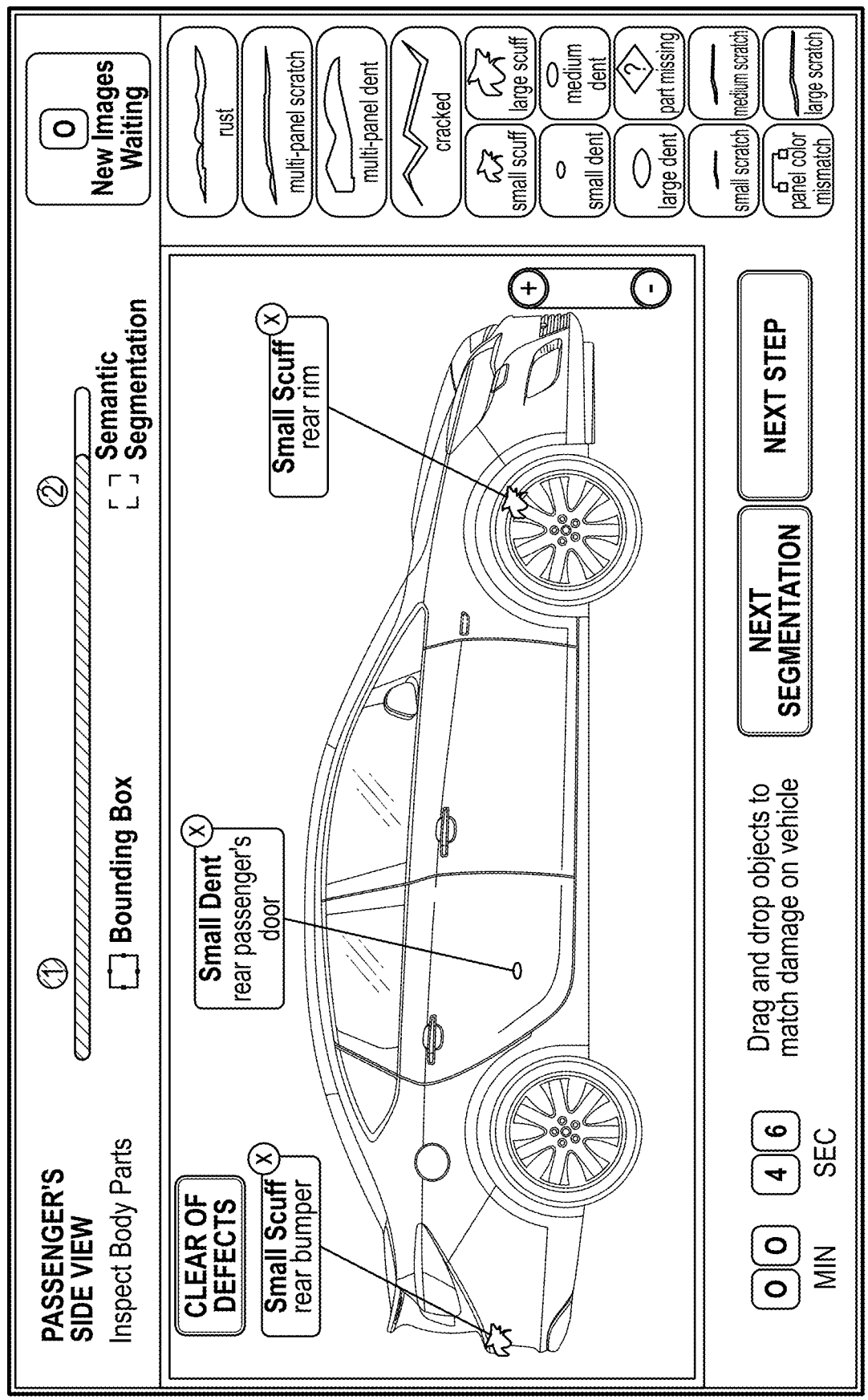
FIG. 5 is an example interface of a system for vehicle appraisals according to some embodiments.

FIG. 5 is an example interface that can indicate damage or defect labels on the image of the vehicle from the passenger side view. The interface can include indicia or buttons that can be used generate damage or defect labels to identify different defects on the vehicle. The damage and defect labels can be used as metadata by the recognition engine 120. The metadata can link a location of the image (e.g. ROI) with a descriptor label.

Figure 6:
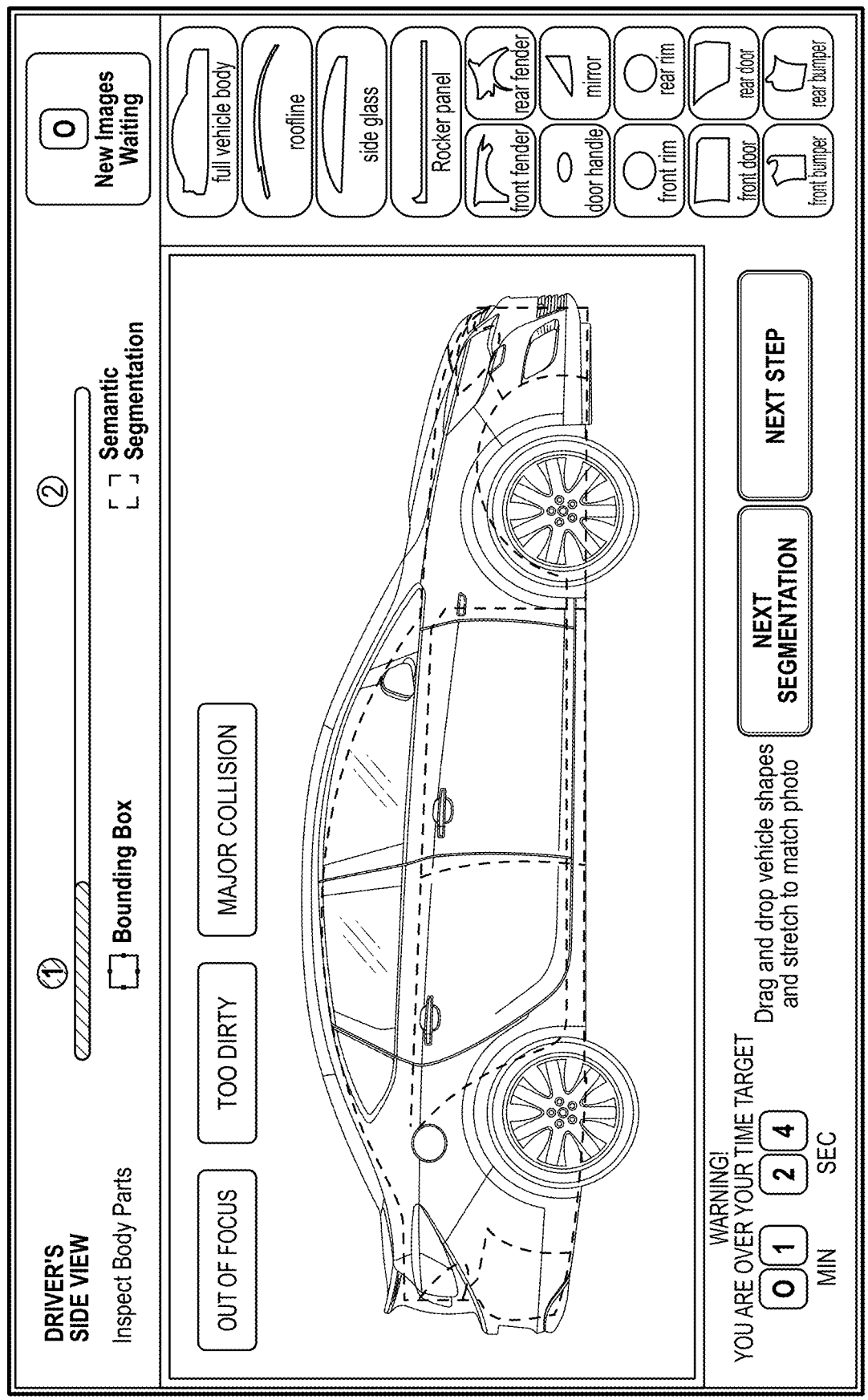
FIG. 6 is an example interface of a system for vehicle appraisals according to some embodiments.

FIG. 6 is an example interface that can facilitate capturing an image of a car to be appraised by system 100. The interface can provide feedback on the image capture process to improve the quality of the images. The sample image is of the passenger side view. The interface includes indicia or button to add labels to the image that can be used as metadata by the recognition engine 120.

Figure 7:
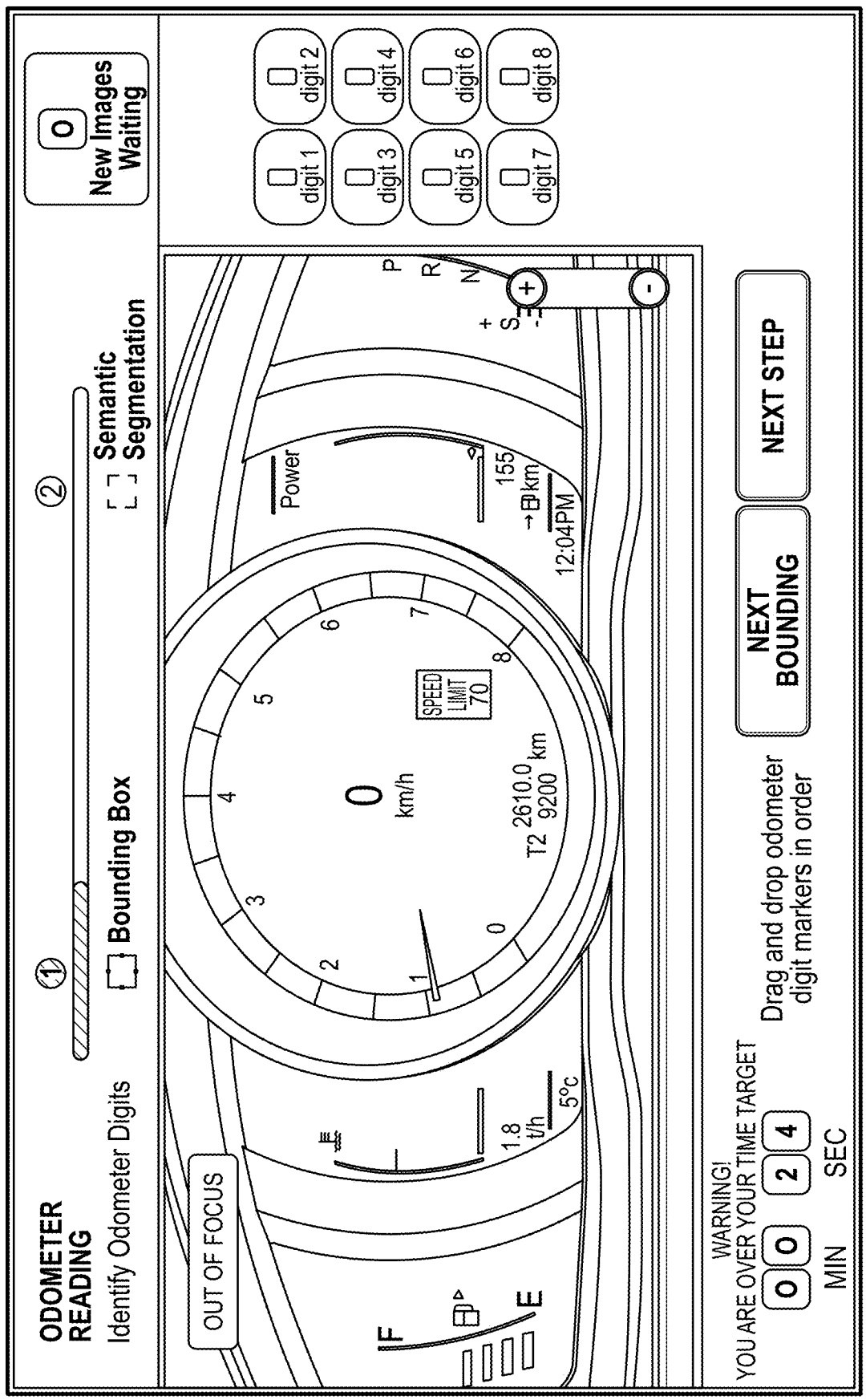
FIG. 7 is an example interface of a system for vehicle appraisals according to some embodiments.
Figure 8:
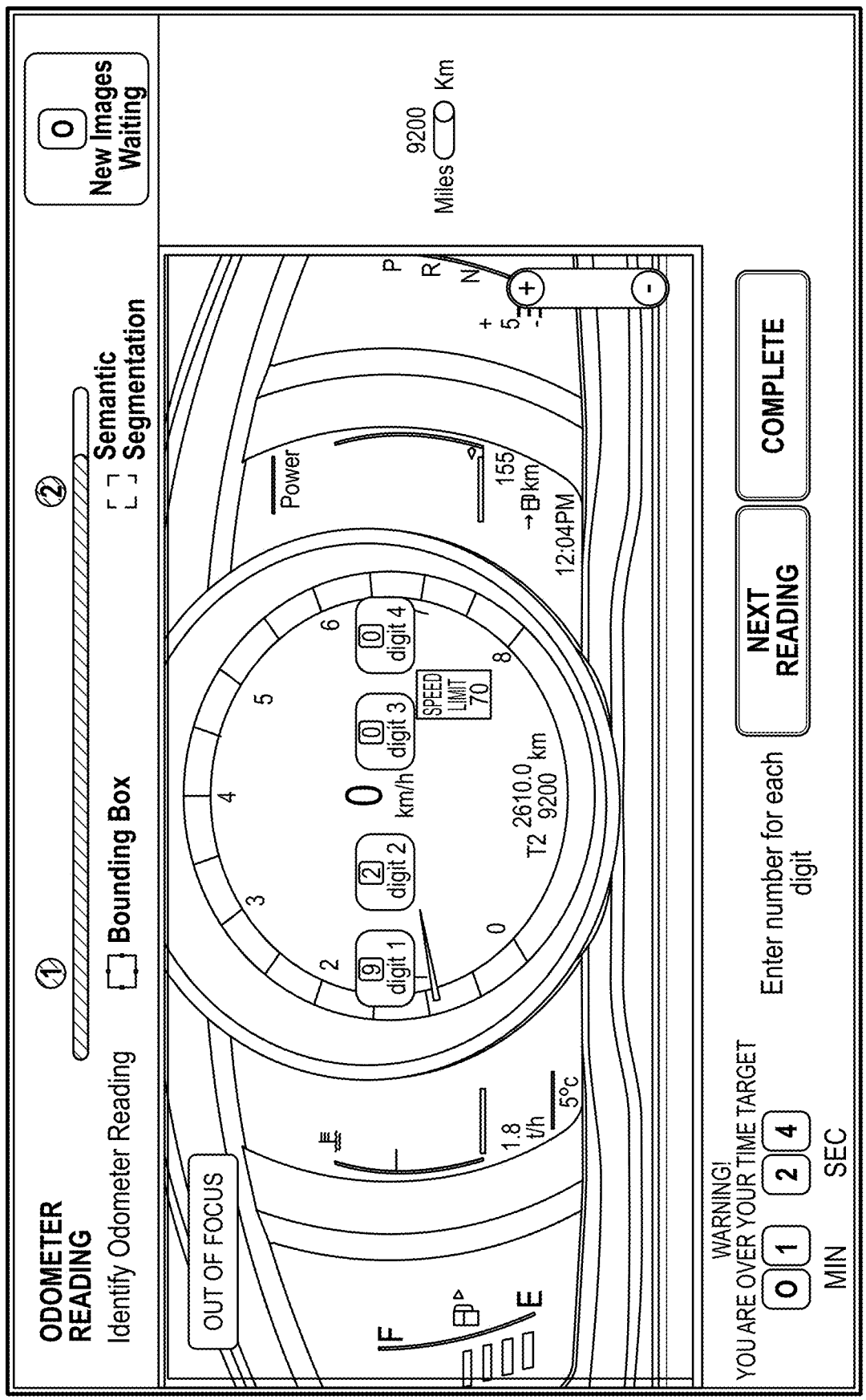
FIG. 8 is an example interface of a system for vehicle appraisals according to some embodiments.

FIG. 7 is an example interface that can facilitate capturing an image of the odometer. The image of the odometer can be used to capture data relating to vehicle usage. The interface can include different indicia to add digit labels to help with the character recognition process. FIG. 8 is an example interface with an image of the odometer including the digit labels to facilitate the mileage recognition process and can also be used to indicate the units of the value.

Figure 9:
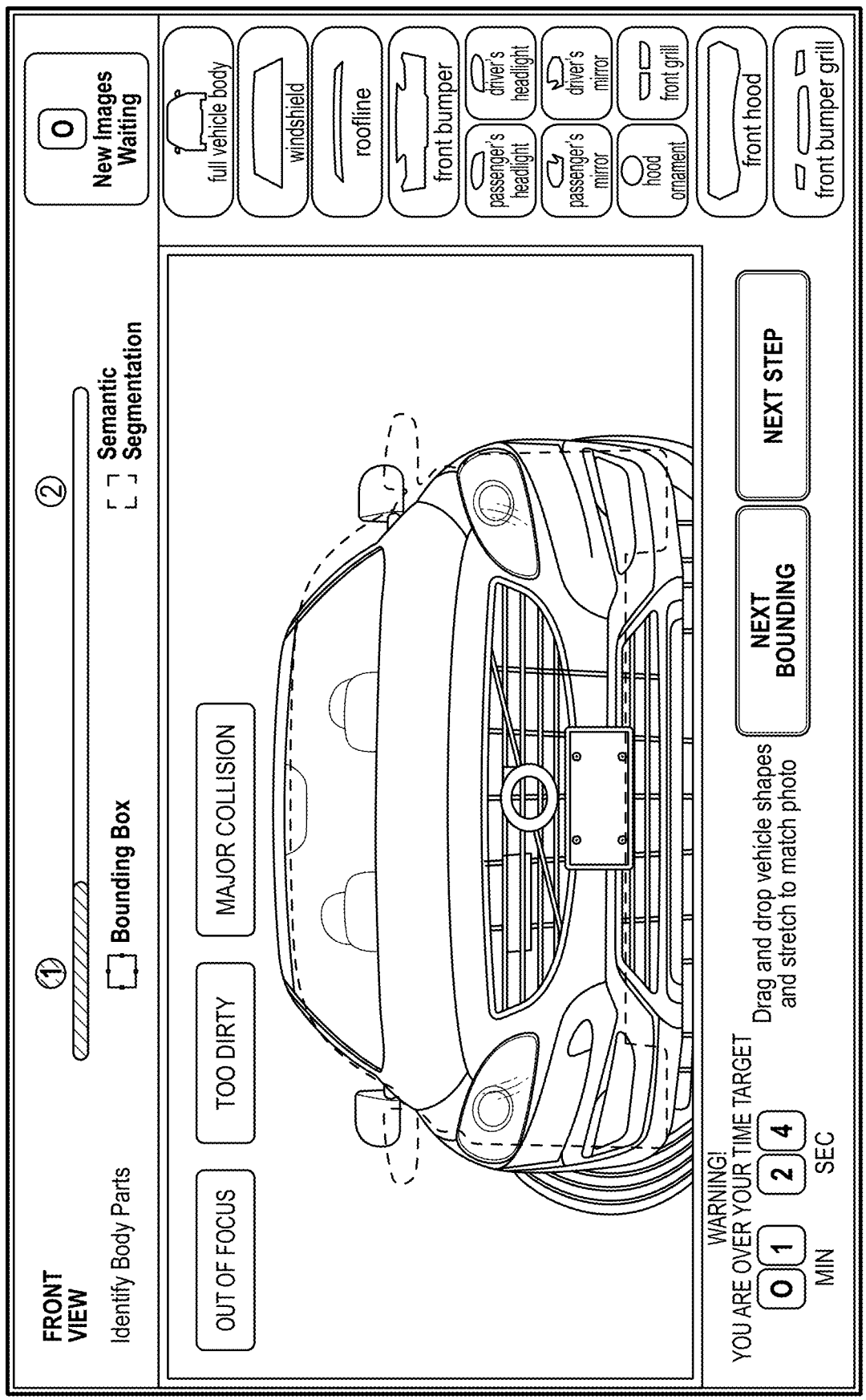
FIG. 9 is an example interface of a system for vehicle appraisals according to some embodiments.

FIG. 9 is an example interface that can facilitate capturing an image of a car to be appraised by system 100. The interface can provide feedback on the image capture process to improve the quality of the images. The sample images of the front view. The interface can include indicia or buttons that can be used to label different components of the vehicle. Example components include windshield, roofline, front bumper, headlight, mirror, hood ornament, grill, and so on.

Figure 10:
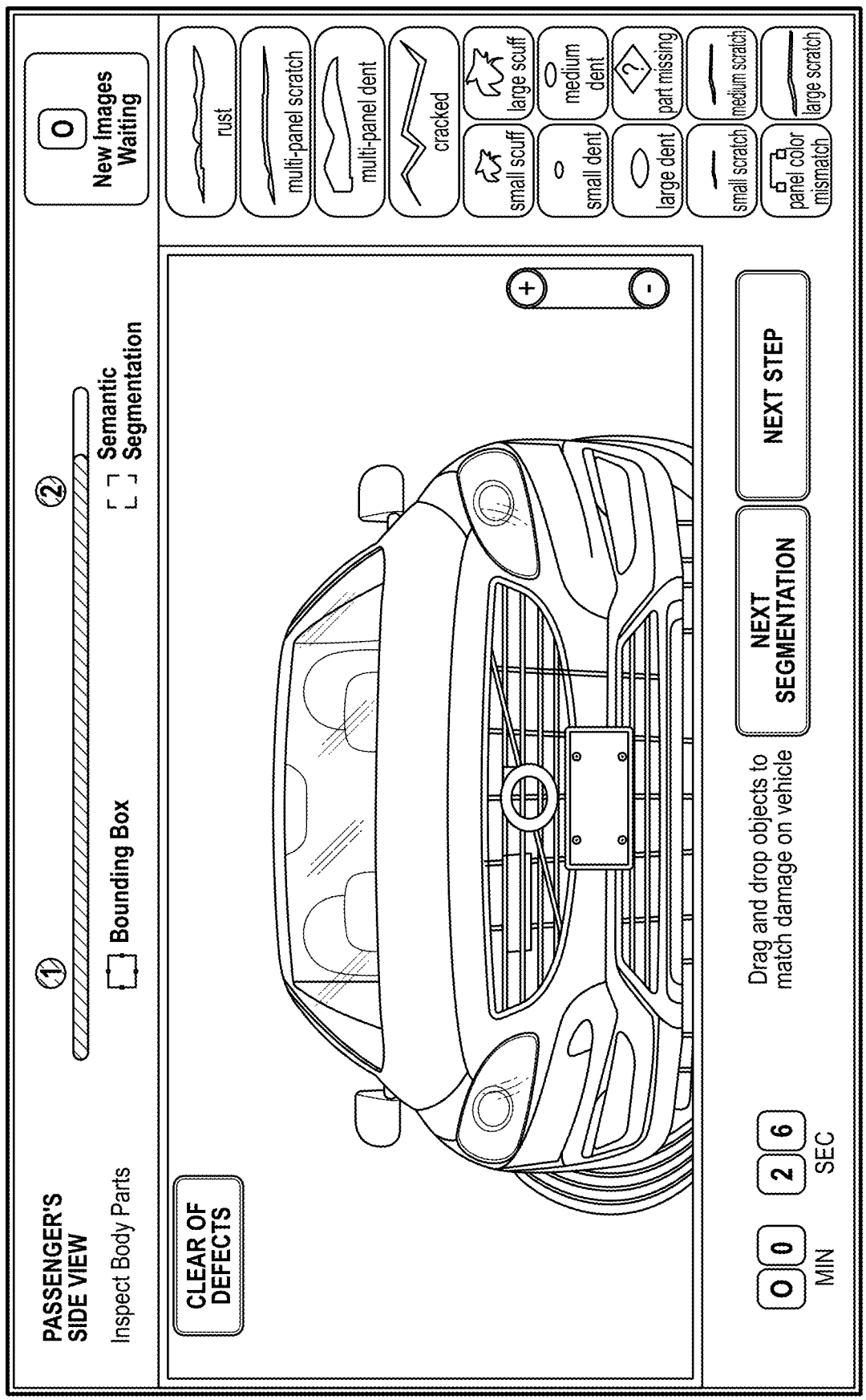
FIG. 10 is an example interface of a system for vehicle appraisals according to some embodiments.

FIG. 10 is an example interface that can facilitate labelling an image of a vehicle with defect labels. The example image is of the front view. An example label can indicate that the images clear of defects which can be used as metadata by the recognition engine 120.

Figure 11:
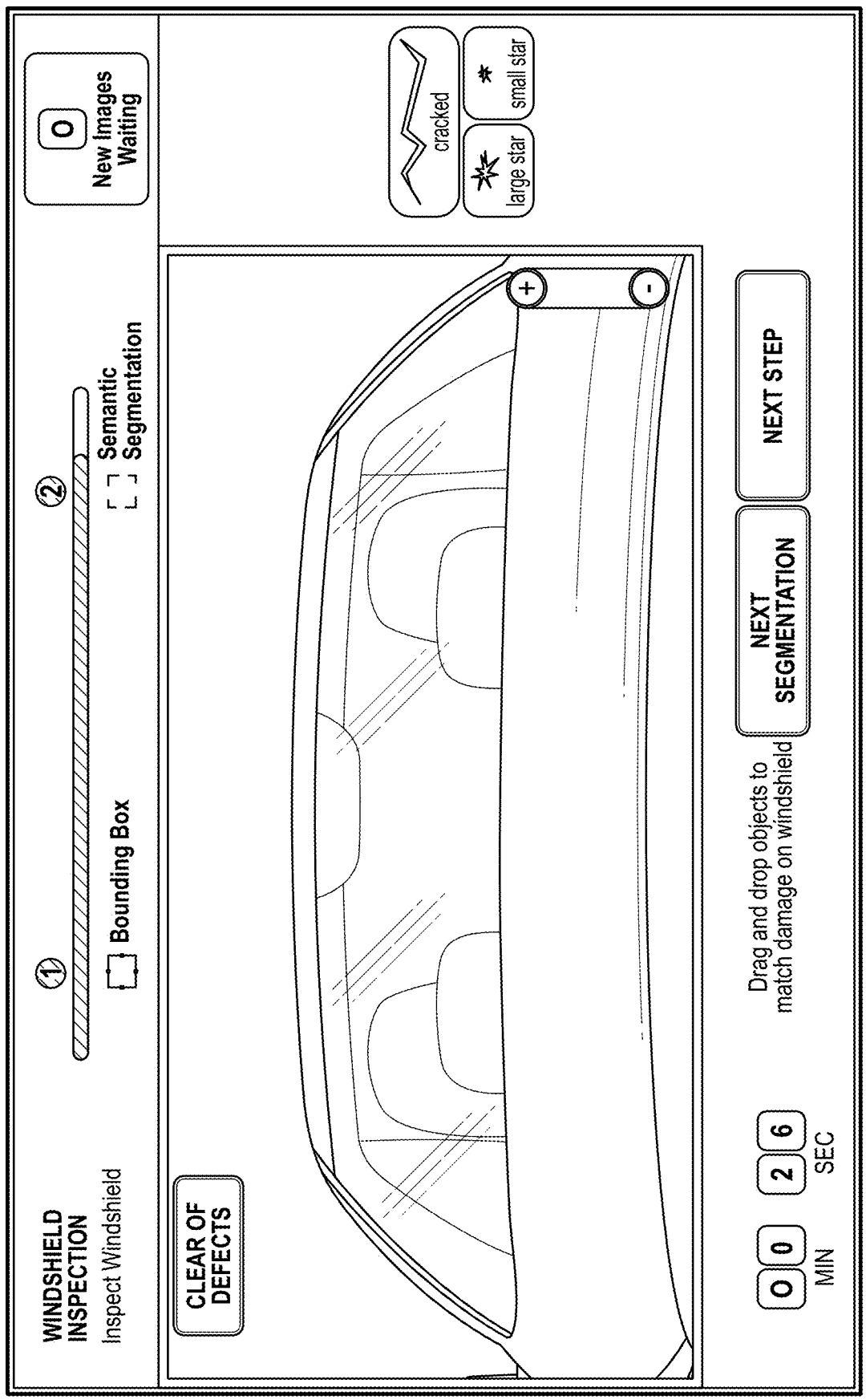
FIG. 11 is an example interface of a system for vehicle appraisals according to some embodiments.

FIG. 11 is an example interface that can facilitate capturing an image of a windshield of the vehicle to facilitate the windshield inspection process by recognition engine 120. The interface can include indicia to label defects of the windshield such as cracks or stars. The labels can be used as metadata by the recognition engine 120. The metadata can link a location of the image (e.g. ROI) with a descriptor label.

Figure 12:
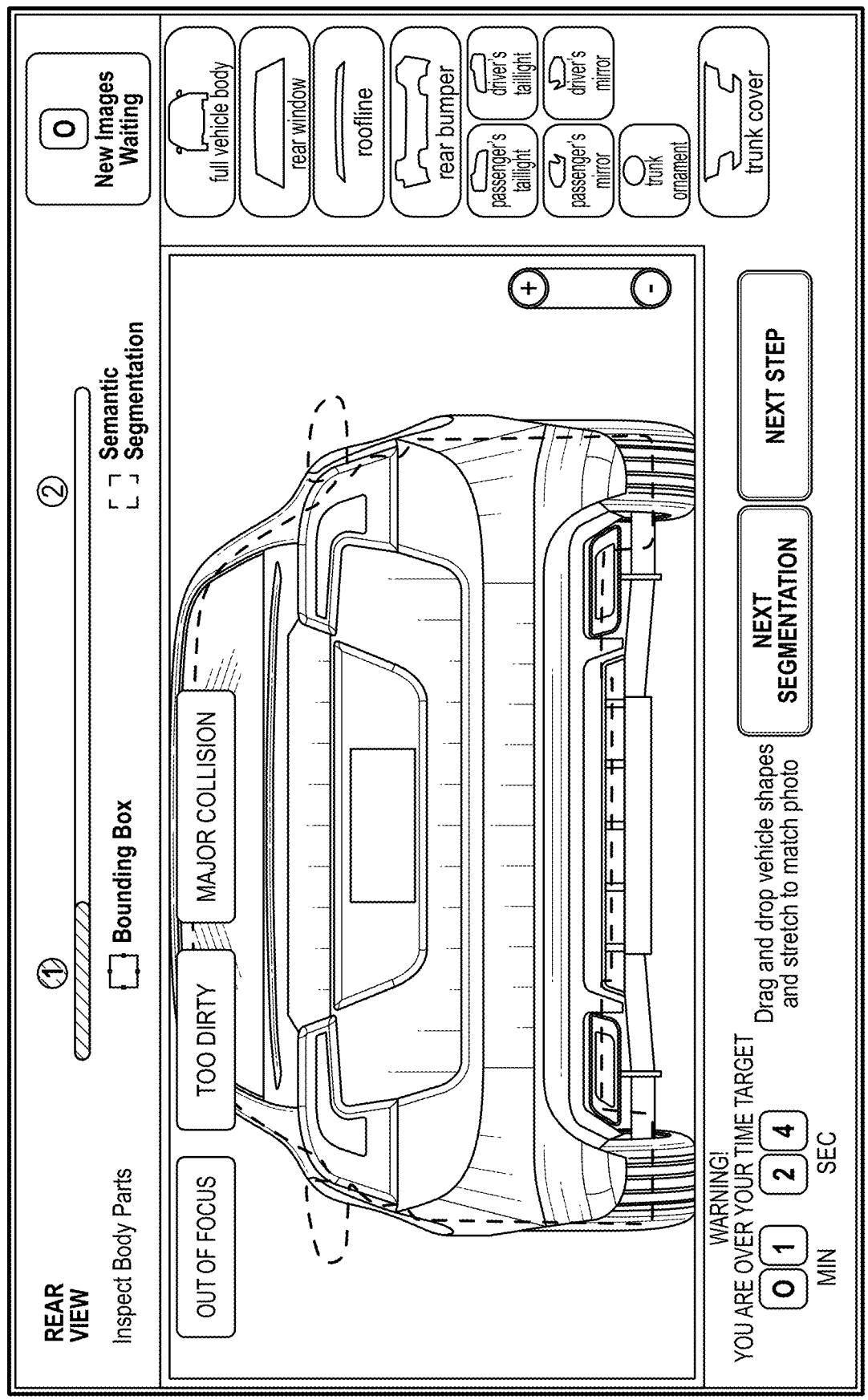
FIG. 12 is an example interface of a system for vehicle appraisals according to some embodiments.

FIG. 12 is an example interface that can facilitate capturing an image of the rear view of the vehicle. The interface can include indicia to label or identify body parts. Example parts include window, roofline, bumper, taillight, mirror, trunk ornament, trunk cover, and so on.

Figure 13:
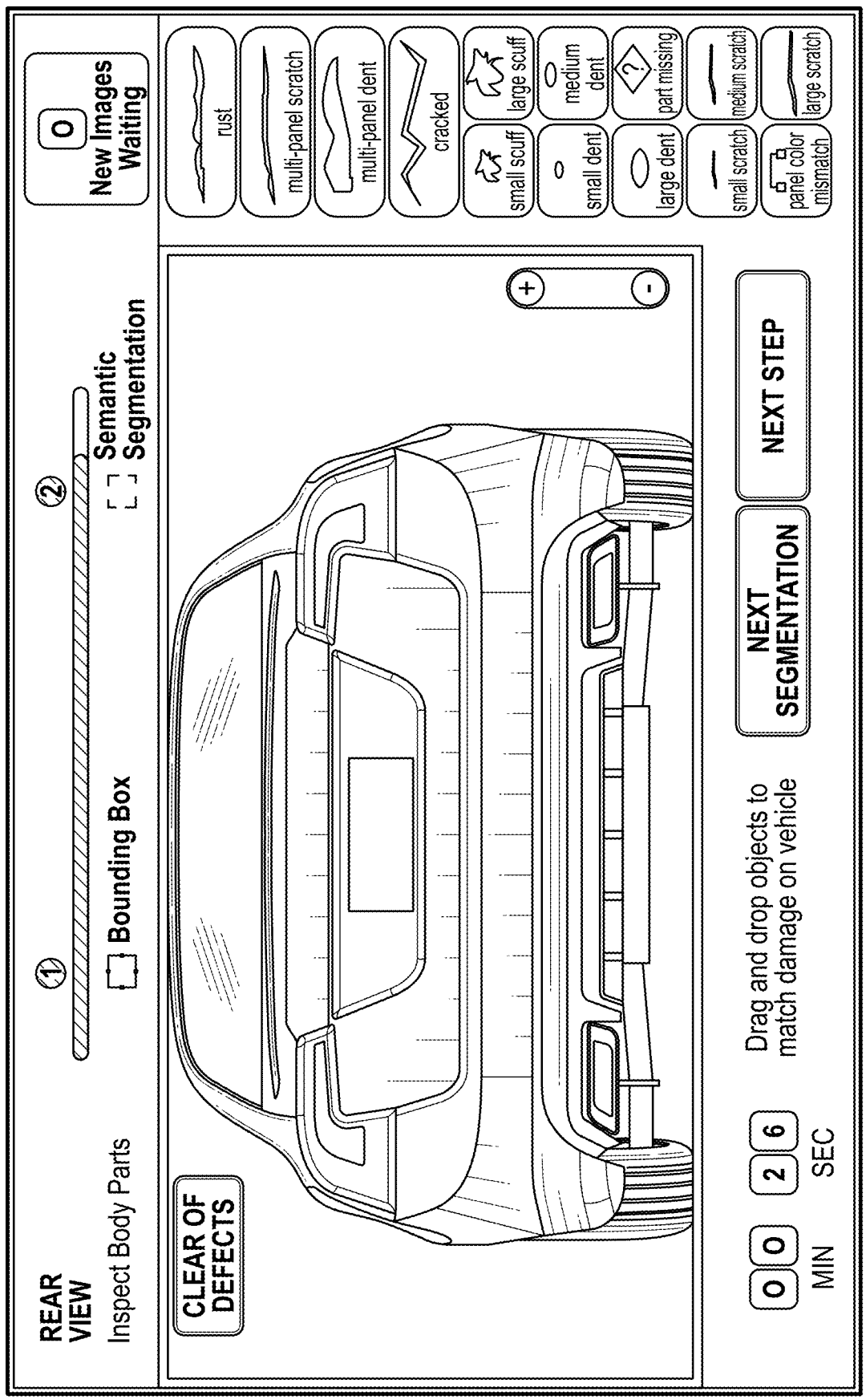
FIG. 13 is an example interface of a system for vehicle appraisals according to some embodiments.

FIG. 13 is an example interface that can facilitate labelling an image of the rear view of a vehicle with defect labels.

Figure 14:
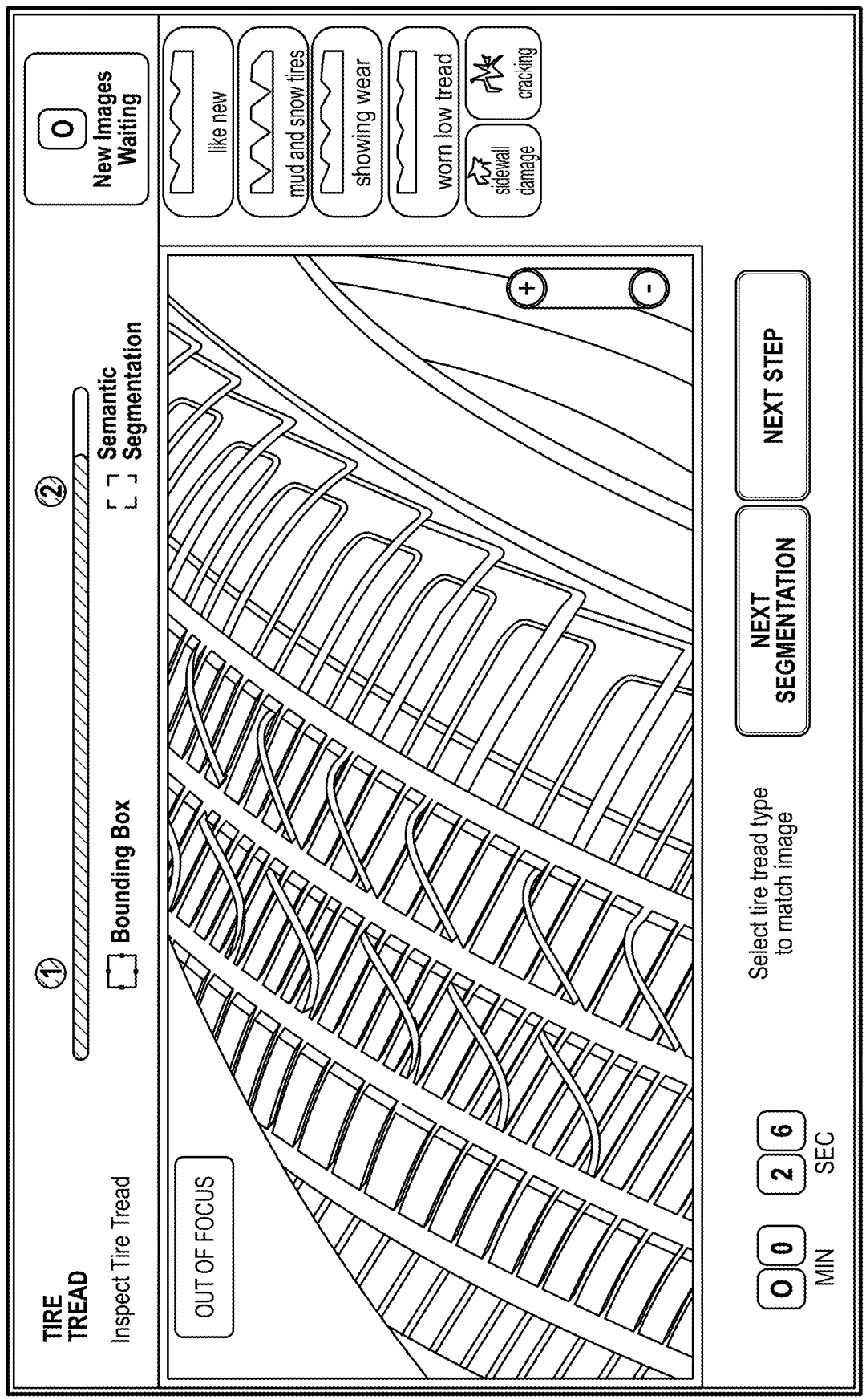
FIG. 14 is an example interface of a system for vehicle appraisals according to some embodiments.

FIG. 14 is an example interface that can facilitate capturing an image of a tire of the vehicle to facilitate the tire tread inspection process by recognition engine 120. The image of the tire with metadata such as new, mud or snow tires, showing where, low tread, damage, cracking, and so on.

Figure 15:
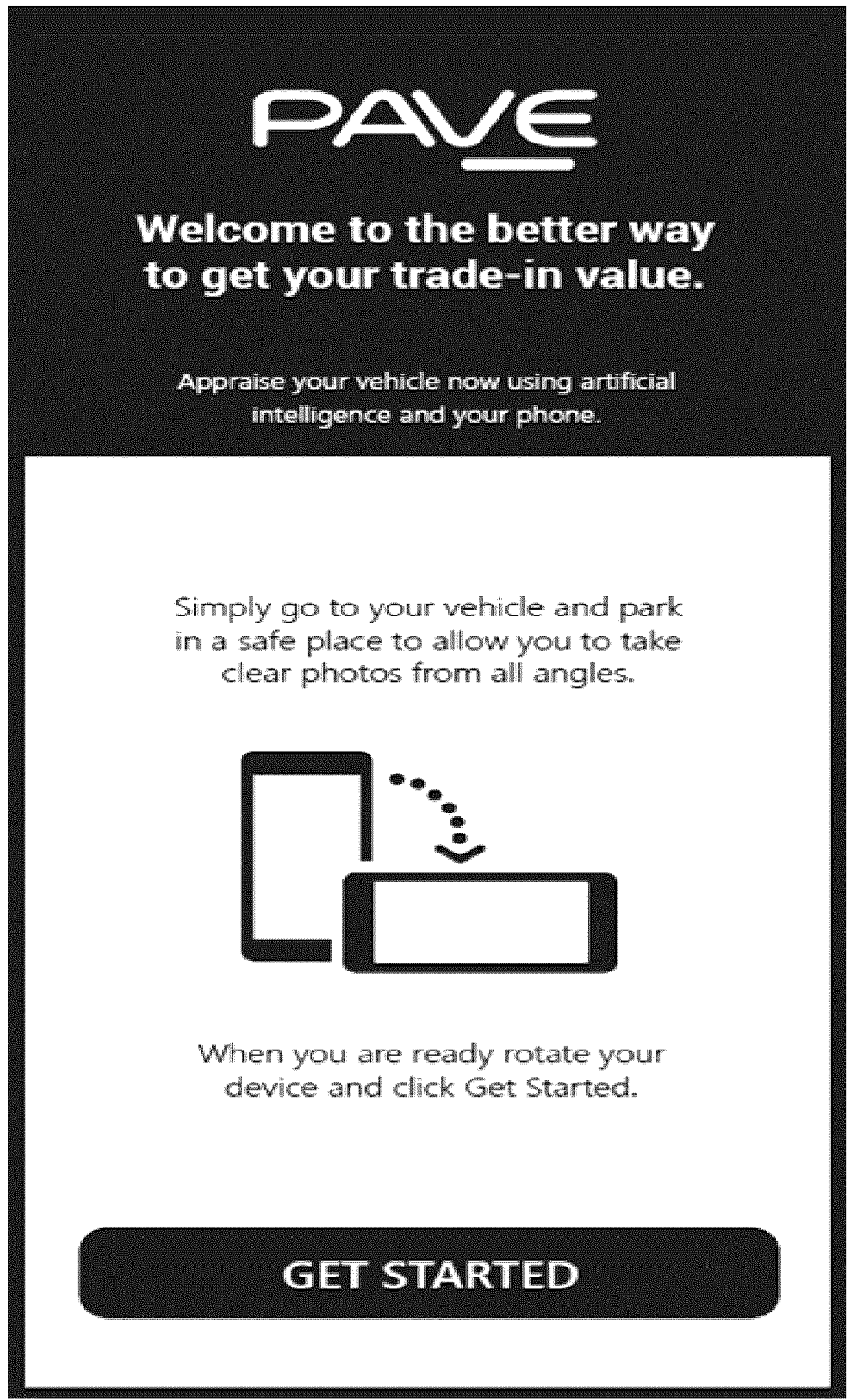
FIG. 15 is an example interface of a system for vehicle appraisals according to some embodiments.
Figure 16:
FIG. 16 is an example interface of a system for vehicle appraisals according to some embodiments.
Figure 17:
FIG. 17 is an example interface of a system for vehicle appraisals according to some embodiments.

FIG. 15 is an example interface that can display on a mobile device to capture images of vehicles. FIG. 16 is an example interface that can facilitate capturing an image of the vehicles barcode or scanning the vehicles barcode. The interface can include helpful guides to facilitate the image capture process. The barcode can be processed by system 100 to retrieve data relevant to the specific vehicle. FIG. 17 is an example interface indicating that the image of the barcode is being processed.

Figure 18:
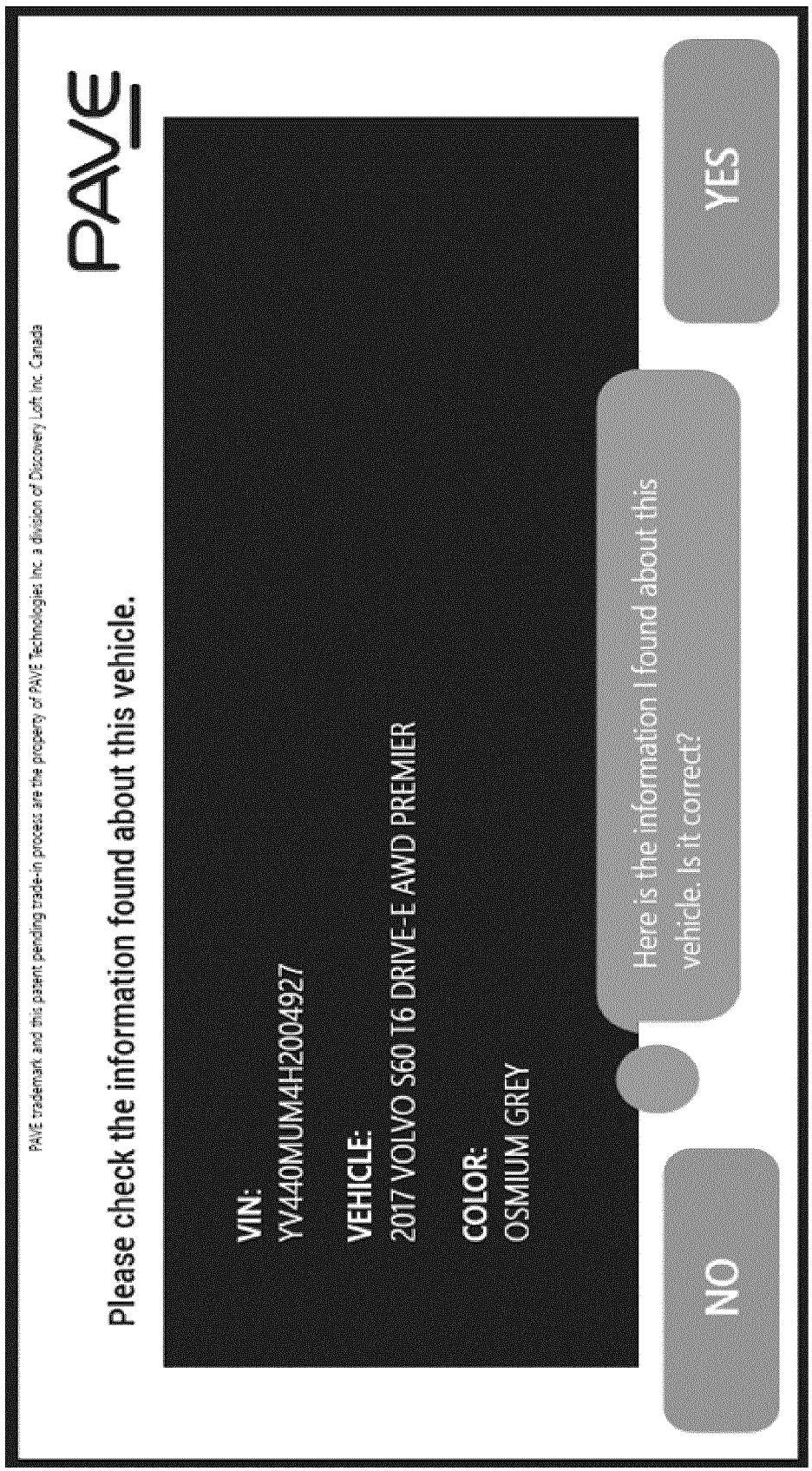
FIG. 18 is an example interface of a system for vehicle appraisals according to some embodiments.

FIG. 18 is an example interface indicating information retrieved by the system 100 using the barcode. The interface can prompt the user to confirm the accuracy of the retrieved information.

Figure 19:
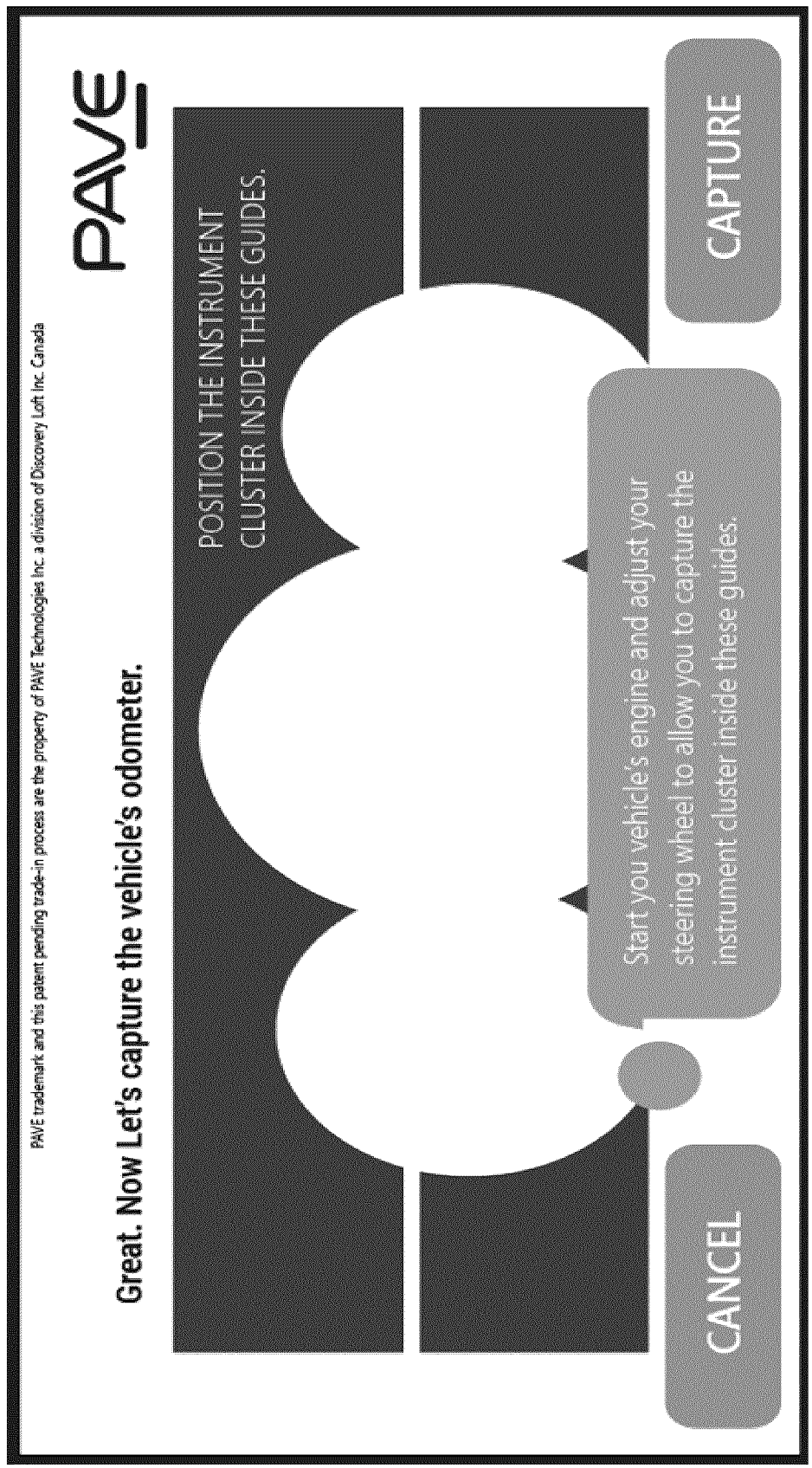
FIG. 19 is an example interface of a system for vehicle appraisals according to some embodiments.

FIG. 19 is an example interface to facilitate capturing an image of the vehicles odometer.

Figure 20:
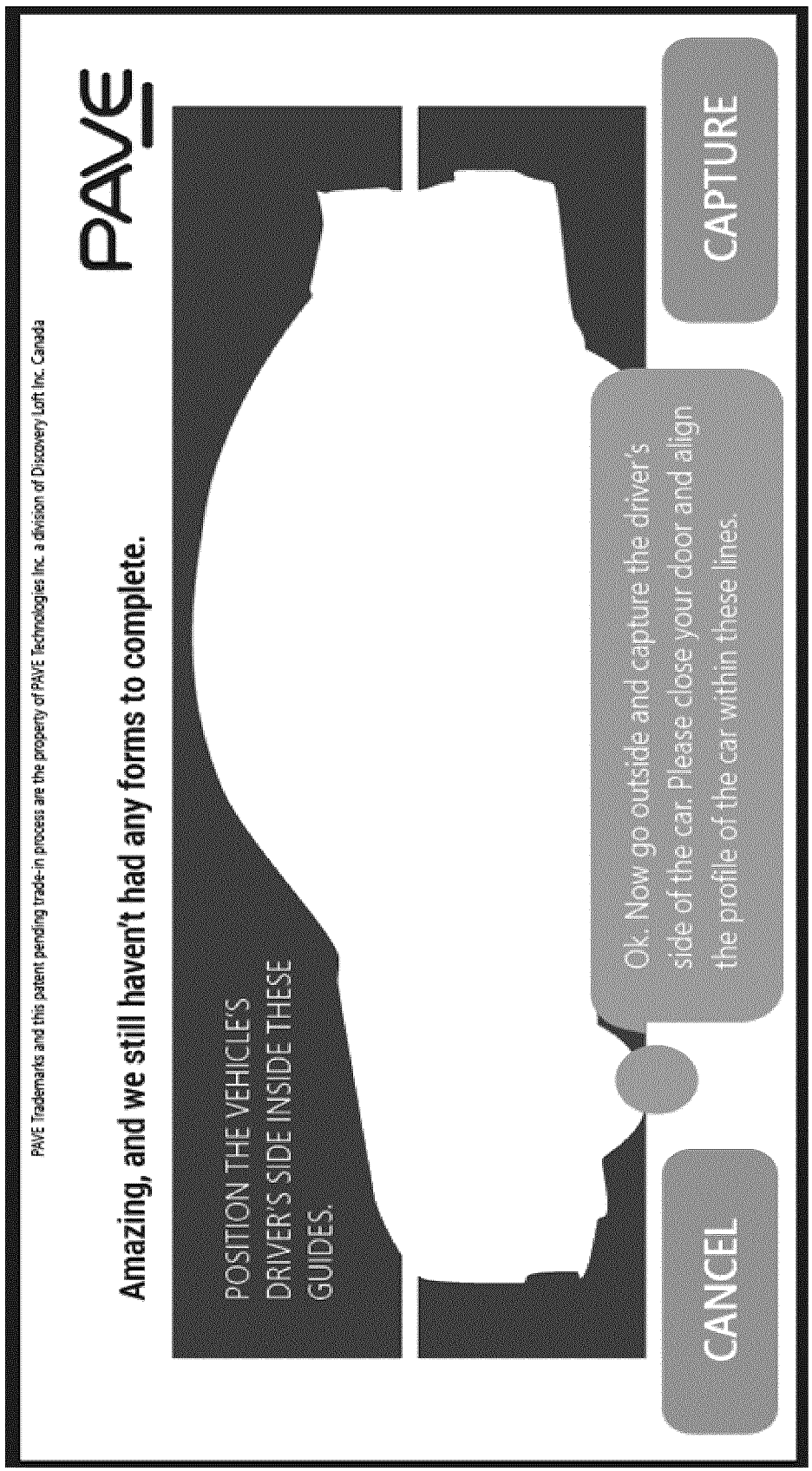
FIG. 20 is an example interface of a system for vehicle appraisals according to some embodiments.
Figure 21:
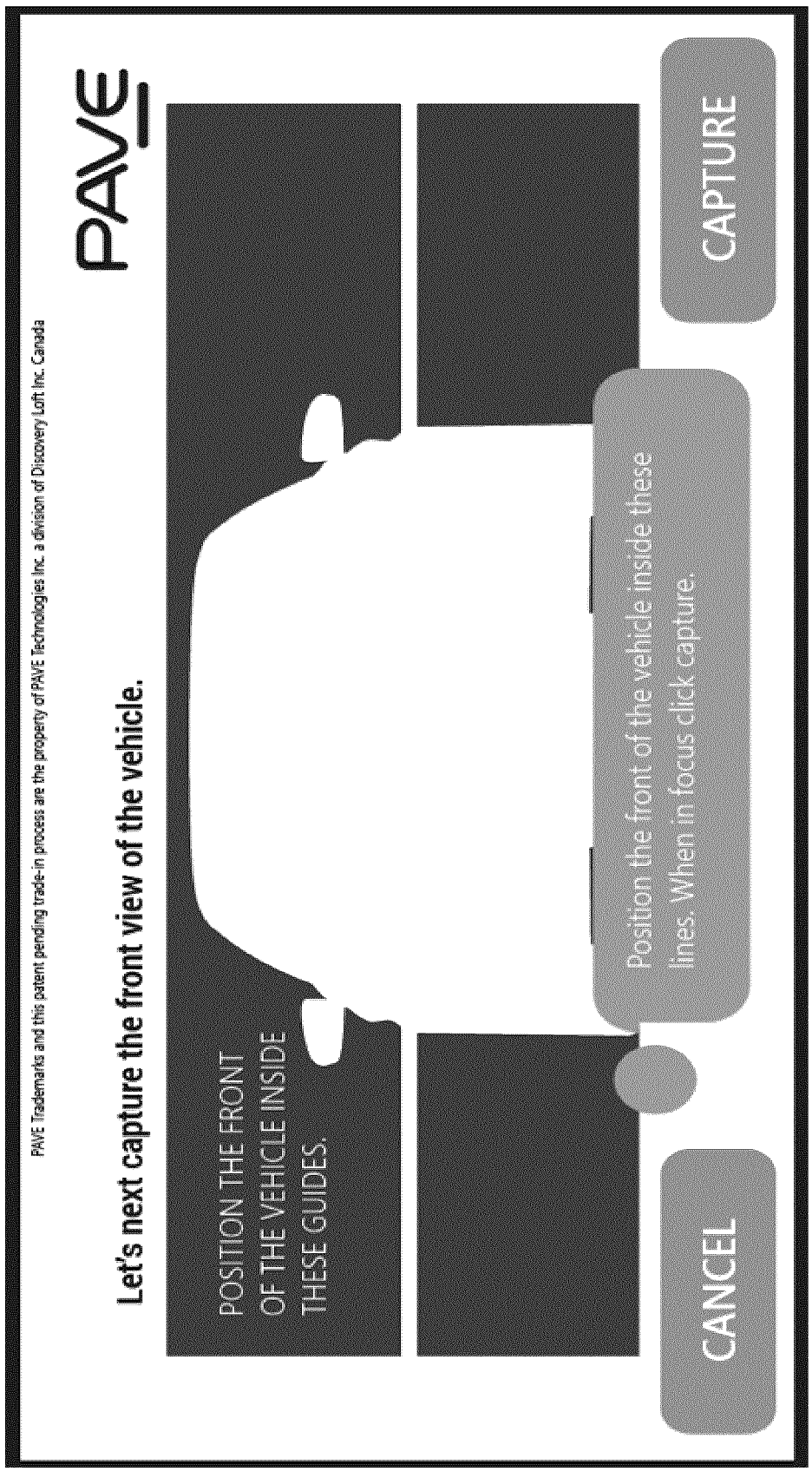
FIG. 21 is an example interface of a system for vehicle appraisals according to some embodiments.
Figure 22:
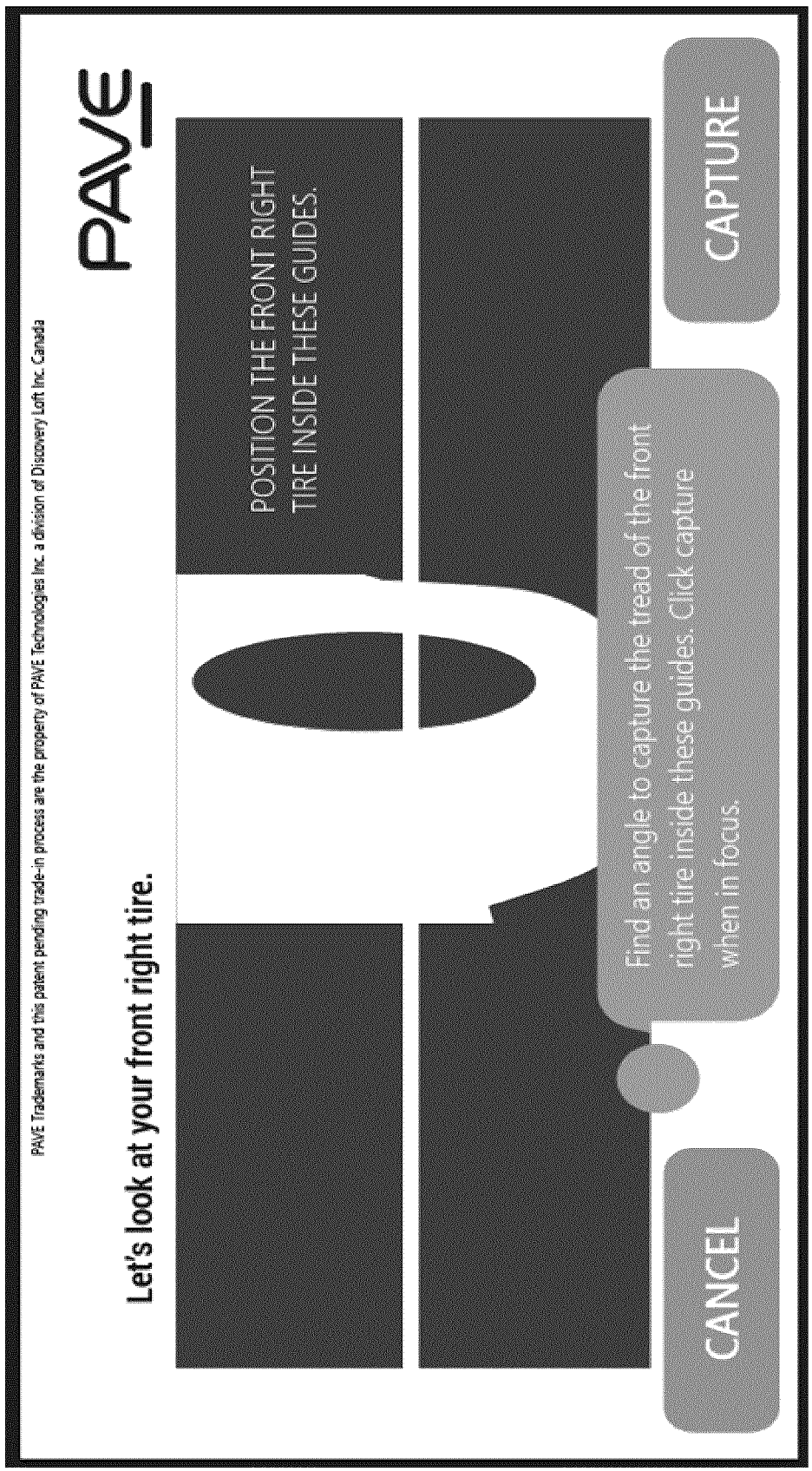
FIG. 22 is an example interface of a system for vehicle appraisals according to some embodiments.
Figure 23:
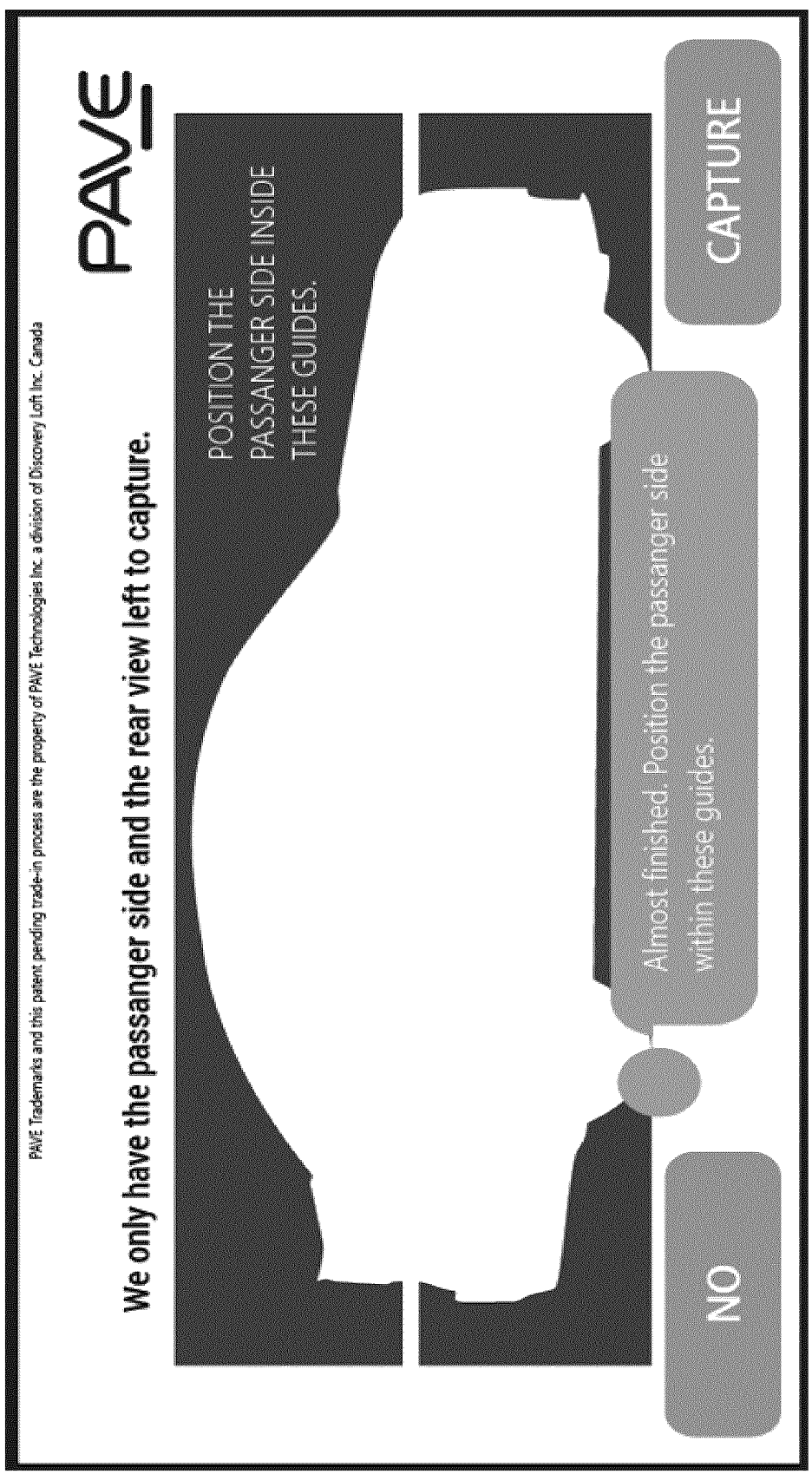
FIG. 23 is an example interface of a system for vehicle appraisals according to some embodiments.
Figure 24:
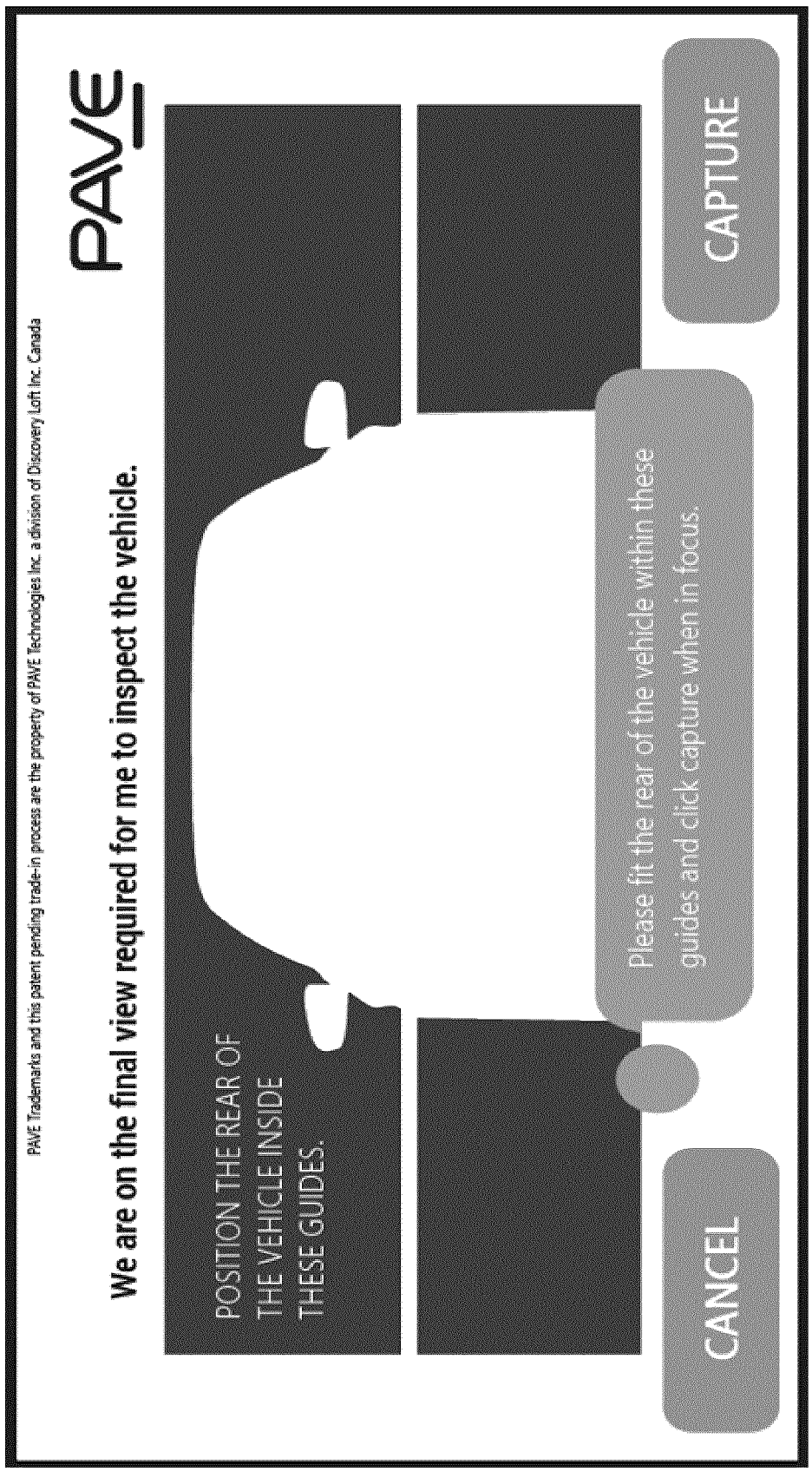
FIG. 24 is an example interface of a system for vehicle appraisals according to some embodiments.
Figure 25:
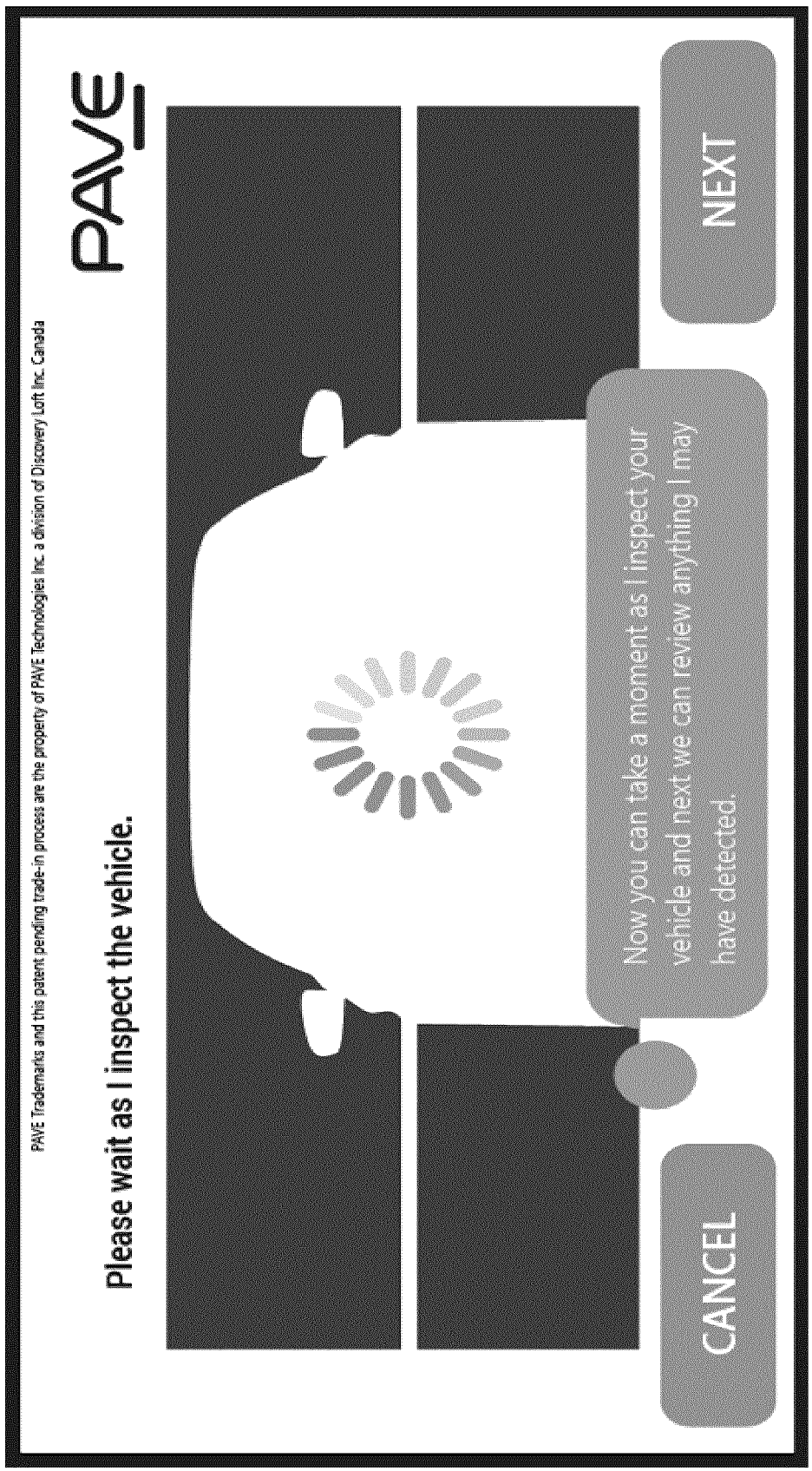
FIG. 25 is an example interface of a system for vehicle appraisals according to some embodiments.
Figure 26:
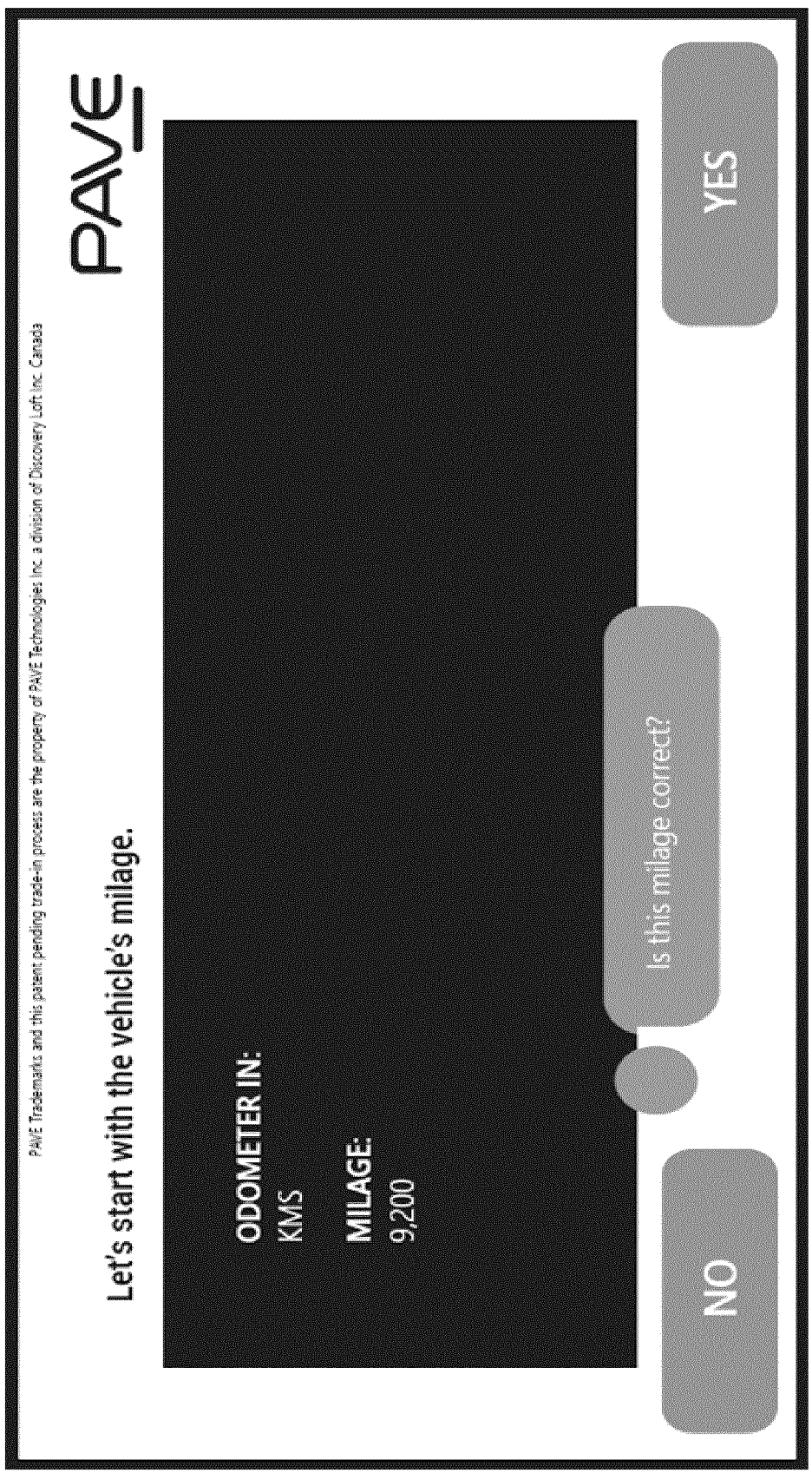
FIG. 26 is an example interface of a system for vehicle appraisals according to some embodiments.
Figure 27:
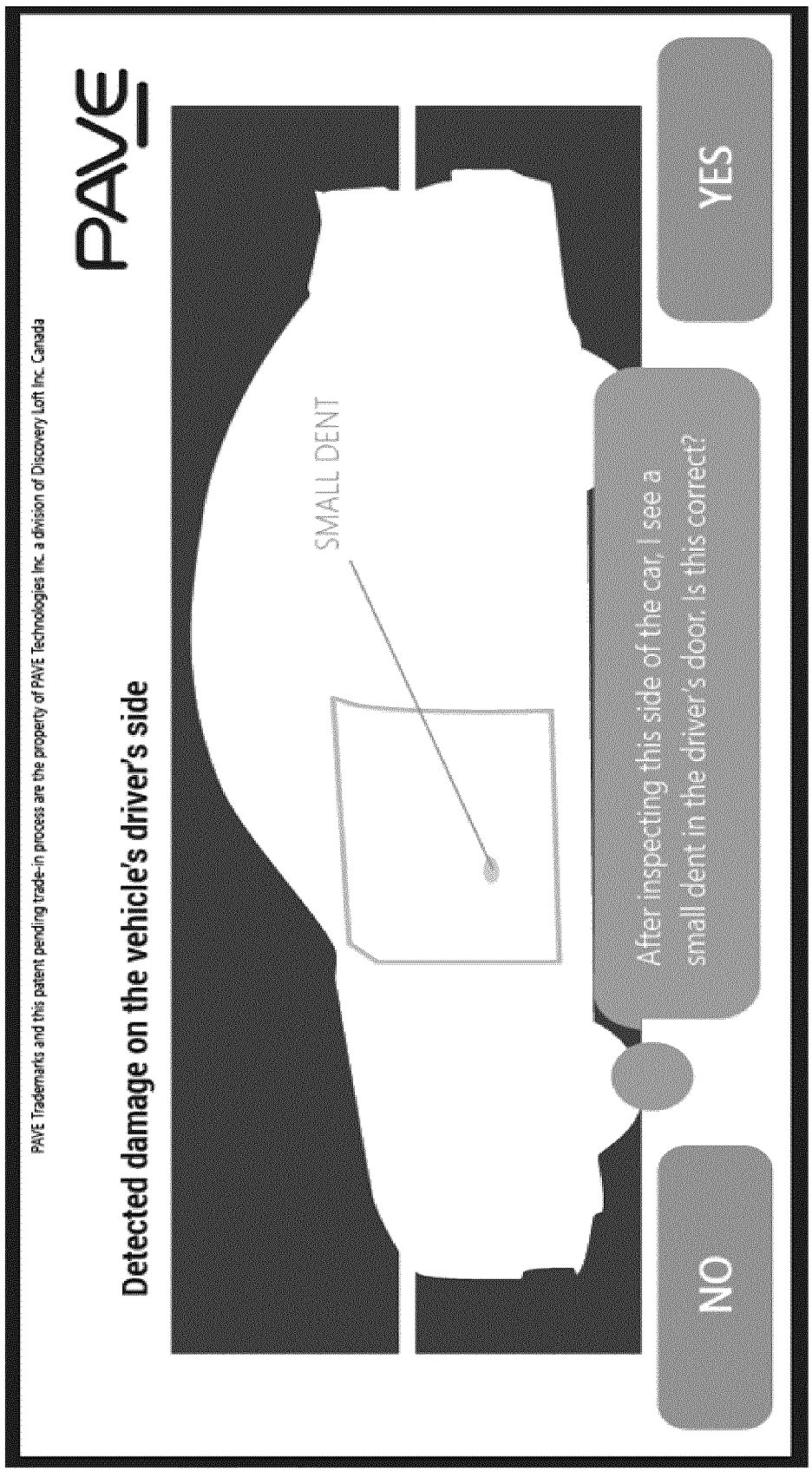
FIG. 27 is an example interface of a system for vehicle appraisals according to some embodiments.
Figure 28:
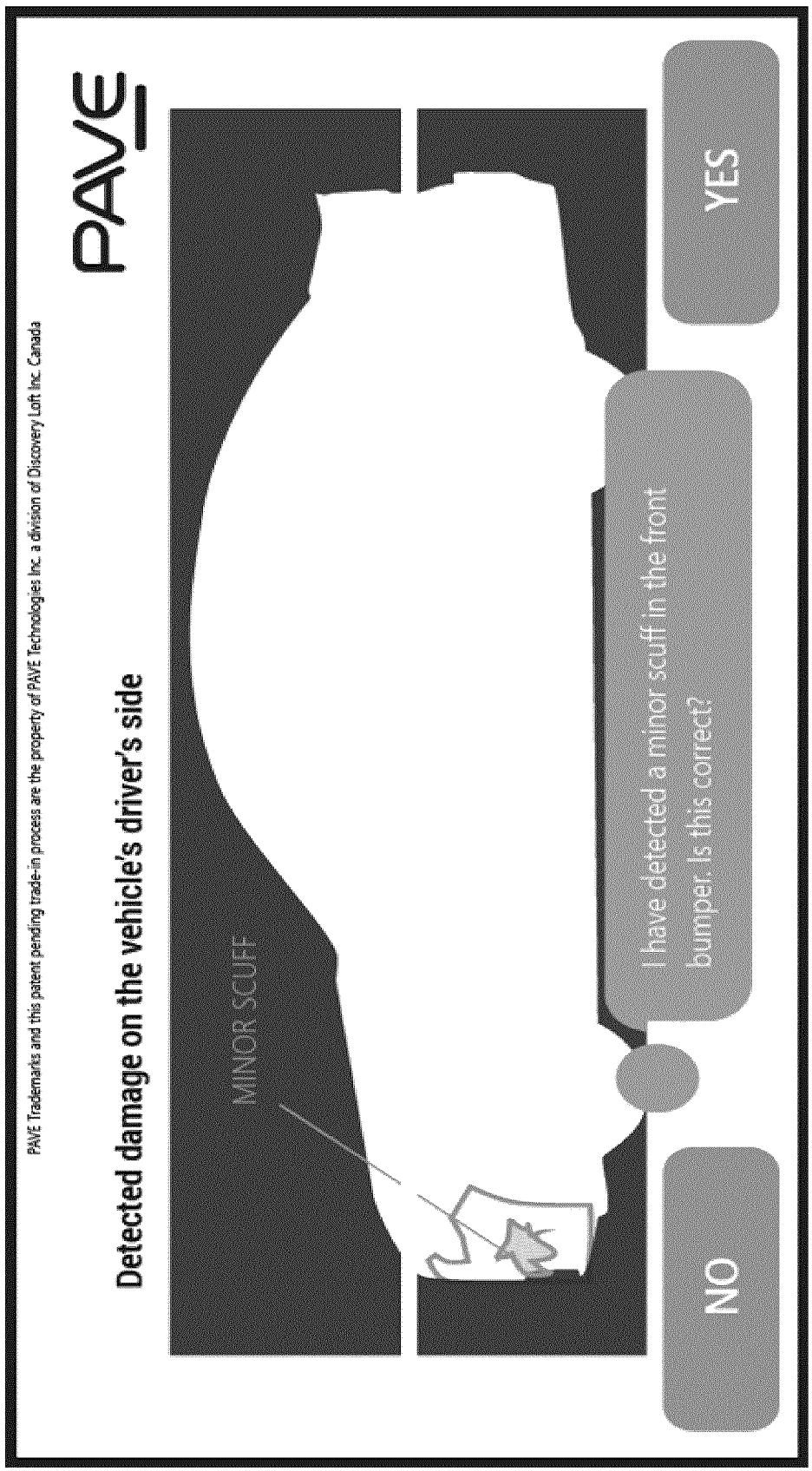
FIG. 28 is an example interface of a system for vehicle appraisals according to some embodiments.
Figure 29:
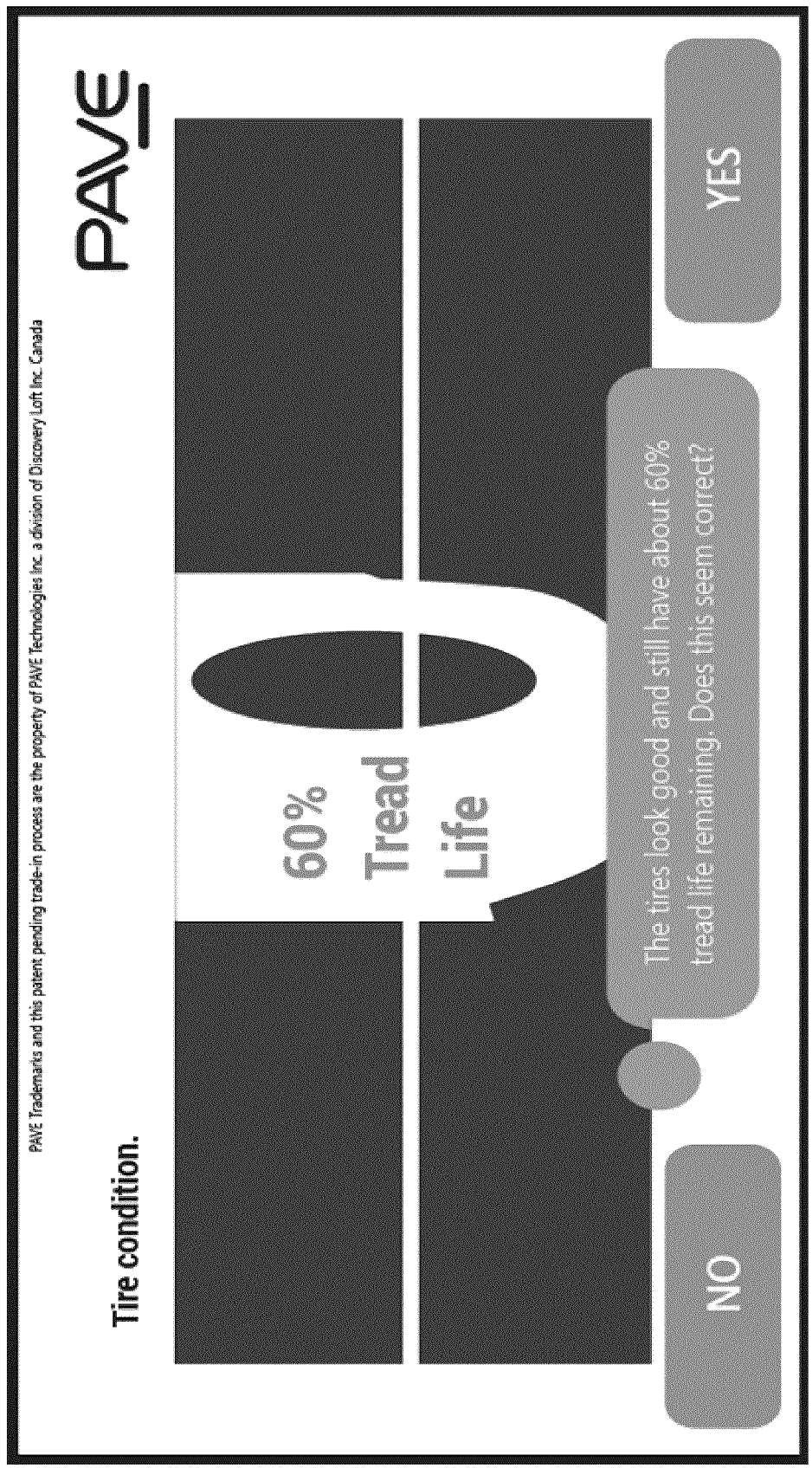
FIG. 29 is an example interface of a system for vehicle appraisals according to some embodiments.
Figure 30:
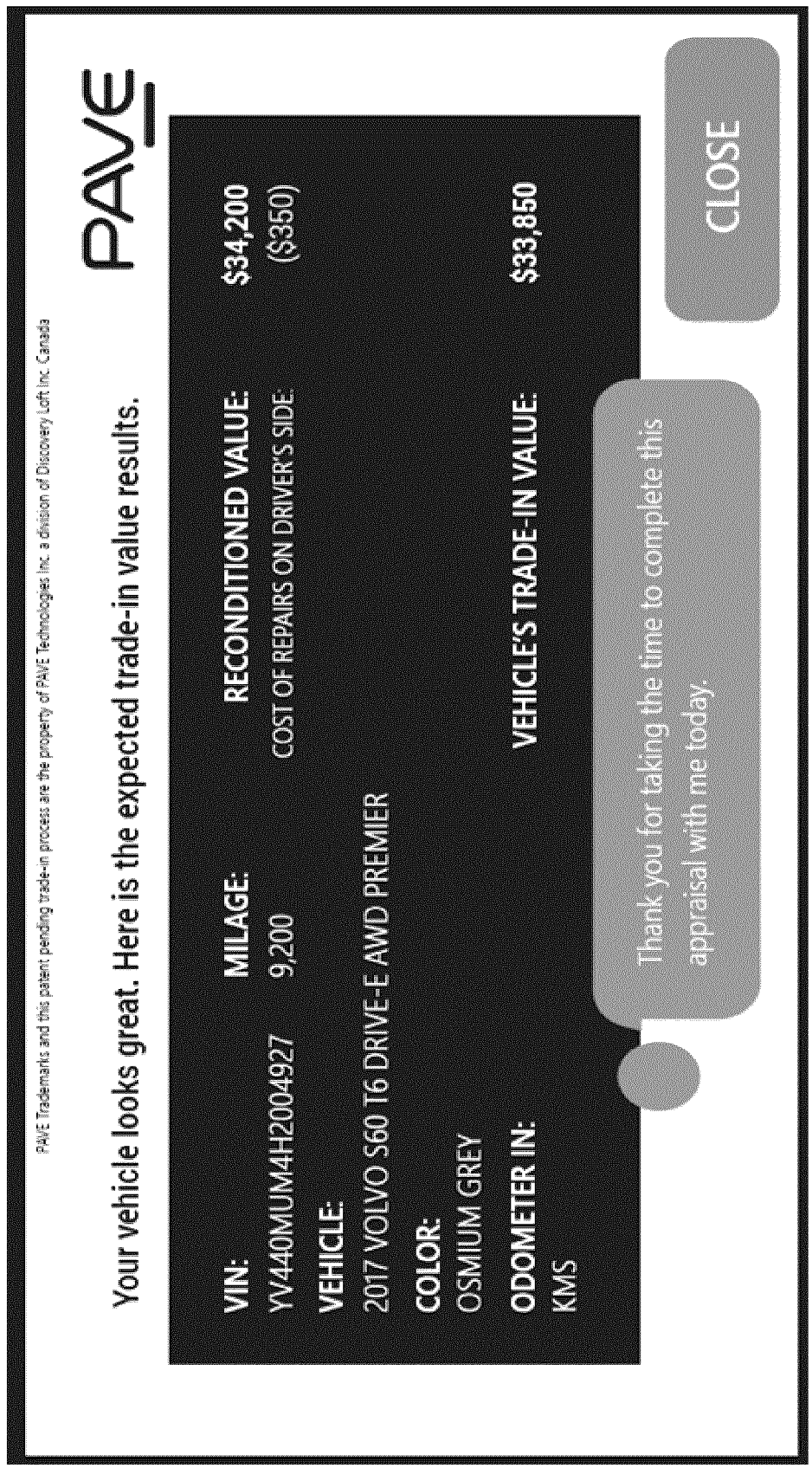
FIG. 30 is an example interface of the system for vehicle appraisals according to some embodiments.

FIG. 20 is an example interface to facilitate capturing an image of the driver's side view of the vehicle. FIG. 21 is an example interface to facilitate capturing an image of the front view of the vehicle. FIG. 22 is an example interface to facilitate capturing an image of the front right tire to facilitate the tire inspection process. FIG. 23 is an example interface to facilitate capturing an image of the passenger side view of the vehicle. FIG. 24 is an example interface to facilitate capturing an image of the front view of the vehicle. FIG. 25 is an example interface indicating that the captured images are being processed by system 100. FIG. 26 is an example interface indicating the captured odometer data. The interface can include a prompt for the user to confirm the accuracy of the processed information. FIG. 27 is an example interface indicating detected defects of the vehicle. The interface can markup the image of the vehicle with a label indicating the type of detected defect. FIG. 28 is an example interface indicating detected damage on the vehicle. The interface can markup the image of the vehicle with a label indicating the type of detected damage. FIG. 29 is an example interface indicating the detected tire condition. FIG. 30 is an example interface indicating the expected trade-in value results that are computed by system 100.

Figure 31:
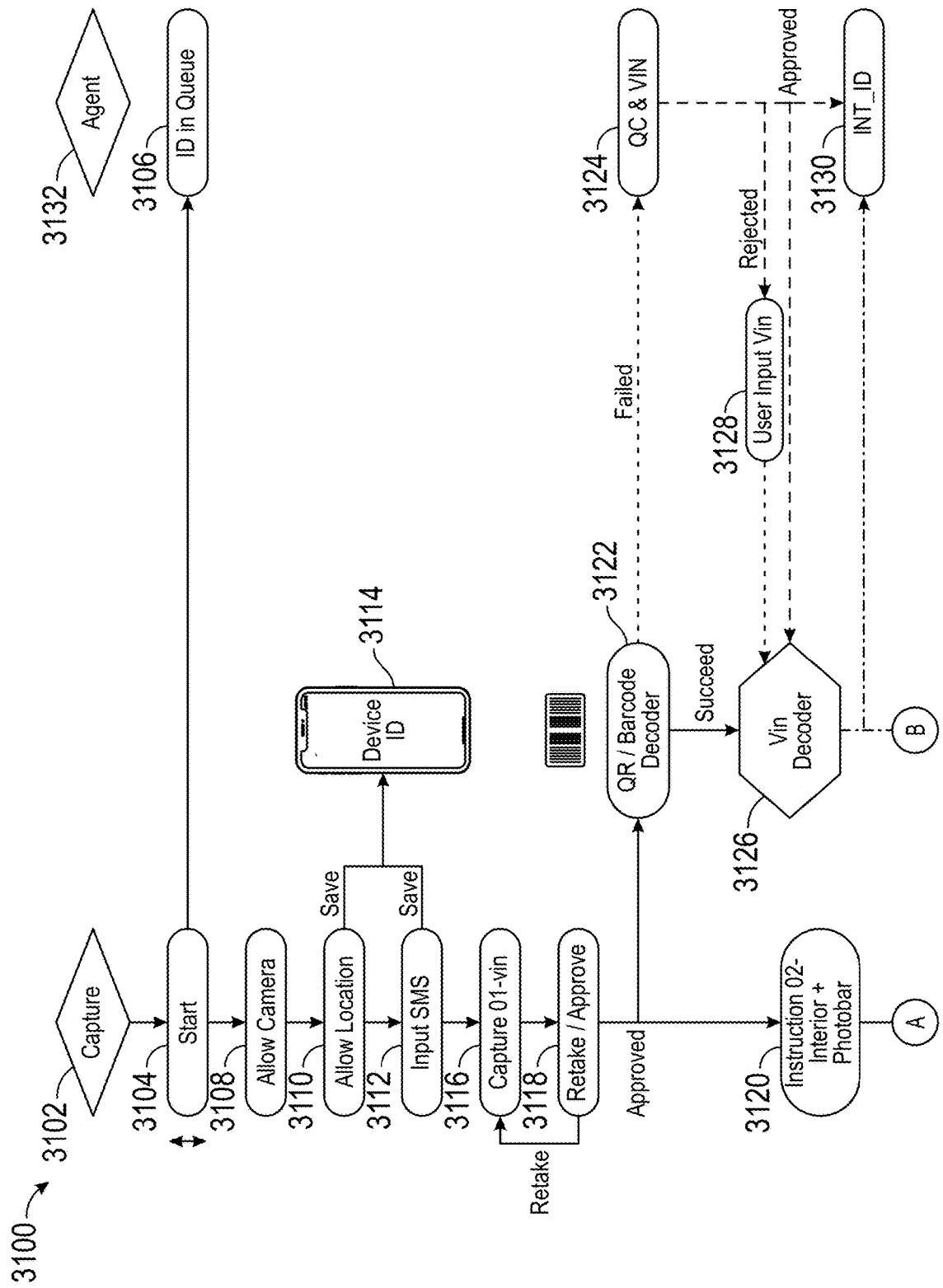
FIG. 31 is an example process for computing vehicle metrics from captured images.

FIG. 31 is an example process 3100 for computing vehicle metrics from captured images, such as VIN. At the 3102 the capture process is triggered and, at 3104, starts with a request for an identifier in queue 3016. At 3108, the interface connects to a camera at a device and at 3110 retrieves the location of the device. At 3114 the device identifier is determined and at 3112 input data is received to confirm the identifier. At 3116 the interface captures data for the VIN and at 3118 a check on the image quality to determine whether to retake the image or approve the image. At 3122 the image is processed by a barcode decoder. At 3124 the image is sent to quality control process to receive input data for the VIN at 3128 for VIN decoding at 3126. At 3130 an internal identifier is received. At 3120 the process proceeds to capturing data for the interior of the vehicle.

Figure 32:
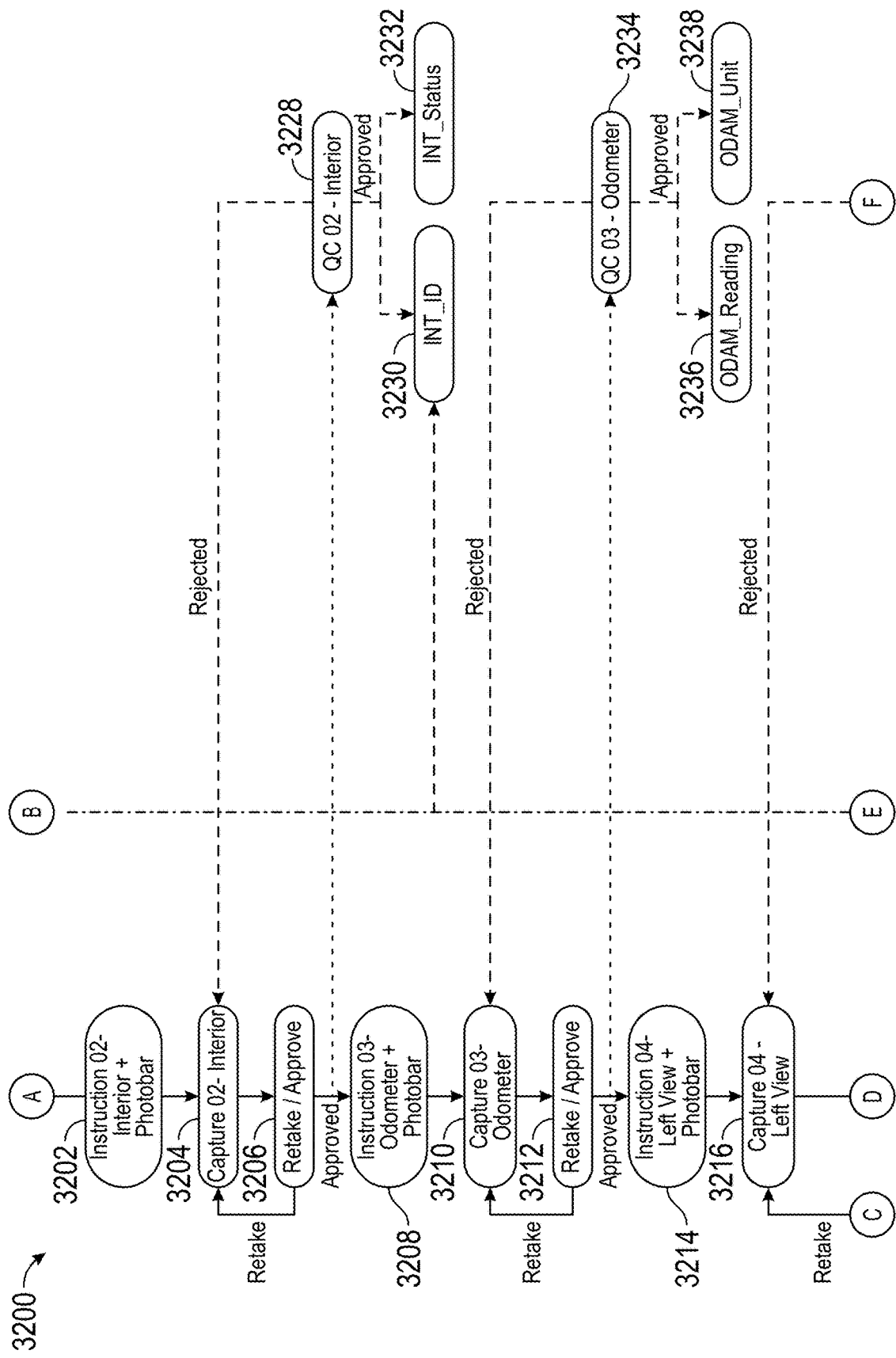
FIG. 32 is an example process for computing vehicle metrics from captured images.

FIG. 32 is an example process 3200 for computing vehicle metrics from captured images, such as interior data. At 3202, the capture process is triggered and, at 3204, captures an image of an interior of the vehicle. At 3206 the interface captures image(s) for the interior data and checks on the image quality to determine whether to retake the image or approve the image. At 3228, the image is sent to quality control process to receive input data for the interior data. At 3230 an internal identifier is received. At 3232 an internal status is set. At 3208, the capture process for the instrument data is triggered and at 3210 a check on the image quality to determine whether to retake the image or approve the image. At 3234, the image is sent to quality control process to receive input data for the odometer data for a reading at 3236 and for the unit at 3238. At 3214, the capture process for the side view data is triggered and at 3216 a check on the image quality to determine whether to retake the image or approve the image.

Figure 33:
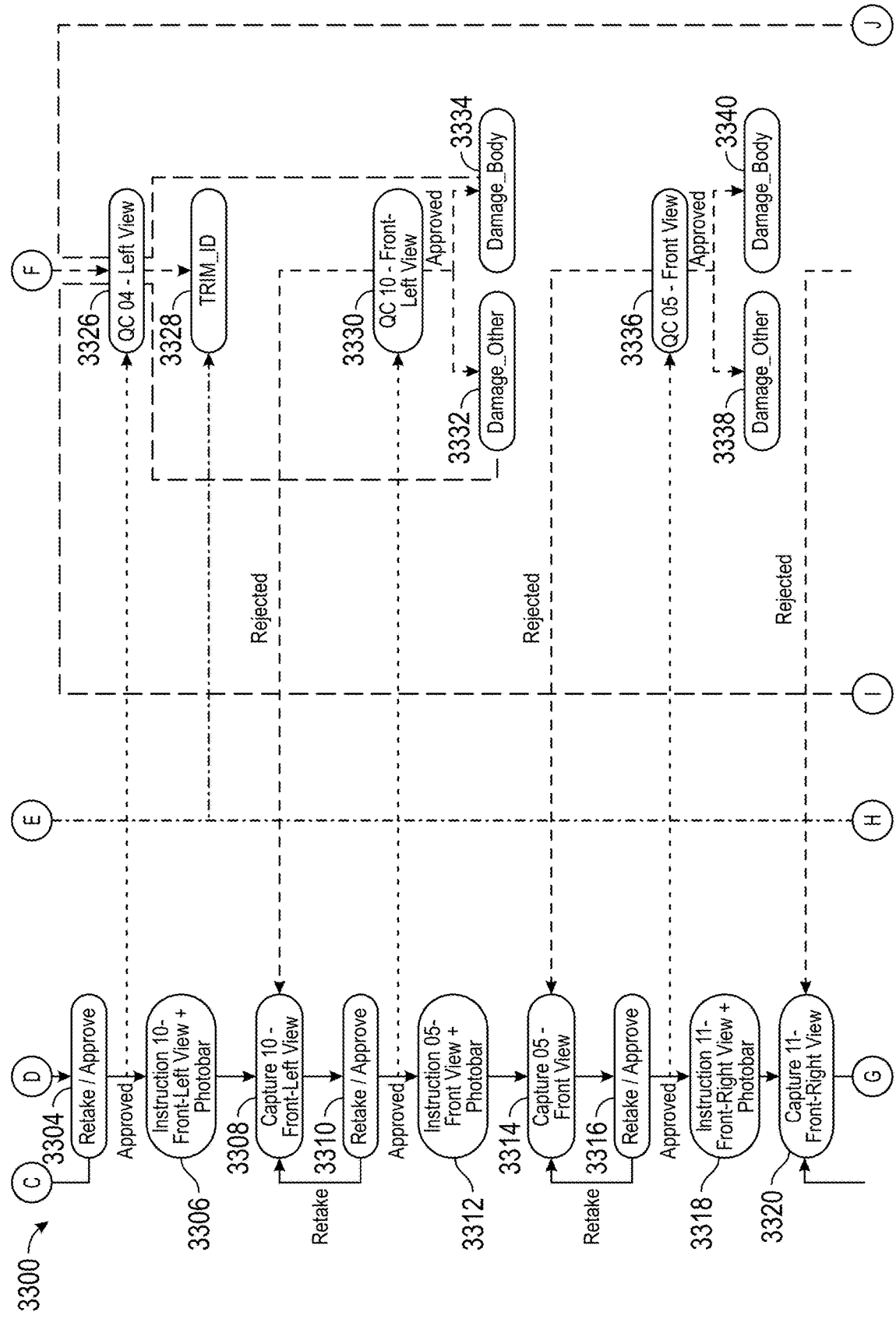
FIG. 33 is an example process for computing vehicle metrics from captured images.

FIG. 33 is an example process 3300 for computing vehicle metrics from captured images continuing from FIG. 32. At 3304 a check on the image quality to determine whether to retake the image or approve the image. At 3306, the image is sent to quality control process to receive input data for the front side view data. At 3308, the capture process is triggered and, at 3310, captures an image of the front side view of the vehicle. At 3312, the capture process is triggered and, at 3314 the interface captures image(s) for the front data and at 3316 checks on the image quality to determine whether to retake the image or approve the image. At 3336, the image is sent to quality control process to receive input data for the front view data. At 3338, 3340 damage data is received. At 3318, the capture process is triggered and, at 3320 the interface captures image(s) for the front other side view data.

Figure 34:
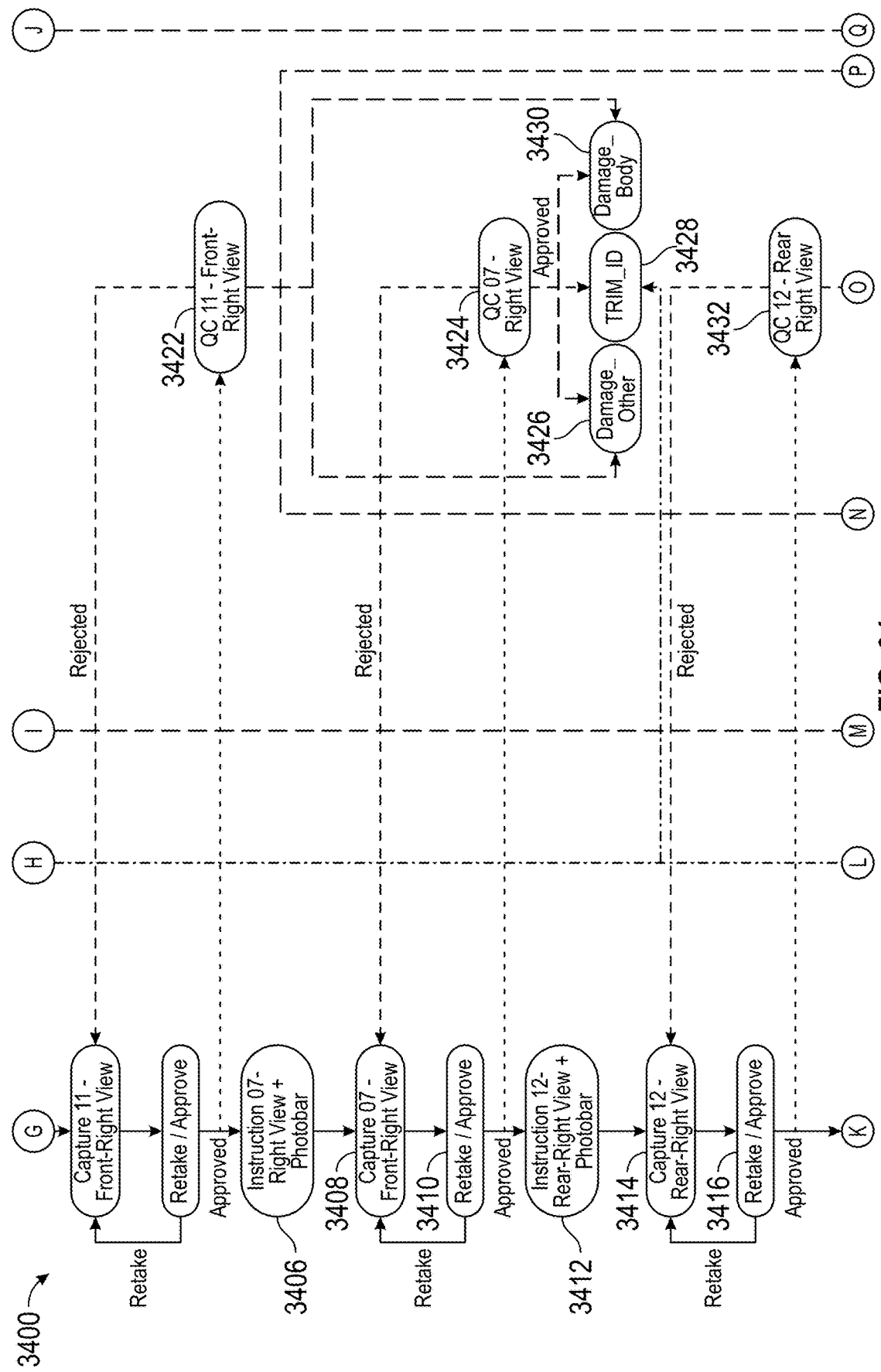
FIG. 34 is an example process for computing vehicle metrics from captured images.

FIG. 34 is an example process 3400 for computing vehicle metrics from captured images continuing from FIG. 33. At 3422, front side view data is captured. At 3406 the capture process is triggered and, at 3408, captures an image of the front side view of the vehicle. At 3410 checks on the image quality to determine whether to retake the image or approve the image. At 3424 right view data is received. At 3426, 3430 damage data is received. At 3428 trim data is received. At 3422, front side view data is captured. At 3412 the capture process is triggered and, at 3414, captures an image of the rear side view of the vehicle. At 3416 checks on the image quality to determine whether to retake the image or approve the image. At 3432 rear view data is received.

Figure 35:
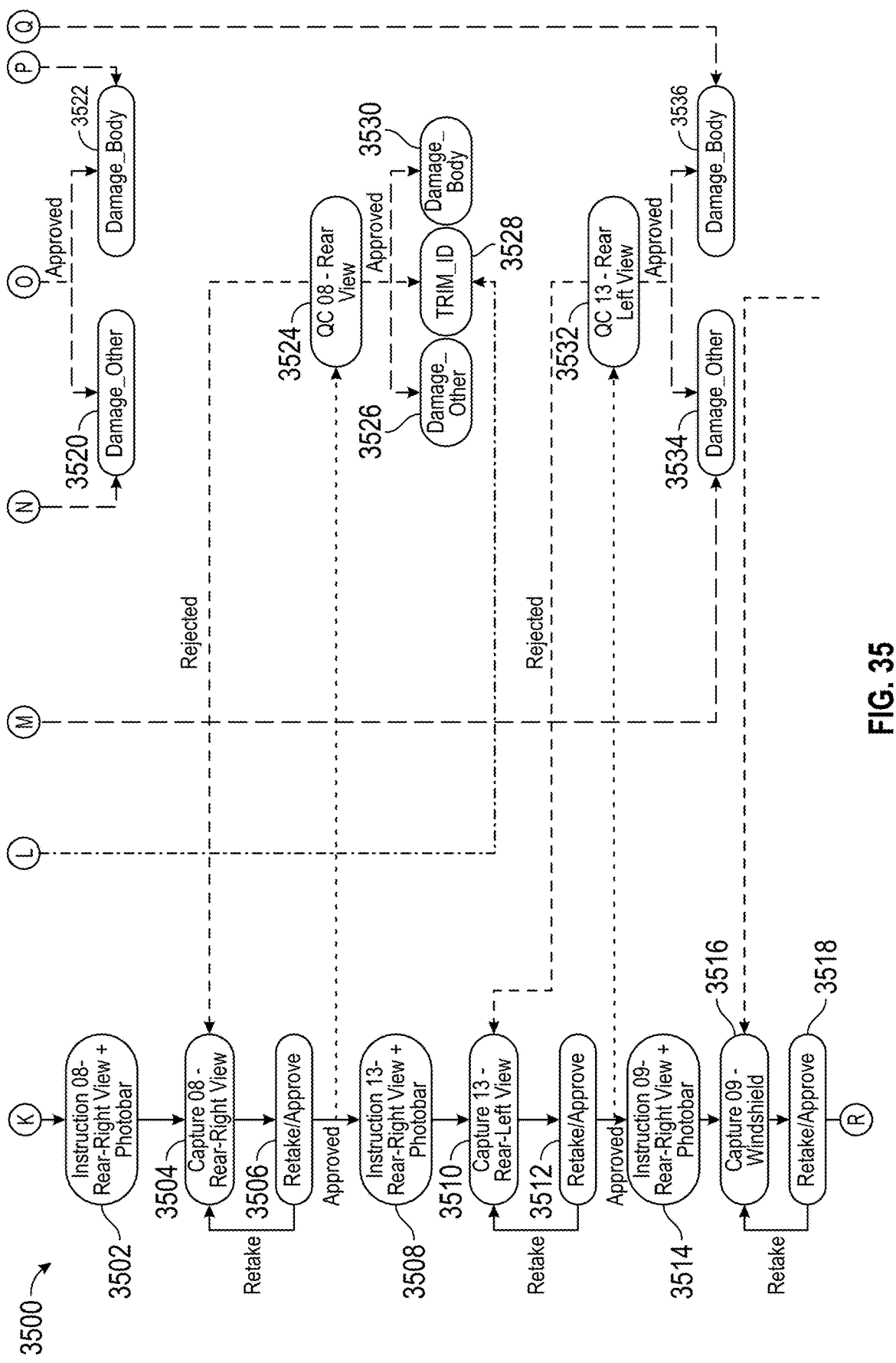
FIG. 35 is an example process for computing vehicle metrics from captured images.

FIG. 35 is an example process 3500 for computing vehicle metrics from captured images. At 3520, 3522 rear side view data is captured. At 3502 the capture process is triggered and, at 3504, captures an image of the front side view of the vehicle. At 3506 the system 100 checks on the image quality to determine whether to retake the image or approve the image. At 3524 rear view data is received. At 3526, 3530 damage data is received. At 3528 trim data is received. At 3510 the process captures an image of the rear side view of the vehicle. At 3512 checks on the image quality to determine whether to retake the image or approve the image. At 3532 rear side view data is received. At 3524, 3536 damage data is received. At 3514 the process captures an image of the windshield of the vehicle. At 3518 checks on the image quality to determine whether to retake the image or approve the image.

Figure 36:
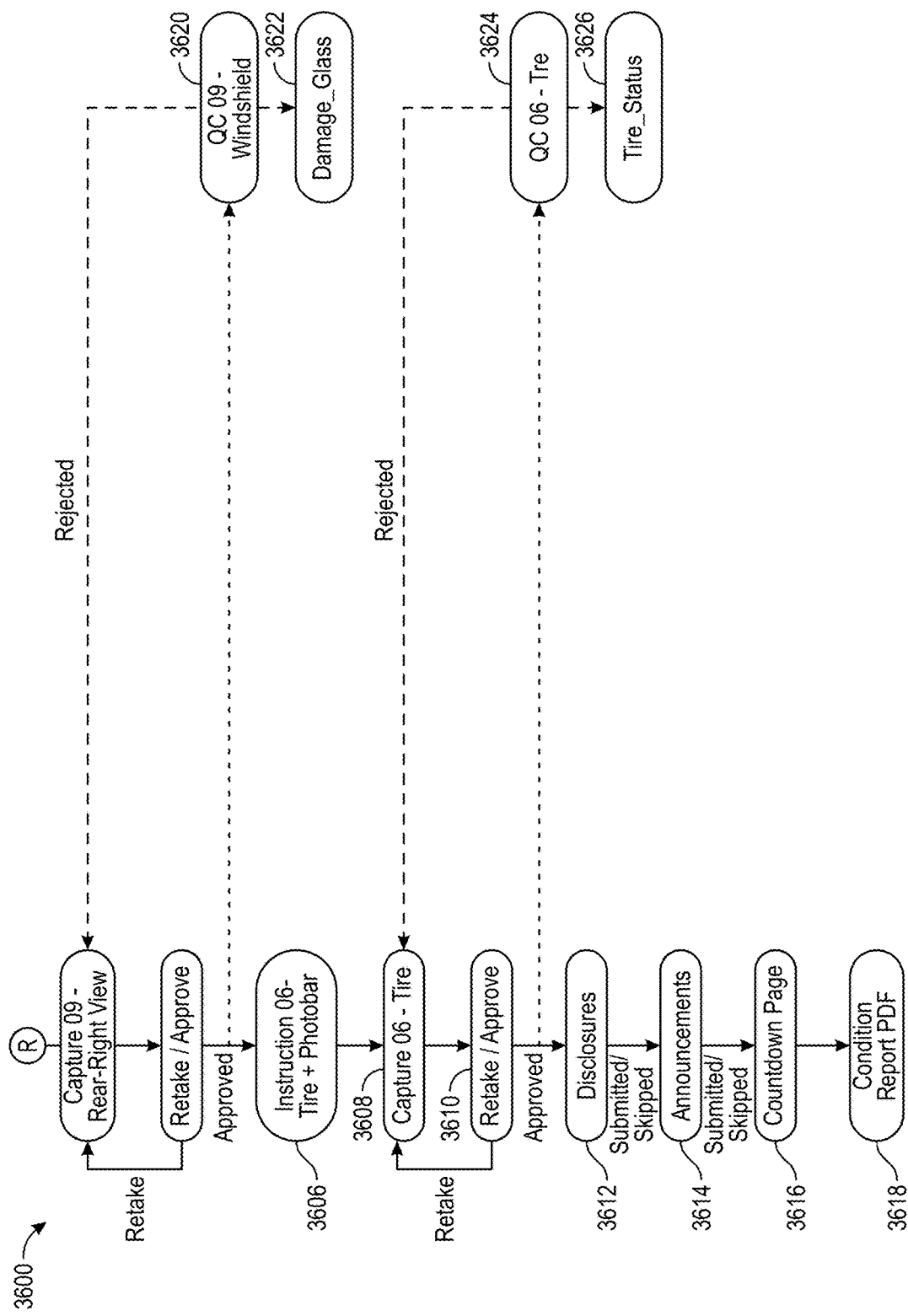
FIG. 36 is an example process for computing vehicle metrics from captured images.

FIG. 36 is an example process 3600 for computing vehicle metrics from captured images continuing from FIG. 35. At 3620 windshield data is received. At 3622 damage data for glass is received. At 3606 the process captures an image of the tires of the vehicle. At 3610 checks on the image quality to determine whether to retake the image or approve the image. At 3624 tire data is received. At 3626 tire status data is received. At 3612 disclosure data is received. At 3614 announcement data is received. At 3616 a timer shows report generation. At 3618 a condition report is generated including cost metrics for repairs, etc.

The system 100 collects the relevant structured and labelled imagery and data to effectively train the recognition engine 120 to perform relevant dispatched tasks. The system 100 can use agents, in some embodiments, to provide input data and review images for specific tasks during an early-stage training process. This structured data is systematically added to the training dataset required to create the system's 100 neural network models that will be utilized to automate the computation of different vehicle metrics.

The system 100 can compute different vehicle metrics from the captured images and use an interactive guide to provide instructions and feedback during the image capture process. The system 100 can dispatch tasks to multiple agents simultaneously to receive input data for vehicle metrics. The system 100 can detect with a task is required and dispatch the task to the agent along with relevant images of the vehicle. The system 100 uses multiple tasks simultaneously for an efficient data capture process.

The system 100 can capture images of a vehicle and metadata for the captured images. The interface displays an interactive guide to assist in capturing the images. The system 100 can generate the interactive guide using a cage for a vehicle type and the cage defines locations or components of the vehicle. The vehicle identification number is stored as metadata for the captured images and indicates the vehicle type. The system 100 can process the captured images and metadata to detect defects of the vehicle and compute vehicle metrics, the processing based on different tasks dispatched to agent interfaces to receive input data for detecting the defects of the vehicle and computing the vehicle metrics. The system 100 can process the vehicle metrics to compute cost data for repair of the defects of the vehicle. The system 100 can compute a market value estimate for the vehicle using the vehicle metrics and the cost data. The system 100 can generate an interface with visual elements corresponding to the interactive guide, the market value estimate, the cost data, and at least a portion of the vehicle metrics.

In some embodiments, the system 100 receives a device identifier as metadata for the captured images. In some embodiments, the system 100 dynamically configures the vehicle capture module based on a vehicle type to generate the interactive guide corresponding to the cage. This can be an overlay. In some embodiments, the system 100 computes the vehicle type by capturing an image of or scanning a barcode of the vehicle to determine a vehicle identification number. This can trigger the interactive guide based on vehicle type, for example. The capture of data can trigger updates to the interface to guide further capture of data.

In some embodiments, the system 100 computes the vehicle metrics by dispatching a plurality of tasks simultaneously to a plurality of agents, each task to a corresponding agent. Each task is associated with a portion of the captured images to display for the corresponding agent to receive input data for computing the vehicle metrics. This display can include indicators or highlights to guide capture process.

In some embodiments, the system 100 computes, from the captured images, the vehicle identification number. The system 100 is configured to receive an error message from the vehicle capture module upon determining that the vehicle identification number could not be successfully computed from the captured images, and in response updates the interface application with the visual elements corresponding to the interactive guide to re-capture an image to compute the vehicle identification number. This helps the capture process.

In some embodiments, the system 100 computes the vehicle identification number by decoding the vehicle identification number from the captured images and, if not able to automatically decode the vehicle identification number, dispatches a task to an agent along with at least a portion of the captured images to receive input data for the vehicle identification number in response. The portion of the captured images indicates to a vehicle identification number plate.

In some embodiments, the system 100 computes, from the captured images, interior data. The interface application is configured to receive an error message from the vehicle capture module upon determining that the interior data could not be successfully computed from the captured images, and in response, system 100 updates the interface application with the visual elements corresponding to the interactive guide to re-capture an image to compute the interior data.

In some embodiments, the system 100 computes the interior data by dispatching three tasks simultaneously to three agents, each task to a different agent, a first task for a colour of the interior, a second task for an overall condition of the interior, and a third task a transmission type of the interior.

In some embodiments, the system 100 computes, from the captured images, odometer data. The interface application is configured to receive an error message from the vehicle capture module upon determining that the odometer data could not be successfully computed from the captured images, and in response system 100 updates the interface application with the visual elements corresponding to the interactive guide to re-capture an image to compute the odometer data.

In some embodiments, the system 100 computes, from the captured images, view data. The interface application is configured to receive an error message from the vehicle capture module upon determining that the view data could not be successfully computed from the captured images, and in response system 100 updates the interface application with the visual elements corresponding to the interactive guide to re-capture images to compute the view data, the view data being for a front view, side view and rear view of the vehicle.

In some embodiments, the system 100 computes, from the captured images, windshield data. The interface application is configured to receive an error message from the vehicle capture module upon determining that the windshield data could not be successfully computed from the captured images, and in response system 100 updates the interface application with the visual elements corresponding to the interactive guide to re-capture an image to compute the windshield data.

In some embodiments, the system 100 computes, from the captured images, tire data. The interface application is configured to receive an error message from the vehicle capture module upon determining that the tire data could not be successfully computed from the captured images, and in response system 100 updates the interface application with the visual elements corresponding to the interactive guide to re-capture an image to compute the tire data.

In some embodiments, the system 100 generates visual elements corresponding to a vehicle shape to facilitate the image capture process. In some embodiments, the system 100 generates visual elements corresponding to different parts of the vehicle to generate the metadata, the metadata indicating a location on the image and a corresponding descriptor label.

An example vehicle metric is Vehicle Identification Number (VIN). The interactive guide can include instruction for the user on how to capture the VIN plate that can be located inside the opening of the driver's door.

Figure 37:
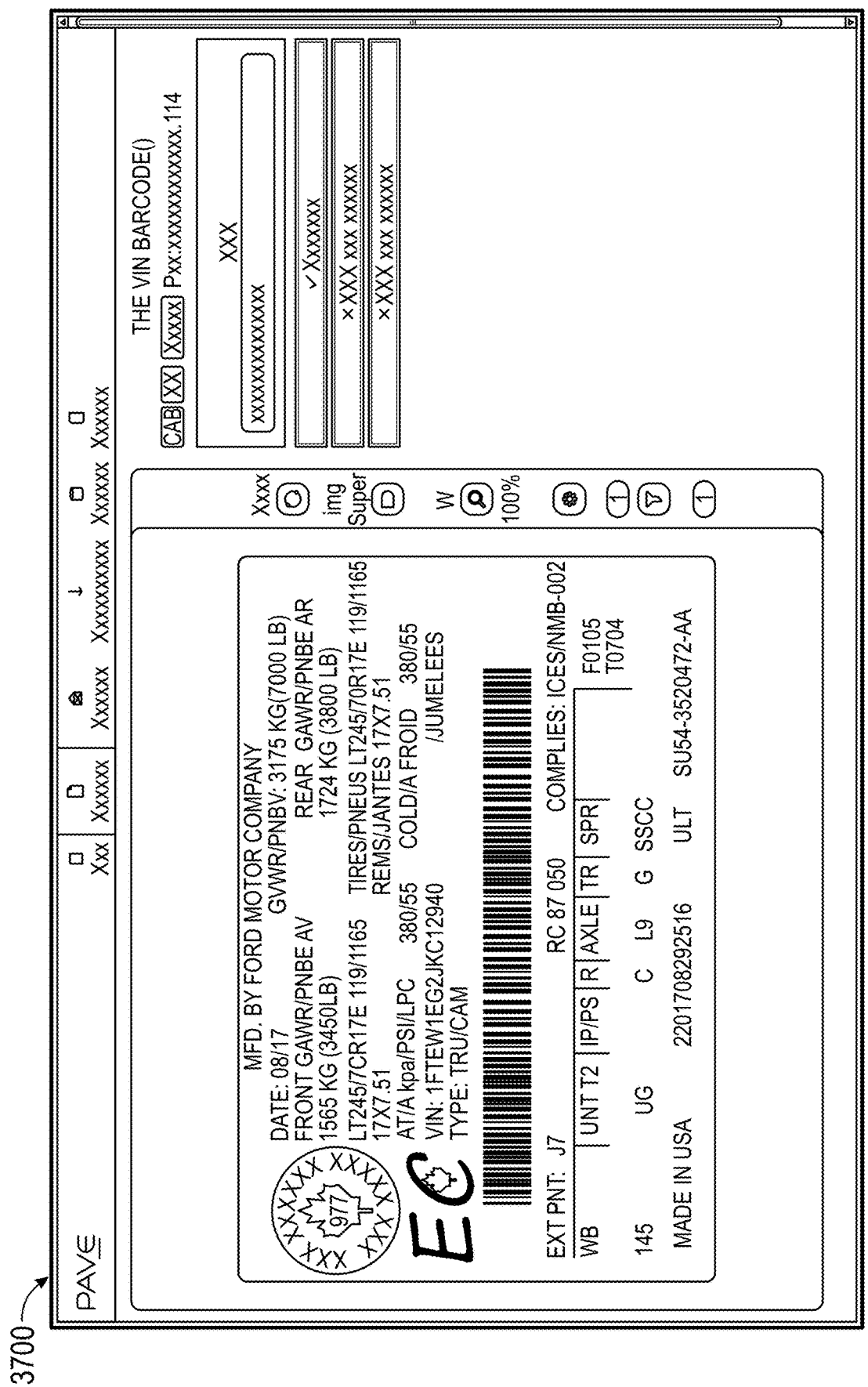
FIG. 37 is an example image of a vehicle identification number plate.

FIG. 37 is an example interface 3700 with an image of a VIN plate.

The system 100 can first attempt to automate the capture and decoding of the vehicle's VIN by passing the image (of the VIN plate) through a Barcode and QR Code reader. The system 100 can run a checksum on the returned characters to determine if the captured VIN is valid. The system 100 then passes this VIN to a VIN decoder that when successfully decoded will return data for the vehicle metrics such as Year, Make, Model along with available optional data like Trim, Interior and Exterior Colours, Additional Equipment options, and so on.

If the VIN is unable to be decoded automatically by the system 100 through the image process, then the system 100 can dispatch a task to a live agent along with one or more images. The system 100 can generate and populate a task dashboard displaying the images relevant to the task along with input data fields to receive input data (e.g. pertaining to vehicle elements shown in the displayed images). The task dashboard can be used by the agent who will visually inspect the VIN plate in the image and capture the characters of the VIN by inputting the data each into the input data fields. The dashboard can also prompt the agent to input any additional labeling that may be contained on the image (e.g. image of the VIN plate) such as Interior Trim identifier and Exterior Trim identifier. The identifiers can automatically identify the factory colour names based on matches to the vehicle option data that was linked to the VIN decoder. This task of inputting these trim codes and learning from the image based on the input data for all VIN plates depicted in captured image can be used for automated machine learning. The learning can be based on labeled images (images with corresponding metadata indicating items shown in the images) that identify the correct placement and characters associated with the task.

Other example vehicle metrics relate to interior data.

The system 100 can use different tasks to capture interior data for the vehicle and can dispatch the different tasks to different agents simultaneously. A first agent can perform a first task simultaneous to a second agent performing a second task. Each agent can access a task dashboard to view images (or portions thereof) and provide input data based on the display image.

Figure 38:
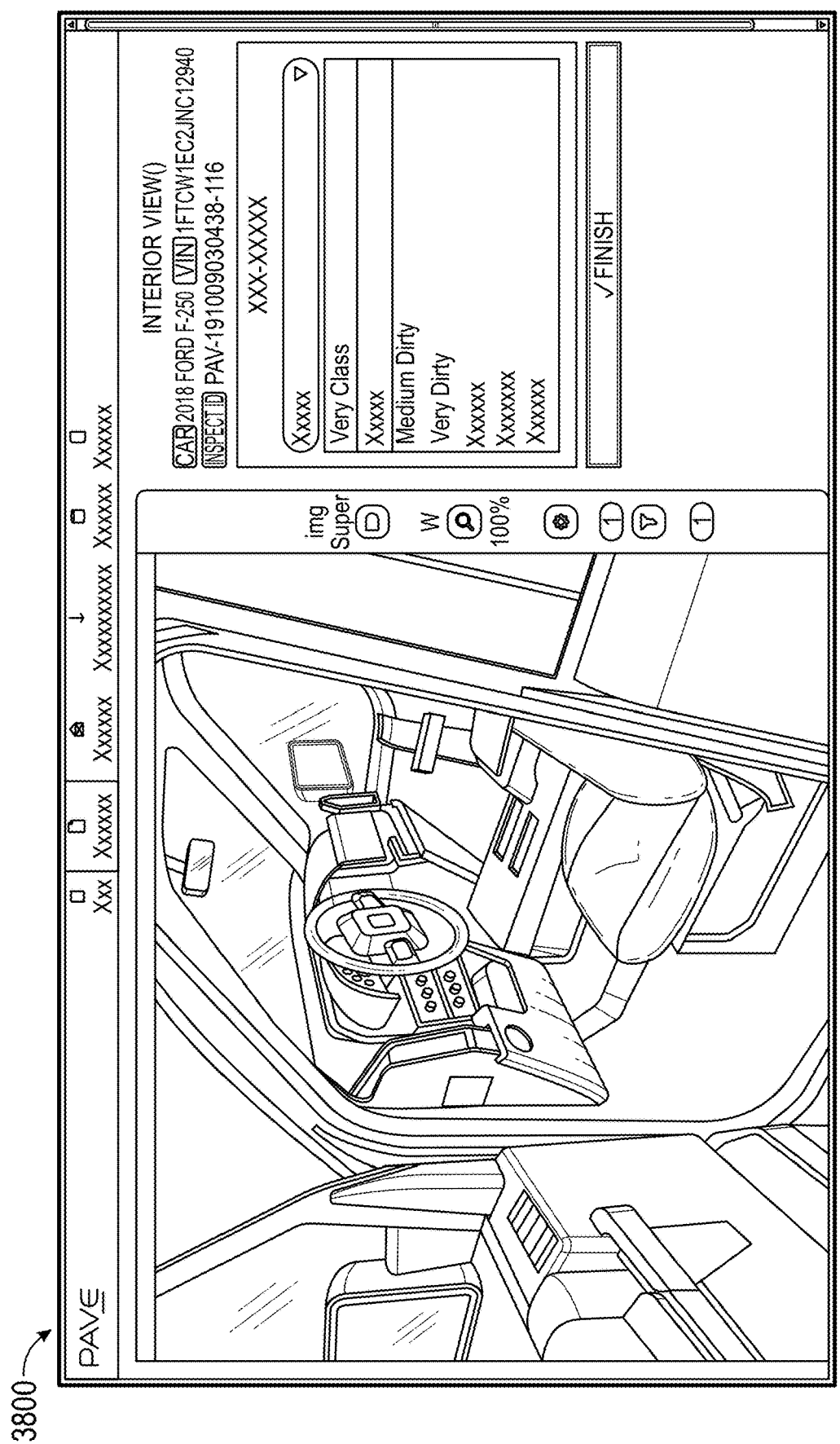
FIG. 38 is an example task (or agent) dashboard for interior data.

FIG. 38 is an example task (or agent) dashboard 3800 for interior data. The dashboard interface shows an image of an interior of vehicle along with different input data fields for receiving input data. The interactive guide can have visual elements that provide instructions to the user to capture images of the interior of the vehicle.

The system 100 can use different tasks to capture different interior data. Example interior data relates to colour, condition, and transmission type. For example, there can be three tasks to capture different interior data associated with the captured images of the interior of the vehicle. The system 100 can separate and dispatch each individual job or task to be performed by each agent simultaneously. The system 100 can compile a set of relevant data for each task to simultaneously dispatch to a task dashboard or agent interface. For this example, agent number 1 can be provided with the task to verify and label the color of the interior by matching the color options returned for the associated VIN. Agent number 2 is assigned and dispatched the task to inspect and identify the overall condition of the interior based on grading tolerances or grading bands. Agent number 3 is asked to verify and label the transmission type of the vehicle.

Other example vehicle metrics relate to instrument data from captured images of the instrument cluster of the vehicle. The instrument data can be odometer data.

The interactive guide can update with visual elements to instruct the user to capture images of the instrument cluster of the vehicle.

Figure 39:
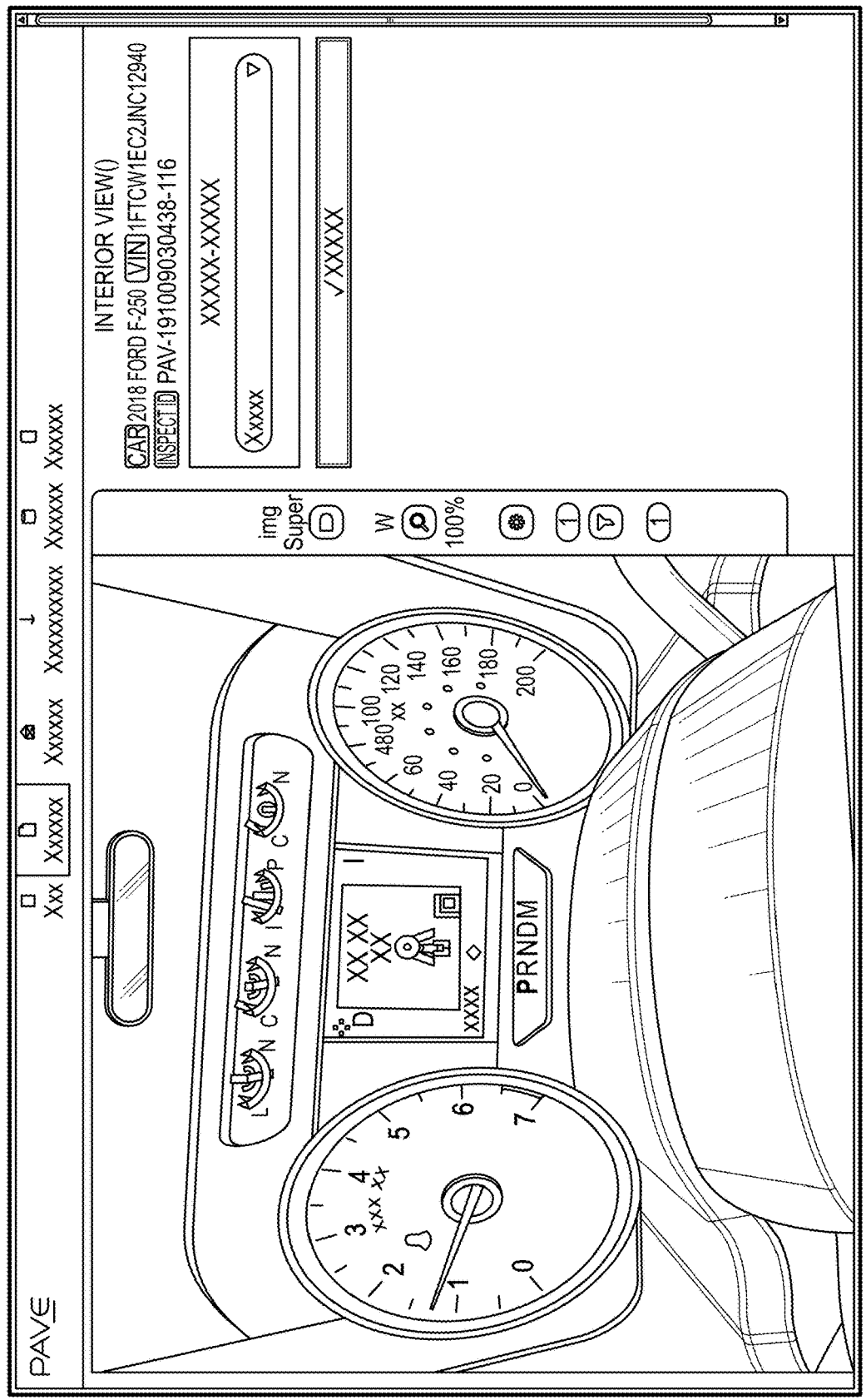
FIG. 39 an example task (or agent) dashboard for instrument data or odometer data.

FIG. 39 an example task (or agent) dashboard 3900 for instrument data or odometer data.

The system 100 can generate a task for one agent to inspect the instrument cluster to input the odometer reading that is illuminated on the photo and identify the odometer type indicating if the mileage is measured in miles or kilometers. The task dashboard can illuminate portions of the image to facilitate the capture process. The task dashboard can use visual overlays for portions of the image to facilitate the capture process.

Other example vehicle metrics relate to view data from captured images of the instrument cluster of the vehicle. The view data can be side view data, front view data, rear view data, and so on.

Example side view data can be left view data or right view data. The interactive guide can update with visual elements to instruct the user to capture images of the left view of the vehicle from (e.g. three) specified angles or the view of the vehicle from (e.g. three) specified angles.

The left or right view of the vehicle is separated into several specific tasks that are dispatched and performed simultaneously by several agents.

FIG. 40 an example interface 4000 with input fields for different view data metrics. The example view data shown includes quality control, data part, damage body, damage glass, damage wheel, and trim identifier. Each type of view data has corresponding data elements that can be shown visually in the interface as both a data value and visual representation of the data value.

Figure 41:
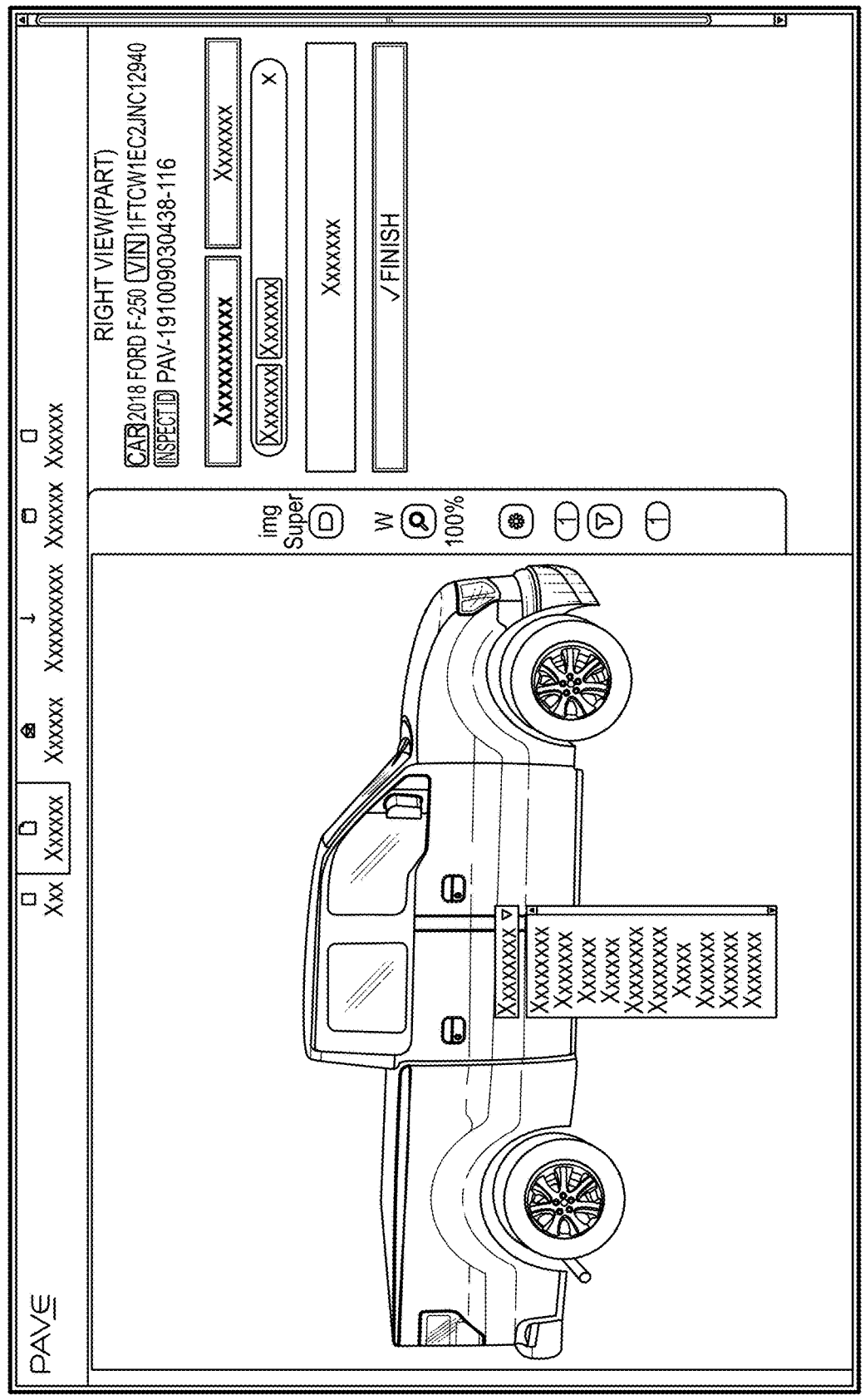
FIG. 41 an example task (or agent) dashboard for view data.

FIG. 41 an example task (or agent) dashboard 4100 for side view data. A dashboard is an example interface. The interface has an interactive guide that updates to show an overlay corresponding to a cage for the vehicle. The cage can be based on vehicle type which can be determined based on the VIN, for example. The cage can be used by the system 100 to identify locations or components of the vehicle. The agent can provide input data to annotate the image of the vehicle.

There are different example tasks and agents for capturing side view data that can correspond to damage for the vehicle. Example data linked to side view data (or captured images depicting side view of the vehicle) includes quality control, data part, damage body, damage glass, damage wheel, trim identifier, and so on. The data can be linked to different tasks and agents. For example, capturing quality control data involves system 100 populating a dashboard to display images of the side view of a vehicle and the agent provides input data to verify image quality and suitability for inspection. The system 100 can align the image and set the specific cage which preloads into the agent dashboard that matches the vehicle model (from VIN). For example, capturing damage part data involves system 100 populating a dashboard to display images of the side view of a vehicle and the agent provides inspects image and labels any damaged parts. For example, capturing damage body data involves system 100 populating a dashboard to display images of the side view of a vehicle and the agent provides inspects image and labels any damages on the body of the vehicle. The cage can be used to link the labels to locations or components of the vehicle. The system 100 can overlay an image of a cage on the image of the vehicle. For example, capturing damage glass data involves system 100 populating a dashboard to display images of the side view of a vehicle and the agent provides inspects image and labels any damages on the glass of the vehicle. The cage can be used to link the labels to locations or components of the vehicle. As another example, capturing damage wheel data involves system 100 populating a dashboard to display images of the side view of a vehicle and the agent provides inspects image and labels any damages on the wheels of the vehicle. For example, capturing trim identifier data involves system 100 populating a dashboard to display images of the side view of a vehicle and the agent identifies any visible badging or other model specific visually recognizable ways to identify the specific trim or option packages that is associated to the vehicle.

Example view data can be right side view data. The interactive guide can update with visual elements to instruct the user to capture images of the right side of the vehicle from (e.g. three) specified angles. For example, interactive guide can update with visual elements to instruct the user to capture images of the right side view of the vehicle from specified angles. The right view can be managed and dispatched the same as the left view, for example.

Example view data can be front view data. The interactive guide can update with visual elements to instruct the user to capture images of the front view of the vehicle from (e.g. three) specified angles.

The front view data capture process for the vehicle is separated into several specific tasks that are dispatched and performed simultaneously by several agents. For example, front view data capture process can be separated into four specific tasks that are dispatched and performed simultaneously by several agents.

Figure 42:
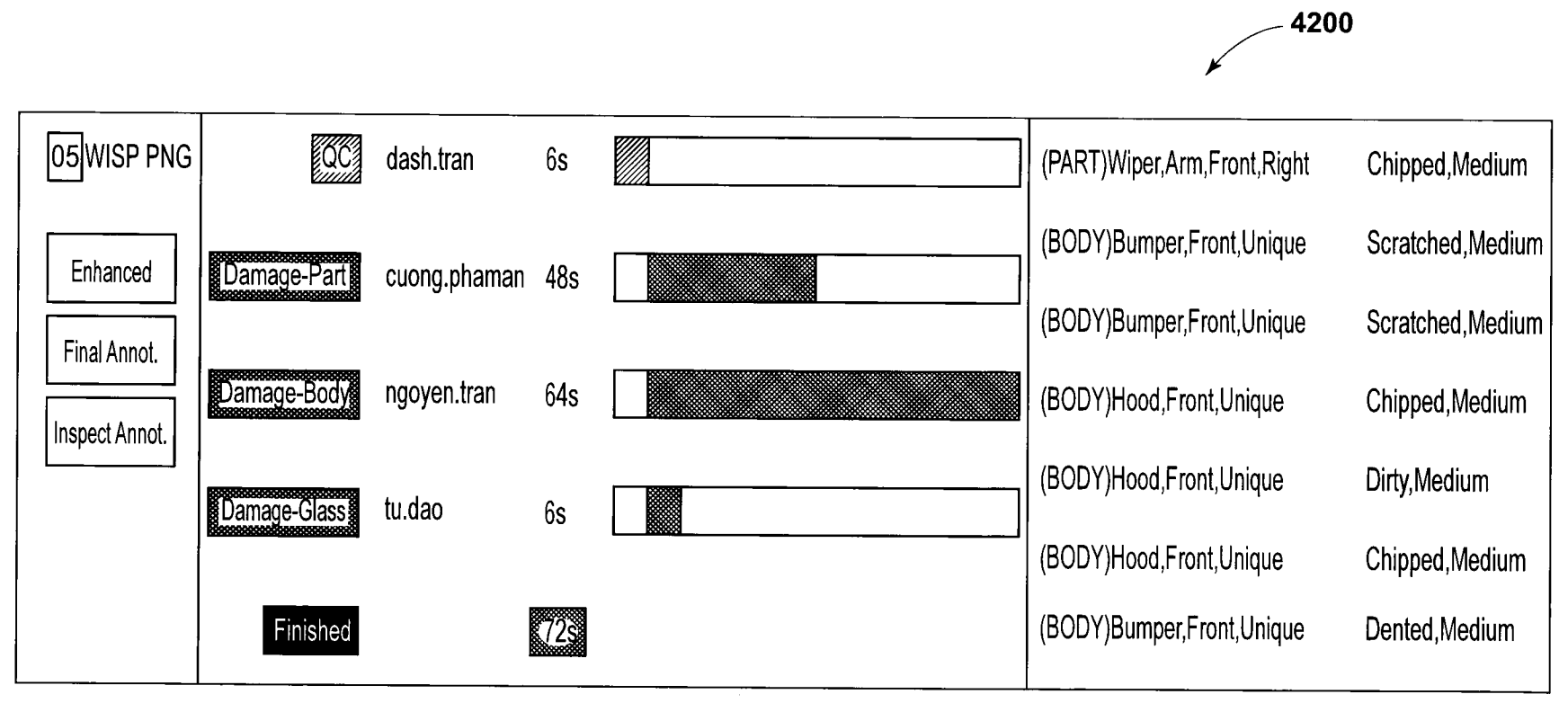

FIG. 42 an example interface 4200 with input fields for front view data metrics. The example front view data shown includes quality control, data part, damage body, damage glass, and damage wheel. Each type of front view data (part wiper arm front, body bumper front, body hood front) has corresponding data elements (chipped medium, scratched medium, dented medium, dented high, dirty low) that can be shown visually in the interface as both a data value and visual representation of the data value.

There can be a task (or agent) dashboard for front view data. The interface has an interactive guide that updates to instruct agent to provide specific front view data.

There are different example tasks and agents for capturing front view data that can correspond to damage for the vehicle. Example data linked to front view data (or captured images depicting side view of the vehicle) includes quality control, data part, damage body, damage glass, and so on. The data can be linked to different tasks and agents. For example, capturing quality control data involves system 100 populating a dashboard to display images of the front view of a vehicle and the agent provides input data to verify image quality and suitability for inspection. The system 100 can align the image and set the specific cage which preloads into the agent dashboard that matches the vehicle model (from VIN). For example, capturing damage part data involves system 100 populating a dashboard to display images of the front view of a vehicle and the agent provides inspects image and labels any damaged parts. For example, capturing damage body data involves system 100 populating a dashboard to display images of the front view of a vehicle and the agent provides inspects image and labels any damages on the body of the vehicle. The cage can be used to link the labels to locations or components of the vehicle. The system 100 can overlay an image of a cage on the image of the vehicle. For example, capturing damage glass data involves system 100 populating a dashboard to display images of the front view of a vehicle and the agent provides inspects image and labels any damages on the glass of the vehicle. The cage can be used to link the labels to locations or components of the vehicle.

Example view data can be tire data. The interactive guide can update with visual elements to instruct the user to capture images of the tires of the vehicle from specified angles. For example, interactive guide can update with visual elements to instruct the user to capture images of the right tire tread from a specified angle.

The tire data capture process for the vehicle can be separated into one or more specific tasks that are dispatched and performed simultaneously by agents. The captured image of the tire can dispatched to an agent to inspect and label the tread condition based on different tolerances.

Figure 43:
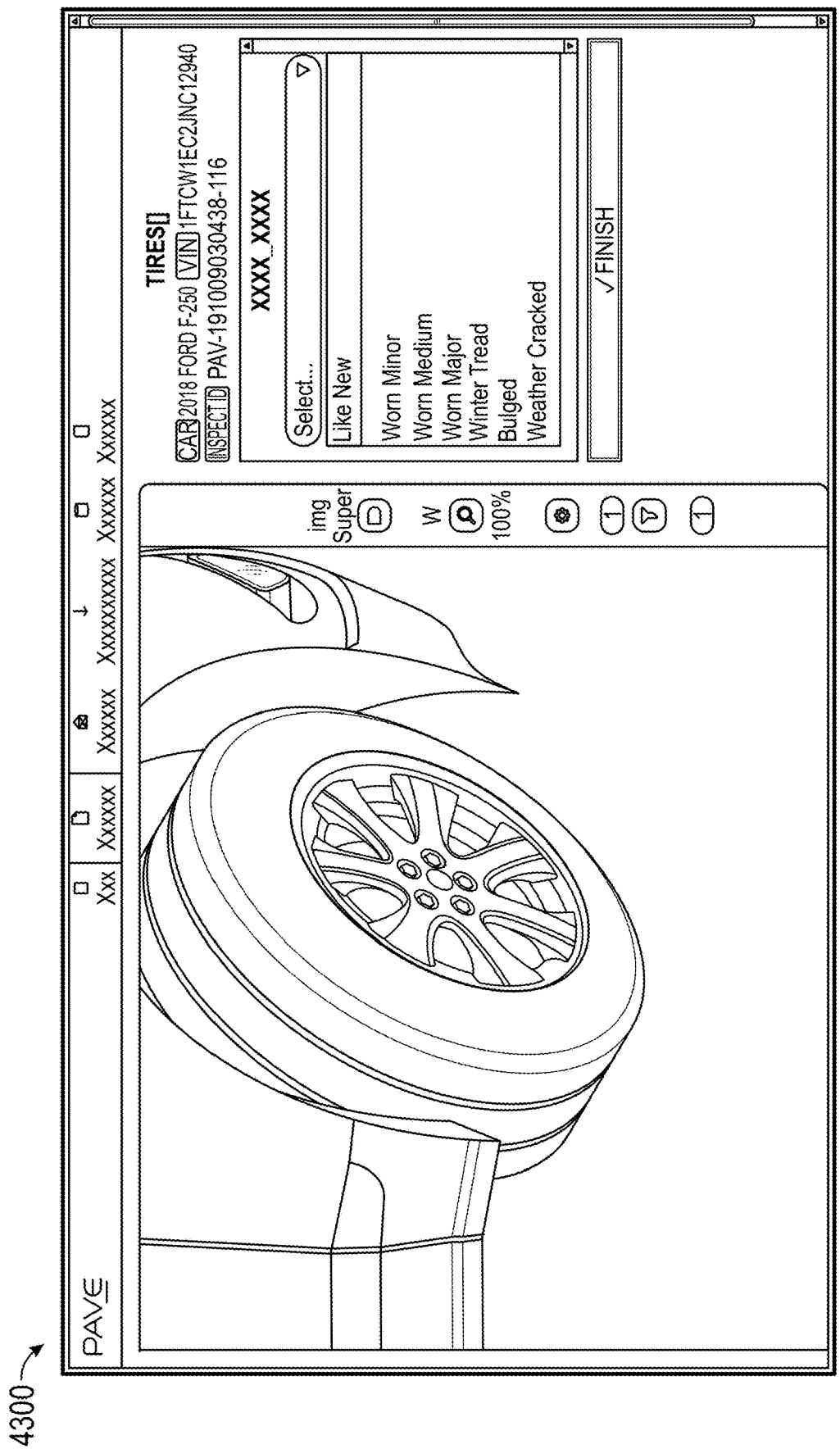
FIG. 43 is an example task (or agent) dashboard for tire data.

FIG. 43 is an example task (or agent) dashboard 4300 for tire data. The interface has an interactive guide that updates to instruct agent to provide specific tire data.

Example view data can be rear view data. The interactive guide can update with visual elements to instruct the user to capture images of the rear view of the vehicle from (e.g. three) specified angles.

The rear view is managed and dispatched as described in relation to the front view data with one additional task that is dispatched to identify as described in relation to the side view data.

Example view data can be windshield data. The interactive guide can update with visual elements to instruct the user to capture images of the windshield of the vehicle from specified angle(s).

Figure 44:
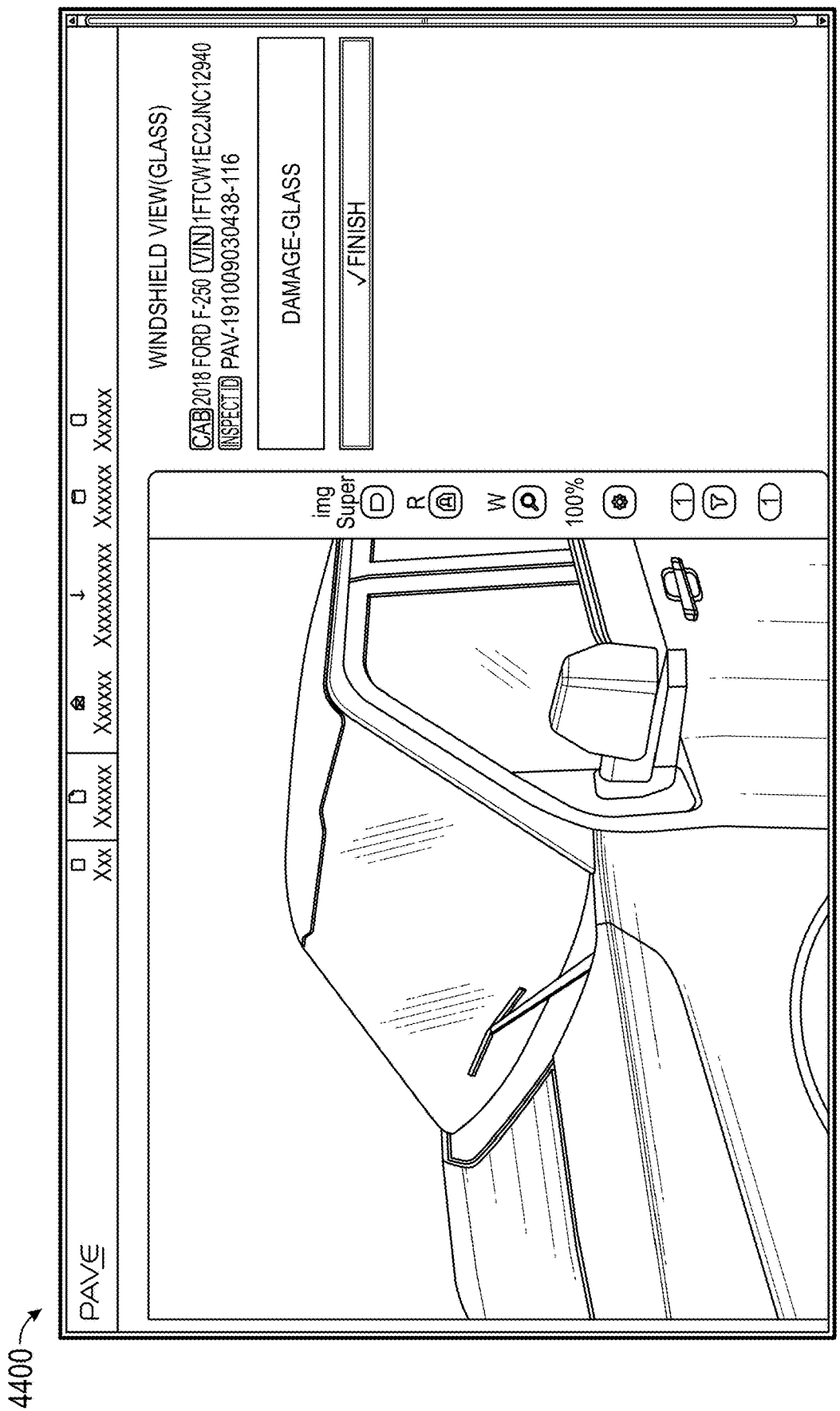
FIG. 44 an example task (or agent) dashboard for windshield data.

FIG. 44 an example task (or agent) dashboard 4400 for windshield data. The interface has an interactive guide that updates to instruct agent to provide specific windshield data.

The windshield data capture process for the vehicle can be separated into one or more specific tasks that are dispatched and performed simultaneously by agents. The captured image of the windshield can be dispatched to an agent to inspect and label any damages to the glass according to different tolerances.

Figure 45:
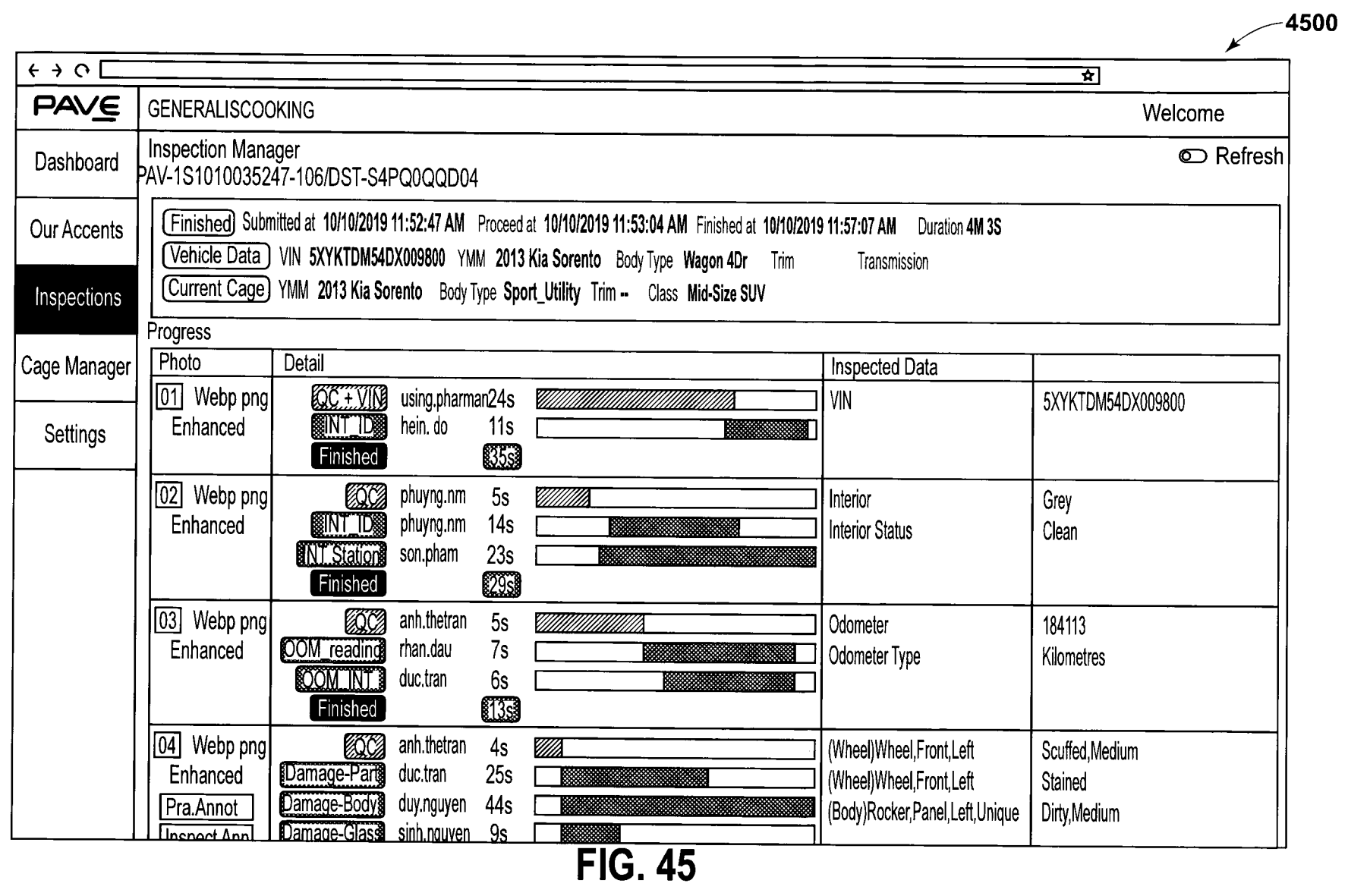
Figure 46:
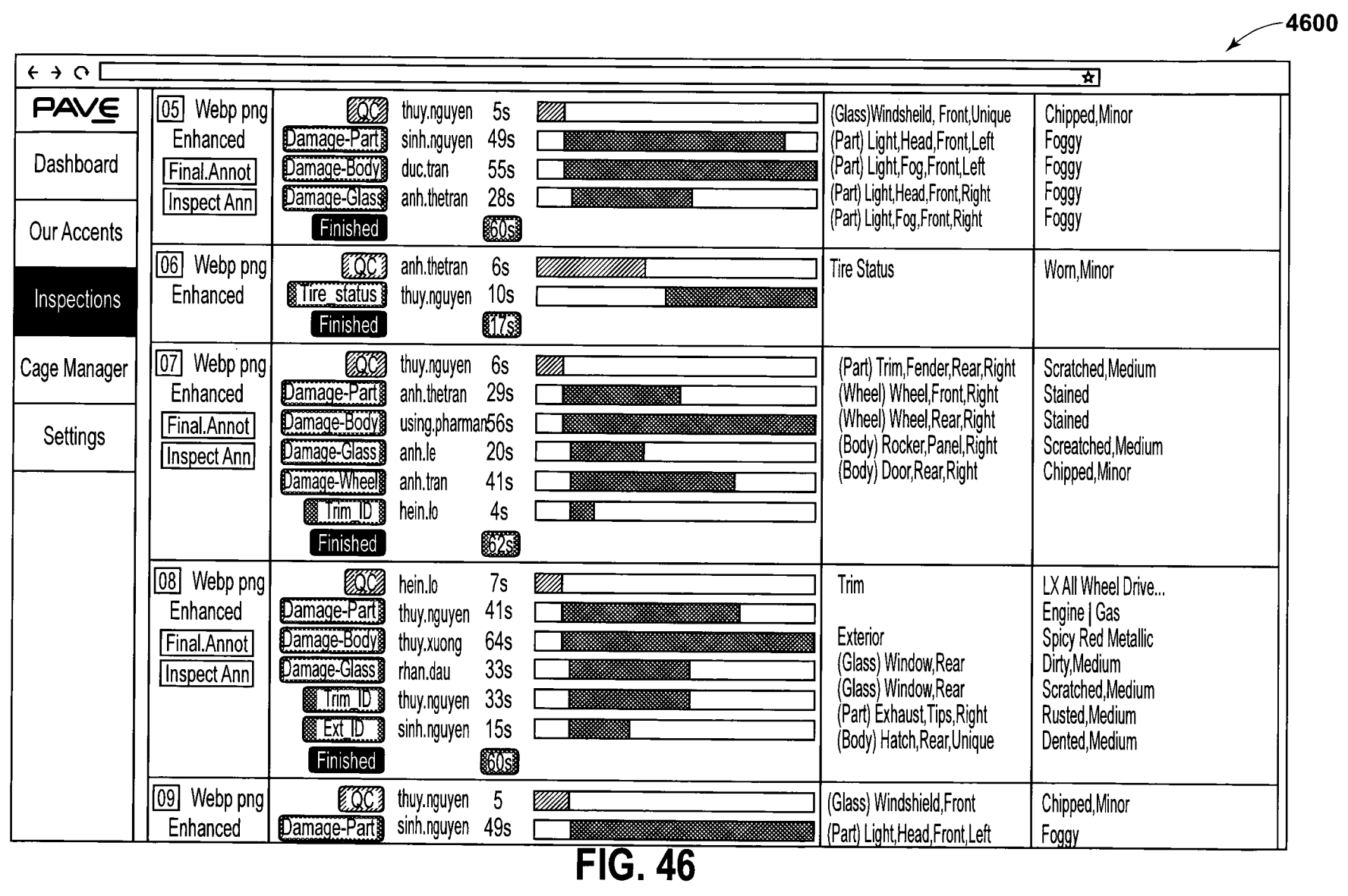

FIGS. 45 and 46 are examples interface 4500, 4600 for the task (or agent) dashboard. The interface has different visual elements corresponding to captured data for the vehicle. The interface also includes data fields to receive input data for different vehicle metrics. The interface has different views that correspond to different roles. For example, the interface shows a view for an inspection manager. The interface indicates different vehicle metrics. The interface can indicate one or more tasks for the agent to complete and can update to display visual elements relevant to the task to assist the data capture process. The interface can optimize the display of an image (or a portion of the image) based on the task. The interface can display a cage overlay in some examples. The interface can illuminate or highlight portions of the image in some examples. The inspection data includes different data elements for the vehicle along with corresponding data values. For example, vehicle wheel data can indicate front left scuffed medium, front left stained. The data can be linked to different components or locations. The values can indicate damage or tolerance, for example.

FIG. 47 is an example interface 4700 for the task (or agent) dashboard that can include a list of detected damage or defects to the vehicle. The detected damage data can be linked to a group such as wheel, body, part, glass. The detected damage data can have a description, tolerance, repair, unit measure. The interface has different visual elements corresponding to captured data for the vehicle. The interface has a visual elements corresponding to different grading standards and can also indicate different grading values (2, D, poor condition).

The system 100 can use machine vision and image processing to evaluate a used car and address questions that arise throughout the used car buying process. The interface application 130 provides user guides to facilitate the image capture workflow using the vehicle recognition modules 132. The system 100 can generate a link to direct to the user to the interface application 130. The interface application 130 can guide the user to open the car door and scan the barcode inside the door. The barcode can be used to identify the vehicle type and system 100 can lookup corresponding vehicle data. The vehicle capture modules 132 can be dynamically configured based on the vehicle type. The system 100 can process vehicle images to determine vehicle metrics, such as mileage and defects or damages. The vehicle capture modules 132 can be used to capture audio data for a sound bit when you start the car (may indicate engine trouble etc.). The system 100 uses image recognition engine 120 to automatically detect marks and damage.

The system 100 can implement supervised training for the recognition engine to build up database for image processing. Images of vehicles can be labeled with metadata for the training process, for example. The metadata can indicate paint color, defects, damage, and so on.

The system 100 can filter or pre-process the image to check the clarity of the image (e.g. environmental conditions) and use the interface application 130 to give feedback to the user (it looks dark, car is covered in snow).

The system 100 generates a summary appraisal report including reconditioned value and trade value. The system 100 can collect actual trade values from dealer (e.g. from a CMS database) that can be used to retrain the system 100. Repair costs can be feed back into the system 100 for training. The system 100 can collect data about the "pedigree" of the vehicle and care for the vehicle using the history data. The system 100 can use the API 124 to integrate with dealer CRM so that a user does not need to restart the process each time.

The system 100 uses data models of images and sounds captured and categorized for data training. The live data agent interface with the method of dispatching so that multiple agents can share the tasks for each user session without causing long delays as the system 100 evaluates the vehicle's condition and details. This live agent interface can be easily interpreted and implemented by the agent. The interface automatically triggers specific scenarios based on what the agent indicates by either dragging and dropping images or simply clicking the appropriate buttons.

To use image recognition for evaluating the condition of a vehicle requires the system 100 can automatically compute vehicle metrics and detect a vehicle by its shape or special characteristics. The system 100 is able to also recognize the specific parts of the vehicle and needed to understand and recognize the specific imperfections and the severity of these imperfections and know how each would specifically affect the market value of a vehicle.

The system 100 can be used for online dealer appraisals. The system 100 can be utilized on a dealership or manufacturer's website to provide an online prospect to use to evaluate their trade-in vehicle to an automatically generated value and offer for their trade-in as part of a transaction for purchasing a replacement vehicle or to sell their vehicle directly to the dealership.

The user would click a link on the website that would detect if the user is on a mobile device or if they are visiting from a computer. If the user is on a mobile device the vehicle capture module 132 can open in a new browser on their device and greet them with instructions. If the user is on their computer the system 100 can send them the link to their device using SMS by having the user enter their mobile phone number to receive the text message from the system 100 containing the link.

Once opened the interface application 130 can guide the user to walk around their vehicle and capture the appropriate views following each step using the provided modules that access their device camera and microphone to capture the required images and sounds to be processed.

As the system 100 detects information and defects the user is prompted to confirm these findings. If the user denies any information or defects the data will not be used to calculate the condition and value but it is passed to the dealership to allow for further inspection when the vehicle is physically present.

At the end of the process and when all the images and sounds have been analyzed the system 100 generates a comprehensive appraisal of their vehicle and a value the dealer would pay them on trading or selling them the vehicle.

The vehicle details, condition report and value provided are passed to the website and the dealership's customer management system to allow the user to reference this information on other tools found on the website like build and pricing modules and their vehicle information is already populated at the dealership to accompany them during an in-store visit to eliminate any repeated processes.

The system can be used for vehicle lease returns. The leasing company as part of their end of lease procedure with maturing leases would send the leasee a link to their mobile device to perform their own vehicle inspection before returning the leased vehicle.

The user would be guided through the capture modules 132 that would capture the appropriate views required to complete the leasing companies lease return inspection. The user will be asked to confirm any information or defects detected as the system analyzes the images to complete the inspection. At the end of the process the system 100 can generate a condition report and an estimate of the damages to be paid or repaired by when they return the vehicle.

The system can be used for rental vehicle returns. The car rental company as part of their rental return procedure would send the renter a link to their mobile device to perform their own vehicle inspection before returning the rented vehicle. The user would be guided through the capture modules 132 that would capture the appropriate views required to complete the rental return inspection. The user will be asked to confirm any information or defects detected as the system 100 analyzes the images to complete the inspection. At the end of the process the system 100 can generate a condition report and an estimate of the damages to be paid or repaired by when they return the vehicle.

The system 100 can be used for vehicle subscription returns. The vehicle subscription of rideshare company as part of their changing vehicle procedure would send to a subscriber a link to their mobile device to perform their own vehicle inspection before returning the vehicle. The user would be guided through the capture modules 132 that would capture the appropriate views required to complete the vehicle return inspection. The user will be asked to confirm any information or defects detected as the system 100 analyzes the images to complete the inspection. At the end of the system 100 generates a condition report and an estimate of the damages to be paid or repaired by when they return the vehicle.

The system 100 can be used for online auction vehicle booking. As a seller would book a vehicle to be auctioned online they would receive a link to their mobile device to be guided to complete an inspection of the vehicle using the capture modules 132. The system 100 would inspect the images to complete the vehicle inspection report to accompany the auction listing that is viewable by potential bidders and buyers online as a third-party validation of the condition of the vehicle.

The system 100 can be used for vehicle online marketplace condition validation. As a seller would book a vehicle to be listed on an online used vehicle marketplace they would receive a link to their mobile device to be guided to complete an inspection of the vehicle using the capture modules 132. The system 100 would inspect the images to complete the vehicle inspection report to accompany the marketplace listing that is viewable by potential buyers online as a third-party validation of the condition of the vehicle.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

APPENDIX

System API Vehicle Inspection & Grading Example

The system 100 uses the results of each inspection to designate a vehicle with three specific industry standard condition report grading bands. To better unify with the industry integrations for multiple use cases. The system 100 utilizes three example industry standards used to determine the grade bands it will designate for each inspection. These two systems will align with the standards used by most of SYSTEM 100's API clients. The three standards we replicated within the system 100 API can be the NAMA Grading Standard, the NAAA Grading Standard and Kelly Blue Book Grading System.

The system 100 also utilizes the BVRLA Fair Wear & Tear guidelines and tolerances when inspecting each vehicle.

The NAMA Grading Standard (Source: THE NATIONAL ASSOCIATION OF MOTOR AUCTIONS)

The scheme consists of 5 grades, that are either A to E or 1 to 5. There is also U, an unclassified grade for vehicles that are badly accident damaged or require high levels of repair. Also many auctions and vendors choose to give certain cars an unclassified grade probably if they are very high mileage or are too old to market.

NAMA Grading Bands

Grade A/1

The vehicle may have minor interior and exterior defects that require SMART repairs, i.e. minor scratches or dents. Minor replacement parts may also be required. These will all be recorded on the appraisal.

a combination of the following:

Minor repairs, for example, small dent without paint damage or touch in type repair Missing minor trim items, e.g. tow eye cover Excludes:

Any panels which require paint

Grade B/2

The vehicle may require repairs as Grade 1, plus up to 1 major or minor body shop repair to an individual panel or bumper. The replacement of more significant internal or external trim parts (excluding panels) may also be required. These will all be recorded on the appraisal.

1 medium body shop repair or a combination of 1 medium bodyshop repair and several minor repairs May have up to 7 minor repairs or a combination of minor repairs and small missing components Excludes:

Any vehicle with more than 1 medium bodyshop repair

Grade C/3

The vehicle may require repairs as Grade 1 & 2, plus it may require up to 5 minor body shop repairs, 3 major body shop repairs or a combination of major and minor repairs. The vehicle may require 1 replacement bumper but not 2. These will all be recorded on the appraisal.

Up to 4 medium bodyshop repairs

Could require a new bumper but not 2

Up to 3 major bodyshop repairs

Grade D/4

The vehicle may require repairs as Grade 1, 2 & 3. It may have a combination of repairs including a replacement panel, but this will exclude structural panels such as roofs and quarter panels. These will all be recorded on the appraisal.

A single major repair and some medium and/or minor repairs

Excludes:

Major repairs to structural components; example roof of quarter repair

More than 1 major repair

Grade E/5

The vehicle may repairs as Grade 1, 2, 3 & 4. It may have a combination of repairs or the vehicle may have sustained collision damage where the replacement up to 2 structural panels may be required (providing there is no other damage on the vehicle). These will all be recorded on the appraisal.

More than 2 major repairs

Excludes:

More than 5 major repairs

More than 2 structural repairs or 2 with any other damage

Combination of all the above up to a total of 3500 points

Unclassified

Vehicles in this grade are simply uneconomical to appraise and fall into one of the following categories: Substantial accident damage Major parts missing Multiple recorded items (exceeding the criteria of Grade 5) Multiple unrecorded items.

Vehicles in this grade are simply uneconomical to appraise and fall into one of the following categories Substantial Accident Damage Major parts missing Multiple recorded items exceeding the criteria of Grade 5

Multiple unrecorded items

Note: The use of 'U' grade limits the amount of damage that can be recorded against a grade 5 vehicle and keeps the band tighter.

Component/Damage Severity Scores

The system 100 determines the damage/severity of each component during the inspection process as it labels each item with a Damage_Type. The system then determines the most likely repair method based on the type of component and the Damage_Type and this is used to designate a Repair_Type. Once The system 100 has processed this it then determines the Repair_Order along with a score for each item (to designate the NAMA and Kelly Blue Book grading system) that is used to calculate the grading band for each condition report.

The vehicle's grading bands are returned in the API separately by each standard, item score and the overall grade for the Vehicle Condition Report.

The system 100's repair scores and methods used to determine the Repair_Type are as follows:

Damage Types by Component:

Part:

Scratches on "PART"

For any part component that is scratched, they are labeled based on the following severity of the size of scratch.

Fault: Comment

"SCRATCHED_MINOR": "Has Minor Scratch",

"SCRATCHED_MEDIUM": "Has Medium Scratch",

Fault: Damaged

"SCRATCHED_MAJOR": "Has Major Scratch",

Severity:

"SCRATCHED_MINOR": "Has Minor Scratch"

The part has a small scratch that can be touched up or buffed out.

Tolerance based on BVRLA standard:

Small areas of scratching are acceptable

Repair Method:

Report only

Repair Type:

INFO

Unit of Measure:

Per Part

Grade Score:

0

"SCRATCHED_MEDIUM": "Has Medium Scratch"

The part has a medium scratch that can be touched up or buffed out.

Tolerance based on BVRLA standard:

Small areas of scratching are acceptable

Repair Method:
Report only
Repair Type:
INFO
Units of Measure:
Per Part
Grade Score:
0
"SCRATCHED_MAJOR": "Has Major Scratch"
The part has a major scratch and may require replacement.
Tolerance based on BVRLA standard:
Excessive chipping >4 on any panel, 6 per door edge and 8 on any forward-facing panel are not acceptable.
Repair Method:
Replace
Repair Type:
SMART Repair
Units of Measure:
Per Part
Grade Score:
1
Chipped Surfaces on "PART"
For any part component that is chipped, they are labeled based on the following severity of the size of the chip.
Fault: Comment
"CHIPPED_MINOR": "Has Minor Chip",
"CHIPPED_MEDIUM": "Has Medium Chip",
Fault: Damage
"CHIPPED_MAJOR": "Has Major Chip",
Severity:
"CHIPPED_MINOR": "Has Minor Chip"
The part has a small chip that can be touched up with paint.
Tolerance based on BVRLA standard:
Small areas of chipping are acceptable
Repair Method:
Report only
Repair Type:
INFO
Units of Measure:
Per Component
Grade Score:
0
"CHIPPED_MEDIUM": "Has Medium Chip"
The part has a medium chip that can be touched up with paint.
Tolerance based on BVRLA standard:
Small areas of chipping are acceptable
Repair Method:
Report only
Repair Type:
INFO
Units of Measure:
Per Component
Grade Score:
0
"CHIPPED_MAJOR": "Has MajorChip"
The part has a major chip and may require replacement.
Tolerance based on BVRLA standard:
Excessive chipping >4 on any panel, 6 per door edge and 8 on any forward-facing panel are not acceptable.
Repair Method:
Replace
Repair Type:
SMART Repair
Units of Measure:
Per Component
Grade Score:
1
Dents on "PART"
For any part component that is dented, they are labeled based on the following severity of the size of dent.
Fault: Comment
"DENTED_MINOR": "Has Minor Dent",
Fault: Damage
"DENTED_MEDIUM": "Has Medium Dent",
"DENTED_MAJOR": "Has Major Dent",
Severity:
"DENTED_MINOR": "Has Minor Dent"
The part has a small dent and may require replacement.
Tolerance based on BVRLA standard:
<10 mm (half inch) in diameter are acceptable providing there are no more than two per panel and the paint surface is not broken or on the roof/body style line
Repair Method:
Report
Repair Type:
INFO
Units of Measure:
Per Component
Grade Score:
0
"DENTED_MEDIUM": "Has Medium Dent"
The part has a medium dent and may require replacement.
Tolerance based on BVRLA standard:
Excessive chipping >4 on any panel, 6 per door edge and 8 on any forward-facing panel are not acceptable.
Repair Method:
Replace
Repair Type:
SMART Repair
Unit of Measure:
Per Component
Grade Score:
1
"DENTED_MAJOR": "Has Major Dent"
The part has a major dent and requires replacement.
Tolerance based on BVRLA standard:
Excessive chipping >4 on any panel, 6 per door edge and 8 on any forward-facing panel are not acceptable.
Repair Method:
Replace
Repair Type:
SMART Repair
Units of Measure:
Per Component
Grade Score:
1
Cracks on "PART"
For any part component that is cracked, they are labeled based on the following severity of the size of crack.
Fault: Damage
"CRACKED_MINOR": "Has Minor Crack",
"CRACKED_MEDIUM": "Has Medium Crack",
"CRACKED_MAJOR": "Has Major Crack",
"BROKEN": "Is Broken", Severity:
"DENTED_MINOR": "Has Minor Dent"
The part has a small crack and may require replacement.
  Tolerance based on BVRLA standard:
    Excessive chipping >4 on any panel, 6 per door edge and 8 on any forward-facing panel are not acceptable.
  Repair Method:
    Replace
  Repair Type:
    SMART Repair
  Units of Measure:
    Per Component
  Grade Score:
    1
"DENTED_MEDIUM": "Has Medium Dent"
The part has a medium crack and may require replacement.
  Tolerance based on BVRLA standard:
    Excessive chipping >4 on any panel, 6 per door edge and 8 on any forward-facing panel are not acceptable.
  Repair Method:
    Replace
  Repair Type:
    SMART Repair
  Units of Measure:
    Per Component
  Grade Score:
    1
"DENTED_MAJOR": "Has Major Dent"
The part has a major crack and requires replacement.
  Tolerance based on BVRLA standard:
    Excessive chipping >4 on any panel, 6 per door edge and 8 on any forward-facing panel are not acceptable.
  Repair Method:
    Replace
  Repair Type:
    SMART Repair
  Units of Measure:
    Per Component
  Grade Score:
    1
"BROKEN": "Is Broken"
The part is broken and requires replacement.
  Tolerance based on BVRLA standard:
    Excessive chipping >4 on any panel, 6 per door edge and 8 on any forward-facing panel are not acceptable.
  Repair Method:
    Replace
  Repair Type:
    SMART Repair
  Units of Measure:
    Per Component
  Grade Score:
    1
Rust on "PART"
For any part component that is rusted, they are labeled based on the following severity of the size of rust.
Fault: Comment
  "RUSTED_MINOR": "Has Minor Rust",
Fault: Rust
  "RUSTED_MEDIUM": "Has Medium Rust",
  "RUSTED_MAJOR": "Has Major Rust",
Severity:
"RUSTED_MINOR": "Has Minor Rust"
The part has a small area of rust and may be cleaned off.
  Tolerance based on BVRLA standard:
    Small areas of rust are acceptable
  Repair Method:
    Report only
  Repair Type:
    INFO
  Units of Measure:
    Per Component
  Grade Score:
    0
"RUSTED_MEDIUM": "Has Medium Rust"
The part has a medium amount of rust and may require replacement.
  Tolerance based on BVRLA standard:
    Excessive rust >4 on any panel, 6 per door edge and 8 on any forward-facing panel are not acceptable.
  Repair Method:
    Replace
  Repair Type:
    SMART Repair
  Unis of Measure:
    Per Component
  Grade Score:
    1
"RUSTED_MAJOR": "Has Major Rust"
The part has a major rust and requires replacement.
  Tolerance based on BVRLA standard:
    Excessive rust >4 on any panel, 6 per door edge and 8 on any forward-facing panel are not acceptable.
  Repair Method:
    Replace
  Repair Type:
    SMART Repair
  Units of Measure:
    Per Component
  Grade Score:
    1
Dirt on "PART"
For any part component that is dirty, they are labeled based on the following severity of the amount of dirt.
Fault: Comment
  "DIRTY_MINOR": "Is Slightly Dirty",
  "DIRTY_MEDIUM": "Is Medium Dirty",
  "DIRTY_MAJOR": "Is Major Dirty",
Severity:
"DIRTY_MINOR": "Is Slightly Dirty"
The part has a small area of dirt and may be cleaned off.
  Tolerance based on BVRLA standard:
    Does not apply to dirt, mud or snow covered parts.
  Repair Method:
    Report
  Repair Type:
    INFO
  Units of Measure:
    Per Component
  Grade Score:
    0
"DIRTY_MEDIUM": "Is Medium Dirty"
The part has a medium amount of dirt and could not be inspected.

Tolerance based on BVRLA standard:
Does not apply to dirt, mud or snow covered parts.
Repair Method:
Report
Repair Type:
INFO
Units of Measure:
Per Component
Grade Score:
0
"DIRTY_MAJOR": "Is Major Dirty"
The part has a major amount of dirt and could not be inspected.
Tolerance based on BVRLA standard:
Does not apply to dirt, mud or snow covered parts.
Repair Method:
Report
Repair Type:
INFO
Units of Measure:
Per Component
Grade Score:
0
Other issues on "PART"
For other issues with any part component are labeled based on the severity of the issue.
Fault: Damage
   "TAPPED_REPIAR": "Is Held By Tape",
   "MISSING": "Is Missing",
   "WORN": "Shows Signs Of Wear",
   "BURNT": "Has Burn Hole",
   "TORN": "Has A Tear",
   "ROAD_PAINT": "Is Covered With Road Paint",
   "FOGGY": "Is Dull And Foggy",
Severity:
   "TAPPED_REPIAR": "Is Held By Tape"
   The part has tape holding it into place and needs to be replaced.
      Tolerance based on BVRLA standard:
      Excessive rust >4 on any panel, 6 per door edge and 8 on any forward-facing panel are not acceptable.
      Repair Method:
      Replace
      Repair Type:
      SMART Repair
      Units of Measure:
      Per Component
      Grade Score:
      1
   "MISSING": "Is Missing"
   The part is missing and needs to be replaced.
      Tolerance based on BVRLA standard:
      Excessive rust >4 on any panel, 6 per door edge and 8 on any forward-facing panel are not acceptable.
      Repair Method:
      Replace
      Repair Type:
      SMART Repair
      Units of Measure:
      Per Component
      Grade Score:
      1
   "WORN": "Shows Signs Of Wear"
   The part has signs of wear and needs to be replaced
      Tolerance based on BVRLA standard:
      Excessive rust >4 on any panel, 6 per door edge and 8 on any forward-facing panel are not acceptable.
      Repair Method:
      Replace
      Repair Type:
      SMART Repair
      Units of Measure:
      Per Component
      Grade Score:
      1
   "BURNT": "Has Burn Hole"
   The part has a burn hole and needs to be replaced
      Tolerance based on BVRLA standard:
      Excessive rust >4 on any panel, 6 per door edge and 8 on any forward-facing panel are not acceptable.
      Repair Method:
      Replace
      Repair Type:
      SMART Repair
      Units of Measure:
      Per Component
      Grade Score:
      1
   "ROAD_PAINT": "Is Covered With Road Paint"
   The part is covered with road paint and needs to be replaced.
      Tolerance based on BVRLA standard:
      Excessive rust >4 on any panel, 6 per door edge and 8 on any forward-facing panel are not acceptable.
      Repair Method:
      Replace
      Repair Type:
      SMART Repair
      Units of Measure:
      Per Component
      Grade Score:
      1
   "FOGGY": "Is Dull And Foggy"
   The part dull and foggy and needs to be replaced.
      Tolerance based on BVRLA standard:
      Excessive rust >4 on any panel, 6 per door edge and 8 on any forward-facing panel are not acceptable.
      Repair Method:
      Replace
      Repair Type:
      SMART Repair
      Units of Measure:
      Per Component
      Grade Score:
      1
Body:
   Dents on "BODY"
   Dents on a body components are labeled based on the following severity of dent.
Fault: Comment
   "DENTED_MINOR": "Has Minor Dent",
Fault: Damage
   "DENTED_MEDIUM": "Has Medium Dent",
   "DENTED_MAJOR": "Has Major Dent",
   "COLLISION DAMAGE": "Has Collision Damage",
   Severity:
   "DENTED_MINOR": "Has Minor Dent"
   The dent is less than 1 inch in size.
      Tolerance based on BVRLA standard:
      <10 mm (half inch) in diameter are acceptable providing there are no more than two per panel and the paint surface is not broken or on the roof/body style line.

Repair Method:
Report
Repair Type:
INFO
Units of Measure:
Per Item
Grade Score:
0
"DENTED_MEDIUM": "Has Medium Dent"
The dent is over 1 inch in size to a maximum of 4 inches total and may or may not have some paint damage that requires minor body shop repair.
  Tolerance based on BVRLA standard:
  >10 mm (half inch) in diameter and less than 100 mm (4 inches) with no paint damage and not to roof/body style line.
  Repair Method:
  PDR (Cold Metal Repair)
  Repair Type:
  SMART Repair
  Units of Measure:
  Per Item
  Grade Score:
  1
"DENTED_MAJOR": "Has Major Dent"
The dent is over 4 inches in size and may require the component to be replaced or completely resurfaced and painted by a body shop.
  Tolerance based on BVRLA standard:
  >10 mm (half inch) or where the paint surface is broken, >25 mm (1 inch) or where the primer or bare metal is showing.
  Repair & Refinish
  Repair Type:
  Minor Body Shop Repair
  Units of Measure:
  Per Component
  Grade Score:
  3
"COLLISION DAMAGE": "Has Collision Damage",
The dent was damage caused by a collision and requires the component to be replaced or completely resurfaced and painted by a body shop.
  Tolerance based on BVRLA standard:
  >10 mm (half inch) or where the paint surface is broken, >25 mm (1 inch) or where the primer or bare metal is showing.
  Repair Method:
  Replace
  Repair Type:
  Major Body Shop Repair
  Units of Measure:
  Per Component
  Grade Score:
  5
Scratches on "BODY"
Scratches on a body components are labeled based on the following severity of dent.
Fault: Comment
  "PAINT_SCUFF": "Is Scuffed With Other Color Of Paint",
  "SCRATCHED_MINOR": "Has Minor Scratch",
Fault: Scratched
  "SCRATCHED_MEDIUM": "Has Medium Scratch", Fault: Damage
  "SCRATCHED_MAJOR": "Has Major Scratch",
Severity:
  "SCRATCHED_MINOR": "Has Minor Scratch"
The scratch is less than 1 inch in size.
  Tolerance based on BVRLA standard:
  <25 mm (1 inch) where no primer or bare metal is showing/any surface scratches
  Repair Method:
  Report
  Repair Type:
  INFO
  Units of Measure:
  Per Item
  Grade Score:
  0
"PAINT_SCUFF": "Is Scuffed With Other Color Of Paint",
May not be a scratch and is paint from another object or vehicle that has rubbed onto the component and it may be able to be buffed out by hand
  Tolerance based on BVRLA standard:
  <25 mm (1 inch) where no primer or bare metal is showing/any surface scratches
  Repair Method:
  Report
  Repair Type:
  INFO
  Units of Measure:
  Per Item
  Grade Score:
  0
"SCRATCHED_MEDIUM": "Has Medium Scratch"
The scratch is over 1 inch in size to a maximum of 4 inches total and may or may not have some paint damage that requires minor body shop repair.
  Tolerance based on BVRLA standard:
  >25 mm (1 inch) or where the primer or bare metal is showing
  Repair Method:
  Refinish
  Repair Type:
  Minor Body Shop Repair
  Units of Measure:
  Per Item
  Grade Score:
  3
"SCRATCHED_MAJOR": "Has Major Scratch"
The scratch is over 4 inches in size and may require the component to be completely resurfaced and painted by a body shop.
  Tolerance based on BVRLA standard:
  Excessive Damage
  Repair Method:
  Replace
  Repair Type:
  Major Body Shop Repair
  Units of Measure:
  Per Component
  Grade Score:
  4
Rust on "BODY"
Rust on a body components are labeled based on the severity of the rust.
Fault: Comment
  "RUSTED_MINOR": "Has Minor Rust", =INFO
Fault: Damage
  "RUSTED_MEDIUM": "Has Medium Rust", =Minor Body Shop Repair "RUSTED_MAJOR": "Has Major Rust", =Major Body Shop Repair
Severity:
"RUSTED_MINOR": "Has Minor Rust"
The rust covers less than 1 inch in size and can be touched up without going to a body shop.
   Tolerance based on BVRLA standard:
   Not covered in BVRLA
   Repair Method:
   Report
   Repair Type:
   INFO
   Units of Measure:
   Per Item
   Grade Score:
   0
"RUSTED_MEDIUM": "Has Medium Rust"
The rust covers more than 1 inch and is less than 4 inches in size. Requires a body shop to resurface and paint.
   Tolerance based on BVRLA standard:
   Not covered in BVRLA
   Repair Method:
   Repair & Refinish
   Repair Type:
   Minor Body Shop Repair
   Units of Measure:
   Per Component
   Grade Score:
   3
"RUSTED_MAJOR": "Has Major Rust"
The rust covers more than 4 inches and is requires a body shop to replace and paint component.
   Tolerance based on BVRLA standard:
   Not covered in BVRLA
   Repair Method:
   Repair & Refinish
   Repair Type:
   Major Body Shop Repair
   Units of Measure:
   Per Component
   Grade Score:
   4
Other Issues with "BODY"
Other issues on a body components are labeled based on the severity of the issue.
Fault: Comment
   "FOGGY": "Is Dull And Foggy",
   "DIRTY_MINOR": "Is Slightly Dirty",
   "DIRTY_MEDIUM": "Is Medium Dirty",
   "DIRTY_MAJOR": "Is Major Dirty",
Fault: Damage
   "OXIDIZED_PAINT": "Paint Is Oxidized or Faded",
   "ROAD_TAR": "Has Road Tar Stain",
   "ROAD_PAINT": "Is Covered With Road Paint",
     "WORN": "Shows Signs Of Wear",
   "MISSING": "Is Missing",
   "TAPPED_REPIAR": "Is Held By Tape",
   "BROKEN": "Is Broken",
     "WRONG_COLOR": "Paint Does Not Match",
Severity:
"FOGGY": "Is Dull And Foggy"
The paint is not glossy and may have been poorly repainted. May only need to be buffed.
   Tolerance based on BVRLA standard:
   Not covered in BVRLA
   Repair Method:
   Report
   Repair Type:
   INFO
   Units of Measure:
   Per Component
   Grade Score:
   0
"DIRTY_MINOR": "Is Slightly Dirty"
The component is slightly dirty and inspection may not be able to detect some defects.
   Tolerance based on BVRLA standard:
   Not covered in BVRLA
   Repair Method:
   Report
   Repair Type:
   INFO
   Units of Measure:
   Per Component
   Grade Score:
   0
"DIRTY_MEDIUM": "Is Medium Dirty"
The component is medium dirty and inspection is unable to detect defects.
   Tolerance based on BVRLA standard:
   Not covered in BVRLA
   Repair Method:
   Report
   Repair Type:
   INFO
   Units of Measure:
   Per Component
   Grade Score:
   0
"DIRTY_MAJOR": "Is Majorly Dirty"
The component is majorly dirty and inspection is unable to detect defects.
   Tolerance based on BVRLA standard:
   Not covered in BVRLA
   Repair Method:
   Report
   Repair Type:
   INFO
   Units of Measure:
   Per Component
   Grade Score:
   0
"OXIDIZED_PAINT": "Paint Is Oxidized or Faded"
The component is dull and may have areas missing color or paint from exposure. May need body shop repainting or repair.
   Tolerance based on BVRLA standard:
   Excessive Damage
   Repair Method:
   Repair & Refinish
   Repair Type:
   Minor Body Shop Repair
   Units of Measure:
   Per Component
   Grade Score:
   4
"ROAD_TAR": "Has Road Tar Stain"

The component is covered in black road tar. May need
  body shop repair or repainting
  Tolerance based on BVRLA standard:
  Excessive Damage
  Repair Method:
  Repair & Refinish
  Repair Type:
  Minor Body Shop Repair
  Units of Measure:
  Per Component
  Grade Score:
  4
"ROAD_PAINT": "Is Covered With Road Paint"
The component is covered in white or yellow road paint.
  May need body shop repair or repainting
  Tolerance based on BVRLA standard:
  Excessive Damage
  Repair Method:
  Repair & Refinish
  Repair Type:
  Minor Body Shop Repair
  Units of Measure:
  Per Component
  Grade Score:
  4
"WORN": "Shows Signs Of Wear"
The paint is dull and looks worn. May need body shop
  repair or repainting
  Tolerance based on BVRLA standard:
  Excessive Damage
  Repair Method:
  Repair & Refinish
  Repair Type:
  Minor Body Shop Repair
  Units of Measure:
  Per Component
  Grade Score:
  4
"MISSING": "Is Missing"
The body part is no longer on the vehicle and requires a
  body shop for replacement and paint.
  Tolerance based on BVRLA standard:
  Excessive Damage
  Repair Method:
  Replace
  Repair Type:
  Major Body Shop Repair
  Units of Measure:
  Per Component
  Grade Score:
  4
"TAPPED_REPIAR": "Is Held By Tape"
The body part is held on by tape and may need to be
  replaced and painted at a body shop.
  Tolerance based on BVRLA standard:
  Excessive Damage
  Repair Method:
  Replace
  Repair Type:
  Major Body Shop Repair
  Units of Measure:
  Per Component
  Grade Score:
  4
"BROKEN": "Is Broken"
The body component is damaged and needs to be replaced
  and painted at a body shop.
  Tolerance based on BVRLA standard:
  Excessive Damage
  Repair Method:
  Replace
  Repair Type:
  Major Body Shop Repair
  Units of Measure:
  Per Component
  Grade Score:
  4
"WRONG_COLOR": "Paint Does Not Match"
The body component shows signs of previously being
  poorly painted and needs to be repainted at a body
  shop.
  Tolerance based on BVRLA standard:
  Excessive Damage
  Repair Method:
  Repair & Refinish
  Repair Type:
  Minor Body Shop Repair
  Units of Measure:
  Per Component
  Grade Score:
  4
Glass:
  Scratches on "GLASS"
  Scratches on a glass components are labeled based on the
severity of the scratch.
Fault: Comment
  "SCRATCHED_MINOR": "Glass Has Minor Scratch",
Fault: Damage
  "SCRATCHED_MEDIUM": "Glass Has Medium Scratch",
  "SCRATCHED_MAJOR": "Glass Has Major Scratch",
Severity:
  "SCRATCHED_MINOR": "Glass Has Minor Scratch"
  The glass has minor scratching that may buff out.
    Tolerance based on BVRLA standard:
    Repaired scratches are acceptable provided they are
      done to a professional standard
    Repair Method:
    Report
    Repair Type:
    INFO
    Units of Measure:
    Per Item
    Grade Score:
    0
  "SCRATCHED_MEDIUM": "Glass Has Medium Scratch"
  The glass has a medium scratch and needs to be professionally repaired.
    Tolerance based on BVRLA standard
    Unrepaired chips, cracks or holes up to 10 mm (half
      inch) are not acceptable
    Repair Method:
    Glass Repair
    Repair Type:
    SMART Repair
    Units of Measure:
    Per Item
    Grade Score:
    3
  "SCRATCHED_MAJOR": "Glass Has Major Scratch"
  The glass has a major scratch and needs to be replaced.

Tolerance based on BVRLA standard
Unrepaired chips, cracks or holes up to 10 mm (half inch) are not acceptable
Repair Method:
Replace
Repair Type:
SMART Repair
Units of Measure:
Per Component
Grade Score:
3

Chips on "GLASS"
Chips on a glass components are labeled based on the severity of the chip.
Fault: Comment
"CHIPPED_MINOR": "Glass Has Minor Chip",
Fault: Chips/Cracks
"CHIPPED_MEDIUM": "Glass Has Medium Chip",
"CHIPPED_MAJOR": "Glass Has Major Chip",
Severity:
"CHIPPED_MINOR": "Glass Has Minor Chip"
The glass has minor chip and may need to be replaced.
Tolerance based on BVRLA standard:
Repaired chips are acceptable provided they are done to a professional standard
Repair Method:
Report
Repair Type:
INFO
Units of Measure:
Per Item
Grade Score:
0
"CHIPPED_MEDIUM": "Glass Has Medium Chip"
The glass has a medium chip and needs to be replaced.
Tolerance based on BVRLA standard:
Unrepaired chips, cracks or holes up to 10 mm (half inch) are not acceptable
Repair Method:
Replace
Repair Type:
SMART Repair
Units of Measure:
Per Component
Grade Score:
3
"CHIPPED_MAJOR": "Glass Has Major Chip"
The glass has a major chip and needs to be replaced.
Tolerance based on BVRLA standard:
Unrepaired chips, cracks or holes up to 10 mm (half inch) are not acceptable
Repair Method:
Replace
Repair Type:
SMART Repair
Units of Measure:
Per Component
Grade Score:
3

Cracks on "GLASS"
Cracks on a glass components are labeled based on the severity of the crack.
Fault: Chips/Cracks
"BROKEN": "Glass Is Broken",
"CRACKED_MINOR": "Glass Has Minor Crack",
"CRACKED_MEDIUM": "Glass Has Medium Crack",
"CRACKED_MAJOR": "Glass Has Major Crack",
Severity:
"BROKEN": "Glass Is Broken"
The glass is broken and needs to be replaced.
Tolerance based on BVRLA standard:
Unrepaired chips, cracks or holes up to 10 mm (half inch) are not acceptable
Repair Method:
Replace
Repair Type:
SMART Repair
Units of Measure:
Per Component
Grade Score:
3
"CRACKED_MINOR": "Glass Has Minor Crack"
The glass has a minor crack and needs to be replaced.
Tolerance based on BVRLA standard:
Unrepaired chips, cracks or holes up to 10 mm (half inch) are not acceptable
Repair Method:
Replace
Repair Type:
SMART Repair
Units of Measure:
Per Component
Grade Score:
3
"CRACKED_MEDIUM": "Glass Has Medium Crack"
The glass has a medium crack and needs to be replaced.
Tolerance based on BVRLA standard:
Unrepaired chips, cracks or holes up to 10 mm (half inch) are not acceptable
Repair Method:
Replace
Repair Type:
SMART Repair
Units of Measure:
Per Component
Grade Score:
3
"CRACKED_MAJOR": "Glass Has Major Crack"
The glass has a major crack and needs to be replaced.
Tolerance based on BVRLA standard:
Unrepaired chips, cracks or holes up to 10 mm (half inch) are not acceptable
Repair Method:
Replace
Repair Type:
SMART Repair
Units of Measure:
Per Component
Grade Score:
3

Dirt on "GLASS"
Dirty glass components are labeled based on the severity of the dirt.
Fault: Comment
"DIRTY_MINOR": "Glass Is Slightly Dirty",
"DIRTY_MEDIUM": "Glass Is Medium Dirty",
"DIRTY_MAJOR": "Glass Is Major Dirty",
Severity:
"DIRTY_MINOR": "Glass Is Slightly Dirty"
The glass is covered with a minor amount of dirt, mud or snow and cannot be inspected.

Tolerance based on BVRLA standard:
Not covered in BVRLA
Repair Method:
Report
Repair Type:
INFO
Units of Measure:
Per Component
Grade Score:
0
"DIRTY_MEDIUM": "Glass Is Medium Dirty"
The glass is covered with a medium amount of dirt, mud or snow and cannot be inspected.
Tolerance based on BVRLA standard:
Not covered in BVRLA
Repair Method:
Report
Repair Type:
INFO
Units of Measure:
Per Component
Grade Score:
0
"DIRTY_MAJOR": "Glass Is Major Dirty"
The glass is covered with a major amount of dirt, mud or snow and cannot be inspected.
Tolerance based on BVRLA standard:
Not covered in BVRLA
Repair Method:
Report
Repair Type:
INFO
Units of Measure:
Per Component
Grade Score:
0
Other issues with "GLASS"
Other issues with glass components are labeled based on the severity of the issue.
Fault: Comment
  "TAPPED_REPIAR": "Glass Is Held By Tape",
  "FOGGY": "Glass Is Dull And Foggy",
Fault: Damage
  "MISSING": "Glass Is Missing",
  "ROAD_PAINT": "Glass Is Covered With Road Paint",
Severity:
"TAPPED_REPIAR": "Glass Is Held By Tape"
The glass is held on by tape, new glass may have been recently installed or glass may need to be replaced.
Tolerance based on BVRLA standard:
Lens Holes, cracked or damaged are not acceptable
Repair Method:
Report
Repair Type:
INFO
Units of Measure:
Per Component
Grade Score:
0
"MISSING": "Glass Is Missing"
The glass is missing and needs to be replaced.
Tolerance based on BVRLA standard:
Lens Holes, cracked or damaged are not acceptable
Repair Method:
Replace
Repair Type:
SMART Repair
Units of Measure:
Per Component
Grade Score:
3
"ROAD_PAINT": "Glass Is Covered With Road Paint"
The glass is covered in white or yellow road paint and needs to be replaced.
Tolerance based on BVRLA standard:
Lens Holes, cracked or damaged are not acceptable
Repair Method:
Replace
Repair Type:
SMART Repair
Units of Measure:
Per Component
Grade Score:
3
"FOGGY": "Glass Is Dull And Foggy"
The glass is dull and foggy and may need buffing or should be replaced.
Tolerance based on BVRLA standard:
Lens Holes, cracked or damaged are not acceptable
Repair Method:
Replace
Repair Type:
SMART Repair
Units of Measure:
Per Component
Grade Score:
3
Wheel:
  Scuffs on "WHEEL"
Fault: Scuffs/Gouged
Scuffs on wheel or rim components are labeled based on the severity of the scuff.
Fault: Comment
  "SCUFFED_MINOR": "Has Minor Scuff",
Fault: Damage
  "SCUFFED_MEDIUM": "Has Medium Scuff",
  "SCUFFED_MAJOR": "Has Major Scuff",
Severity:
"SCUFFED_MINOR": "Has Minor Scuff"
The wheel has minor scuffing that requires wheel resurfacing.
Tolerance based on BVRLA standard:
<50 mm (2 inches) on the total wheel circumference and where no damage is on the wheel spokes
Repair Method:
Report
Repair Type:
INFO
Units of Measure:
Per Component
Grade Score:
0
"SCUFFED_MEDIUM": "Has Medium Scuff"
The wheel has medium scuffing that requires wheel resurfacing.
Tolerance based on BVRLA standard:
>50 mm (2 inches) on the total wheel circumference or where there is any damage to the wheel spokes
Repair Method:
Specialist Repair
Repair Type:
SMART Repair
Units of Measure:
Per Component
Grade Score:
1
"SCUFFED_MAJOR": "Has Major Scuff"
The wheel has a major scuff and needs to be replaced.
  Tolerance based on BVRLA standard:
  Dents and holes on wheel rims are not acceptable
  Repair Method:
  Replace
  Repair Type:
  SMART Repair
  Units of Measure:
  Per Component
  Grade Score:
  2
Chips on "WHEEL"
Fault: Scuffs/Gouged
Chips on wheel or rim components are labeled based on the severity of the chip.
Fault: Comment
  "CHIPPED_MINOR": "Has Minor Chip",
Fault: Damage
  "CHIPPED_MEDIUM": "Has Medium Chip",
  "CHIPPED_MAJOR": "Has Major Chip",
    "CRACKED": "Wheel Cover Is Cracked",
Severity:
"CHIPPED_MINOR": "Has Minor Chip"
The wheel has minor chipping that requires wheel resurfacing.
  Tolerance based on BVRLA standard:
  <50 mm (2 inches) on the total wheel circumference and where no damage is on the wheel spokes
  Repair Method:
  Report
  Repair Type:
  INFO
  Units of Measure:
  Per Component
  Grade Score:
  0
"CHIPPED_MEDIUM": "Has Medium Chip"
The wheel has medium chipping that requires wheel resurfacing.
  Tolerance based on BVRLA standard:
  >50 mm (2 inches) on the total wheel circumference or where there is any damage to the wheel spokes
  Repair Method:
  Specialist Repair
  Repair Type:
  SMART Repair
  Units of Measure:
  Per Component
  Grade Score:
  1
"CHIPPED_MAJOR": "Has Major Chip"
The wheel has a major chip and needs to be replaced.
  Tolerance based on BVRLA standard:
  Dents and holes on wheel rims are not acceptable
  Repair Method:
  Replace
  Repair Type:
  SMART Repair
  Units of Measure:
  Per Component
  Grade Score:
  2
"CRACKED": "Wheel Cover Is Cracked"
The wheel has a crack and needs to be replaced.
  Tolerance based on BVRLA standard:
  Dents and holes on wheel rims are not acceptable
  Repair Method:
  Replace
  Repair Type:
  SMART Repair
  Units of Measure:
  Per Component
  Grade Score:
  2
Dirt on "WHEEL"
Fault: Comment
Dirt on wheel or rim components are labeled based on the severity of the dirt.
  "DIRTY_MINOR": "Is Slightly Dirty",
  "DIRTY_MEDIUM": "Is Medium Dirty",
  "DIRTY_MAJOR": "Is Major Dirty",
Severity:
"DIRTY_MINOR": "Is Slightly Dirty"
The wheel has minor dirt that prevents being inspected.
  Tolerance based on BVRLA standard:
  Not covered in BVRLA
  Repair Method:
  Report
  Repair Type:
  INFO
  Units of Measure:
  Per Component
  Grade Score:
  0
"DIRTY_MEDIUM": "Is Medium Dirty"
The wheel has medium amount of dirt, mud or snow that prevents being inspected.
  Tolerance based on BVRLA standard:
  Not covered in BVRLA
  Repair Method:
  Report
  Repair Type:
  INFO
  Units of Measure:
  Per Component
  Grade Score:
  0
"DIRTY_MAJOR": "Is Major Dirty"
The wheel has major amount of dirt, mud or snow that prevents being inspected.
  Tolerance based on BVRLA standard:
  Not covered in BVRLA
  Repair Method:
  Report
  Repair Type:
  INFO
  Units of Measure:
  Per Component
  Grade Score:
  0
Other issues on "WHEEL"
Other issues on wheel or rim components are labeled based on the severity of the issue.

Fault: Comment
  "WINTER_RIM": "Is A Winter Rim",
Fault: Damage
  "MISSING_CENTER_CAP": "Is Missing Center Cap",
  "ROAD_PAINT": "Is Covered With Road Paint",
  FOGGY": "Is Dull And Foggy",
  Severity:
  "WINTER_RIM": "Is A Winter Rim"
  The wheel is a temporary winter rim and should be replaced with original factory wheels.
    Tolerance based on BVRLA standard:
    Not covered in BVRLA
    Repair Method:
    Report
    Repair Type:
    INFO
    Grade Score:
    0
  "MISSING_CENTER_CAP": "Is Missing Center Cap"
  The wheel is missing the center cap and needs to be replaced.
    Tolerance based on BVRLA standard:
    Missing wheel trims are not acceptable
    Repair Method:
    Replace
    Units of Measure:
    Per Component
    Grade Score:
    2
  "ROAD_PAINT": "Is Covered With Road Paint"
  The wheel is covered in white or yellow road paint and needs to be resurfaced.
    Tolerance based on BVRLA standard:
    Missing wheel trims are not acceptable
    Repair Method:
    Replace
    Repair Type:
    SMART Repair
    Units of Measure:
    Per Component
    Grade Score:
    2
  "FOGGY": "Is Dull And Foggy"
  The wheel surface is dull and foggy and needs to be resurfaced.
    Tolerance based on BVRLA standard:
    >50 mm (2 inches) on the total wheel circumference or where there is any damage to the wheel spokes
    Repair Method:
    Specialist Repair
    Repair Type:
    SMART Repair
    Units of Measure:
    Per Component
    Grade Score:
    2
Tire:
  Wear on "TIRE"
  Wear on tires are labeled based on the severity of the tread wear.
Fault: Worn
  "WORN_MINOR": "Is Slightly Worn",
Fault: Damage
  "WORN_MEDIUM": "Is Medium Worn",
  "WORN_MAJOR": "Is Majorly Worn",
Severity:
  "WORN_MINOR": "Is Slightly Worn"
  Shows signs of slight wear is should not need replacing.
    Tolerance based on BVRLA standard:
    All tires, including any spare, must meet minimum UK/Canada/USA legal requirements
    Repair Method:
    Report
    Repair Type:
    INFO
    Units of Measure:
    Per Component
    Grade Score:
    0
  "WORN_MEDIUM": "Is Medium Worn"
  Shows signs of medium wear and may need replacing.
    Tolerance based on BVRLA standard:
    All tires, including any spare, must meet minimum UK/Canada/USA legal requirements
    Repair Method:
    Replace
    Repair Type:
    SMART Repair
    Units of Measure:
    Per Component
    Grade Score:
    3
  "WORN_MAJOR": "Is Majorly Worn"
  Shows signs of major wear and needs replacing.
    Tolerance based on BVRLA standard:
    All tires, including any spare, must meet minimum UK/Canada/USA legal requirements
    Repair Method:
    Replace
    Repair Type:
    SMART Repair
    Units of Measure:
    Per Component
    Grade Score:
    3
  Other issues with "TIRE"
  Other issues with tires are labeled based on the severity of the issue.
Fault: Comment
  "LIKE_NEW": "Tire Is Good",
Fault: Damage
  "BULGED": "Has Protrusion On Sidewall",
Fault: Incorrect Size/Spec
  "MISSMATCH_TIRE": "Tire Brand Does Not Match",
Severity:
  "LIKE_NEW": "Tire Is Good"
  Shows signs of being recently replaced.
    Tolerance based on BVRLA standard:
    All tires, including any spare, must meet minimum UK/Canada/USA legal requirements
    Repair Method:
    Report
    Repair Type:
    INFO
    Units of Measure:
    Per Component
    Grade Score:
    0
  "WINTER TREAD": "Is A Winter Tire"
  Shows signs of being a winter or mud tire and may need replacing.
    Tolerance based on BVRLA standard:
    All tires, including any spare, must meet minimum UK/Canada/USA legal requirements Repair Method:
Report
Repair Type:
SMART Repair
Units of Measure:
Per Component
Grade Score:
0
"BULGED": "Has Protrusion On Sidewall"
Has a bulge on the sidewall and needs replacing.
   Tolerance based on BVRLA standard:
   There must be no damage to sidewall or tread
Repair Method:
Replace
Repair Type:
SMART Repair
Units of Measure:
Per Component
Grade Score:
3
"WEATHER_CRACKED": "Tread Is Weather Cracked"
Shows signs of weather cracking and needs replacing.
   Tolerance based on BVRLA standard:
   All tires, including any spare, must meet minimum UK/Canada/USA legal requirements Repair Method:
Replace
Repair Type:
SMART Repair
Units of Measure:
Per Component
Grade Score:
3
"MISSMATCH_TIRE": "Tire Brand Does Not Match"
Brand does not match other tires and needs replacing.
   Tolerance based on BVRLA standard:
   All tires, including any spare, must comply with the vehicle manufacturer recommendation of tire type, size and speed rating
Repair Method:
Replace
Repair Type:
SMART Repair
Units of Measure:
Per Component
Grade Score:
3

System Grading Matrix:

Once the system 100 has completed an inspection and has determined the type of damage, it's severity and how this impacts what grade score to apply to each item or component measured it uses the following matrix to apply three grade standards for each inspection; NAAA as a number, NAMA as a letter and Book Value as text, based on the following parameters.

| NAAA Vehicle Condition Grading Scale | NAMA Vehicle Condition Grading Scale http://www.nama-uk.com/ | Book Value Grading Scale | Max Grade Per Item Score | Maximum Total Grade Score Per Vehicle Inspection |
|---|---|---|---|---|
| 5 | A | Excellent | 0 | 0 |
| 4 | B | Good Condition | 1 | 5 |
| 3 | C | Fair Condition | 3 | 30 |
| 2 | D | Poor Condition | 4 | 40 |
| 1 | E | Poor Condition | 5 | 50 |
| 0 | U | Poor Condition | 1000 | 1000 |

What is claimed is:

1. A system for vehicle appraisals using image processing comprising:
- a server having non-transitory computer readable storage medium with executable instructions for causing one or more processors to configure:
  - an interface application with a vehicle capture module to capture images of a vehicle and metadata for captured images, the interface application displaying an interactive guide to assist in capturing the images, the interactive guide having overlays that update to assist in capturing different images of views of the vehicle that correspond to side views of the vehicle, a front view of the vehicle, and a rear view of the vehicle, the interactive guide generated using a cage for a vehicle type, the cage defining locations or components of the vehicle, a vehicle identification number being metadata for the captured images, the vehicle identification number indicating the vehicle type, wherein the cage has different cage views comprising the side views of the vehicle, the front view of the vehicle, and the rear view of the vehicle, wherein the overlays comprise the different cage views to assist in capturing at least a portion of the different images of views of the vehicle that correspond to the side views of the vehicle, the front view of the vehicle, and the rear view of the vehicle;
  - a plurality of agent interfaces, each agent interface having a task dashboard to display a portion of the captured images to receive input data, wherein the plurality of agent interfaces display the different cage views as overlays for the at least the portion of the different images of views of the vehicle that correspond to the side views of the vehicle, the front view of the vehicle, and the rear view of the vehicle;
  - a recognition engine to process the captured images and metadata to detect defects of the vehicle and compute vehicle metrics, the processing based on a plurality of tasks dispatched to the plurality of agent interfaces to receive input data for detecting the defects of the vehicle and computing the vehicle metrics, each task dispatched to a corresponding agent interface; each task associated with the portion of the captured images to display within the corresponding agent interface, wherein the system defines tasks for each view of the vehicle, wherein the recognition engine computes the vehicle identification number by decoding the vehicle identification number from the captured images to perform a validation and, upon not being able to automatically decode the vehicle identification number, dispatching a task to an agent along with at least a portion of the captured images to receive input data for the vehicle identification number in response, the portion of the captured images corresponding to a vehicle identification number plate;
  - a cost estimate tool to process the vehicle metrics to compute cost data for repair of the defects of the vehicle;
  - a valuation tool to compute a market value estimate for the vehicle using the vehicle metrics and the cost data; and
  - wherein the interface application has visual elements corresponding to the interactive guide, the market value estimate, the cost data, and at least a portion of the vehicle metrics.

2. The system of claim 1 wherein the interface application connects to a camera of a device to capture the images, wherein the interface application receives a device identifier for the device and wherein the image capture module uses the device identifier as metadata for the captured images.

3. The system of claim 1 wherein the interface application dynamically configures the vehicle capture module based on a vehicle type to generate the interactive guide corresponding to the cage.

4. The system of claim 2 wherein the interface application computes the vehicle type by capturing an image of or scanning a barcode of the vehicle to determine a vehicle identification number.

5. The system of claim 1 wherein the recognition engine computes the vehicle metrics by dispatching the plurality of tasks simultaneously to the plurality of agent interfaces.

6. The system of claim 1 wherein the recognition engine computes, from the captured images, the vehicle identification number, and wherein the interface application is configured to receive an error message from the vehicle capture module upon determining that the vehicle identification number could not be successfully computed from the captured images, and in response updates the interface application with the visual elements corresponding to the interactive guide to capture an image to compute the vehicle identification number.

7. The system of claim 1 wherein the recognition engine computes, from the captured images, interior data, and wherein the interface application is configured to receive an error message from the vehicle capture module upon determining that the interior data could not be successfully computed from the captured images, and in response updates the interface application with the visual elements corresponding to the interactive guide to capture an image to compute the interior data.

8. The system of claim 7 wherein the recognition engine computes the interior data by dispatching three tasks simultaneously to three agent interfaces, each task to a different agent interface, a first task for a colour of the interior, a second task for an overall condition of the interior, and a third task a transmission type of the interior.

9. The system of claim 1 wherein the recognition engine computes, from the captured images, odometer data, and wherein the interface application is configured to receive an error message from the vehicle capture module upon determining that the odometer data could not be successfully computed from the captured images, and in response updates the interface application with the visual elements corresponding to the interactive guide to capture an image to compute the odometer data.

10. The system of claim 1 wherein recognition engine computes, from the captured images, view data, and wherein the interface application is configured to receive an error message from the vehicle capture module upon determining that the view data could not be successfully computed from the captured images, and in response updates the interface application with the visual elements corresponding to the interactive guide to re-capture images to compute the view data, the view data being for the front view, the side view and the rear view of the vehicle.

11. The system of claim 1 wherein the recognition engine computes, from the captured images, windshield data, and wherein the interface application is configured to receive an error message from the vehicle capture module upon determining that the windshield data could not be successfully computed from the captured images, and in response updates the interface application with the visual elements corresponding to the interactive guide to re-capture an image to compute the windshield data.

12. The system of claim 1 wherein the recognition engine computes, from the captured images, tire data, and wherein the interface application is configured to receive an error message from the vehicle capture module upon determining that the tire data could not be successfully computed from the captured images, and in response updates the interface application with the visual elements corresponding to the interactive guide to capture an image to compute the tire data.

13. The system of claim 1 wherein the vehicle capture module generates visual elements corresponding to a vehicle shape to facilitate an image capture process.

14. The system of claim 1 wherein the vehicle capture module generates visual elements corresponding to different parts of the vehicle to generate the metadata, the metadata indicating a location on the image and a corresponding descriptor label.

15. The system of claim 1 wherein the vehicle capture module captures audio data for the vehicle and wherein the recognition engine processes the audio data to compute the vehicle metrics.

16. The system of claim 1 wherein the recognition engine uses repository of a plurality of cages linked to different types of vehicles to link the vehicle metrics to different locations or components of the vehicle.

17. The system of claim 1 wherein the recognition engine detects the defects of the vehicle and computes the vehicle metrics using grading bands as a condition of the vehicle.

18. The system of claim 1 wherein the recognition engine routes a first image to a first agent to receive a first data entry and simultaneously routes the first image to a second agent to receive a second data entry, the first agent having an interface optimized to capture the first data entry and the second agent having an interface optimized to capture the second data entry.

19. A non-transitory computer recordable storage medium having stored therein computer executable program code, which when executed by a processor, causes the processor to:
  display an interactive guide at an interface application for capturing images of a vehicle, the interactive guide generated using a cage for a vehicle type, the cage defining locations or components of the vehicle, a vehicle identification number indicating the vehicle type, the interactive guide having overlays that update to assist in capturing different images of views of the vehicle that correspond to side views of the vehicle, a front view of the vehicle, and a rear view of the vehicle, wherein the cage has different cage views comprising the side views of the vehicle, the front view of the vehicle, and the rear view of the vehicle, wherein the overlays comprise the different cage views to assist in capturing at least a portion of the different images of views of the vehicle that correspond to the side views of the vehicle, the front view of the vehicle, and the rear view of the vehicle;
  capture, at the interface application, images of the vehicle and metadata for the captured images, the captured images including data indicating defects;
  for each agent interface of a plurality of agent interfaces, displaying a portion of the captured images to receive input data, wherein the plurality of agent interfaces display the different cage views as overlays for the at least the portion of the different images of views of the vehicle that correspond to the side views of the vehicle, the front view of the vehicle, and the rear view of the vehicle;
  process the captured images and metadata to detect defects of the vehicle and compute vehicle metrics including the vehicle identification number, the processing based on different tasks dispatched to the plurality of agent interfaces to receive input data for detecting the defects of the vehicle and computing the vehicle metrics, each task dispatched to a corresponding agent interface; each task associated with the portion of the captured images to display within the corresponding agent interface, wherein the system defines tasks for each view of the vehicle;
  decode the vehicle identification number from the captured images to perform a validation and, upon not being able to automatically decode the vehicle identification number, dispatch a task to an agent along with at least a portion of the captured images to receive input data for the vehicle identification number, the portion of the captured images corresponding to a vehicle identification number plate;
  compute cost data for repair of the defects of the vehicle;
  compute a market value estimate for the vehicle using the vehicle metrics and the cost data; and
  update the interface application with visual elements corresponding to the interactive guide, the market value estimate, cost data, and at least a portion of the vehicle metrics.

20. A method for automatically processing images of vehicles comprising:
  receiving a vehicle identification number from an interface application;
  displaying an interactive guide at the interface application for capturing images of a vehicle, the interactive guide generated using a cage for a vehicle type, the cage defining locations or components of the vehicle, the vehicle identification number indicating the vehicle type, the interactive guide having overlays that update to assist in capturing different images of views of the vehicle that correspond to side views of the vehicle, a front view of the vehicle, and a rear view of the vehicle, wherein the cage has different cage views comprising the side views of the vehicle, the front view of the vehicle, and the rear view of the vehicle, wherein the overlays comprise the different cage views to assist in capturing at least a portion of the different images of views of the vehicle that correspond to the side views of the vehicle, the front view of the vehicle, and the rear view of the vehicle;
  capturing, at the interface application, images of the vehicle and metadata for the captured images, the captured images identifying defects to the vehicle;
  displaying a portion of the captured images to receive input data at an agent interface of a plurality of agent interfaces, wherein the plurality of agent interfaces display the different cage views as overlays for the at least the portion of the different images of views of the vehicle that correspond to the side views of the vehicle, the front view of the vehicle, and the rear view of the vehicle;
  processing the captured images and metadata to automatically detect the defects of the vehicle and compute vehicle metrics, the processing by dispatching different tasks to the plurality of agent interfaces and, in response, receiving input data for detecting the defects of the vehicle and computing the vehicle metrics, each task dispatched to a corresponding agent interface; each task associated with the portion of the captured images to display within the corresponding agent interface, wherein the system defines tasks for each view of the vehicle;

decoding the vehicle identification number from the captured images, validating the decoded the vehicle identification number, and, upon not being able to automatically decode the vehicle identification number, dispatching a task to an agent interface along with at least a portion of the captured images to receive input data for the vehicle identification number in response, the portion of the captured images corresponding to a vehicle identification number plate;

computing cost data for repair of the defects of the vehicle;

computing a market value estimate for the vehicle using the vehicle metrics and the cost data; and updating the interface application with visual elements corresponding to the interactive guide, the market value estimate, cost data, and at least a portion of the vehicle metrics.

* * * * *